United States Patent [19]

Hamilton et al.

[11] Patent Number: 4,951,139

[45] Date of Patent: Aug. 21, 1990

[54] COMPUTER-BASED VIDEO COMPRESSION SYSTEM

[75] Inventors: Eric R. Hamilton, Cupertino; John L. Douglas, Santa Cruz; Jeffrey B. Widergren, Saratoga, all of Calif.

[73] Assignee: StarSignal, Inc., San Jose, Calif.

[21] Appl. No.: 430,748

[22] Filed: Nov. 1, 1989

Related U.S. Application Data

[63] Continuation of Ser. No. 175,074, Mar. 30, 1988, Pat. No. 4,897,717.

[51] Int. Cl.⁵ .............................................. H04N 7/13
[52] U.S. Cl. ..................................... 358/135; 325/27; 358/13; 358/136
[58] Field of Search ................ 358/135, 136, 133, 13; 375/25, 27, 122

[56] References Cited

U.S. PATENT DOCUMENTS 4,774,574 9/1988 Daly et al. ........................... 358/133
4,816,913 3/1989 Harney et al. ....................... 358/133

OTHER PUBLICATIONS

Paul Farrelle et al., "Recursive Block Coding-A New Approach To Transform Coding", IEEE, vol. Com-34, No. 2, Feb. 1986, pp. 161-179.
P. Yip et al., "A Fast Computational Algorithm for the Discrete Sine Transform", IEEE, vol. Com-28, No. 2, Feb. 1980, pp. 305-307.

Primary Examiner—James J. Groody
Assistant Examiner—Victor R. Kostak
Attorney, Agent, or Firm—Lyon & Lyon

[57] ABSTRACT

A computer-based video compression system for processing natural information signals, such as video signals or audio signals, for the purpose of forming a compact data file of compressed signals which can be expanded to produce the original information signals is provided by a unique subsystem in a host computer which uses a high speed signal processor to compress video images and to expand video images. The unique compression process uses segmentation and predictive techniques in conjunction with a discrete sine transform, quantization and Huffman coding to provide optimal compression. Further the segmentation and predictive techniques in conjunction with the discrete sine transform diminish the magnitude of correlated errors generated by the compression process. The compression system of this invention is further enhanced by a special circuit which transfers data between the host computer and the compression subsystem at rates greater than were previously possible.

31 Claims, 32 Drawing Sheets

FDST FLOW GRAPH FOR N = 15

$S_j/K = \sin(j\pi/K)$
$C_j/K = \cos(j\pi/K)$

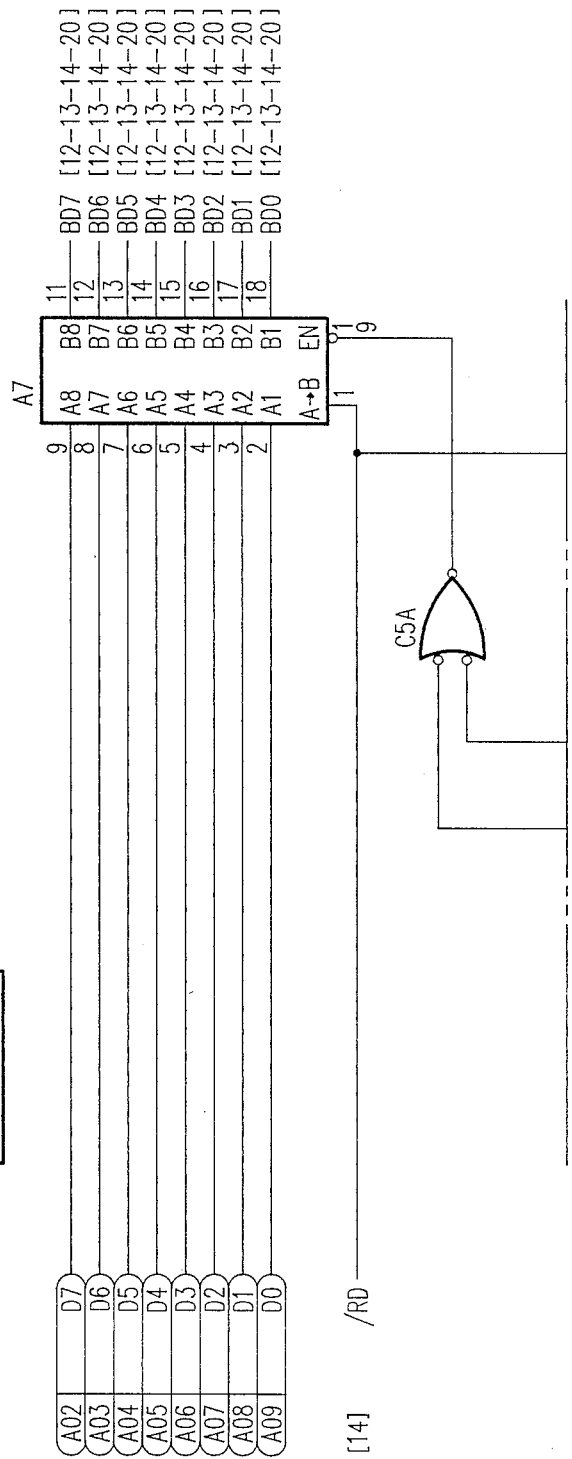
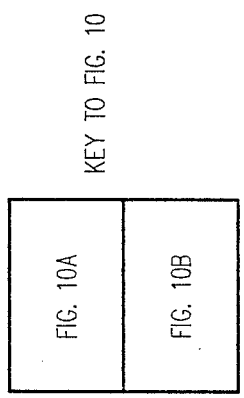
FIG. 10A

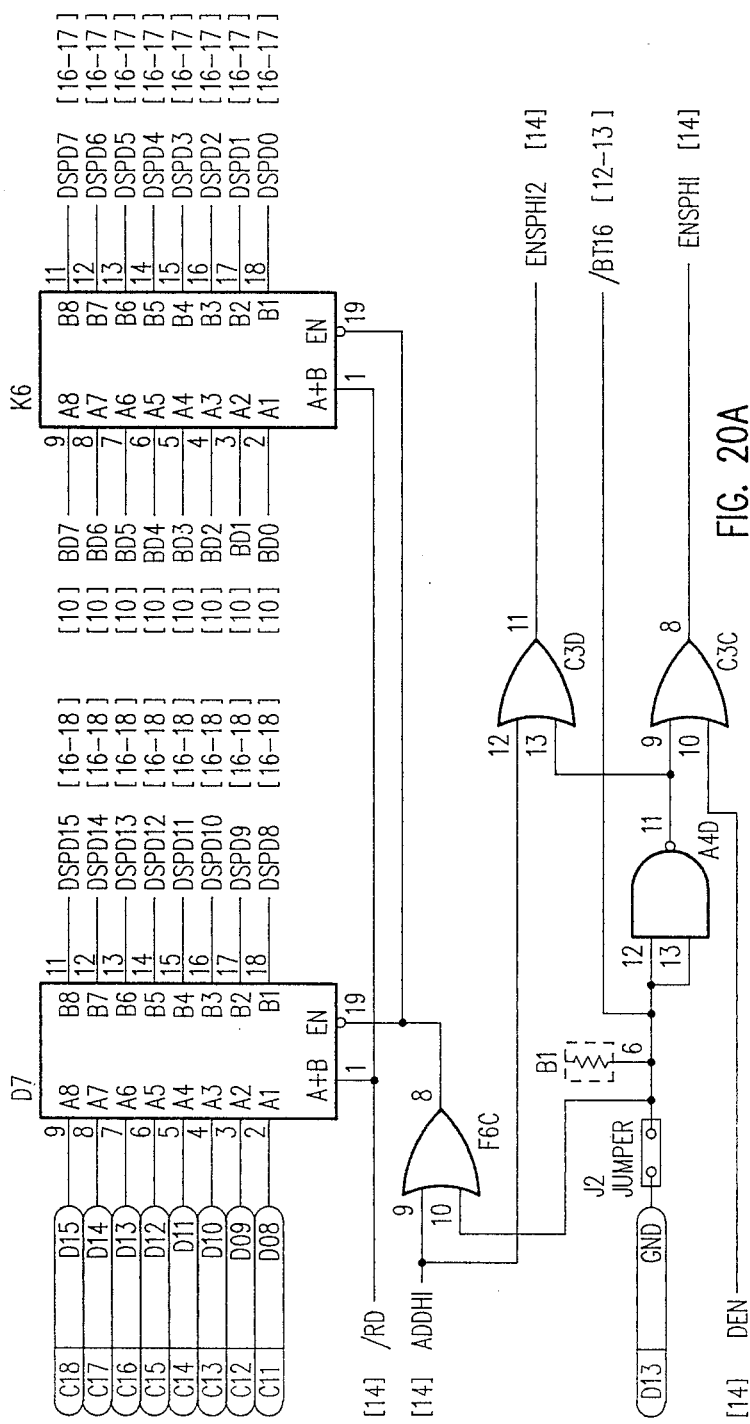
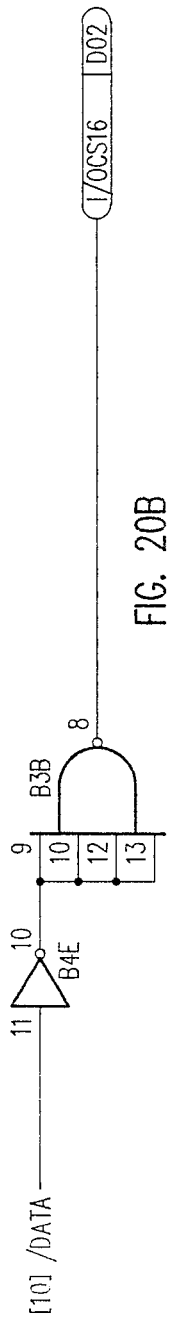
FIG. 20A
FIG. 20B

COMPUTER-BASED VIDEO COMPRESSION SYSTEM

CROSS REFERENCE TO RELATED APPLICATION

This application is a continuation application of U.S. Patent Application Ser. No. 07/175,074 entitled "Computer-Based Video Compression System", filed on March 30, 1988 which issued as U.S. Pat. No. 4,897,717 on 1/30/90.

BACKGROUND OF THE INVENTION

1. Field of the Invention

This invention relates to information signal processing in general and in particular to the field of processing "natural" information signals, such as video signals or audio signals, for the purpose of forming a compact data file of compressed signals which can be expanded to reproduce the information in the original information signals.

2. Description of the Prior Art

Video data compression in recent years has achieved increasing importance because of the advances in communications and the general increase in transfer of information. Typically, video data is comprised of video images and each video image is a frame comprised of individual picture elements, pixels. The pixels form lines, sometimes called rows, in the horizontal direction and columns in the vertical direction. The number of pixels per line and the number of lines per frame depends upon both the video format used to represent the frame and the rate at which the frame was digitized.

To digitize a frame containing a black-and-white image, each pixel in the frame is normally assigned a number between 0 and 255, for example, where 0 would mean the pixel was completely black, and 255 would mean that the pixel was completely white. Numbers between 0 and 255 represent the various shades of gray. Thus, to digitally represent such an image, each pixel requires eight bits to represent the number corresponding to the gray-level of the pixel.

For a color image where each pixel has a red component (R), a green component (G), and a blue component (B) and each component has an intensity that varies from 0 to 255, three times more information is required to represent the color image than a black-and-white image having the same number of pixels. Accordingly, any system, which utilizes numerous digitized colored pictures or numerous digitized black-and-white pictures, processes formidable amounts of data. For example, in the transmission Of a black-and-white television picture, data rates for unprocessed digitized television signals typically require a communications channel with a bandwidth greater than 40 megabytes per second.

Several processes have been developed for reducing the quantity of data required to represent a video image. These processes compress the data representing the image. The compressed data is usually transmitted over a data channel and when the compressed data is received it is expanded to recreate a likeness of the original lmage.

Two general methods have been developed for compression of video data, (1) spatial or time domain compression, and (2) transform domain compression. Transform domain compression, sometimes called transform domain coding, typically results in better compression performance but is considerably more difficult to implement in real-time hardware. In transform domain coding, the original set of binary data representing the pixels is processed by an invertible mathematical transform so that the original data, which are correlated in the space domain or time domain, are mapped into a new coordinate system, called the transform or generalized frequency domain, where the data are much less correlated.

The mathematical transforms are chosen so that they preserve the signal energy of the original image in the transform domain, but the energy is concentrated in a relatively few samples which are usually the lower frequency samples. Accordingly, compression can be achieved by considering these high energy samples to be sufficient for reconstruction after transmission storage or processing. Alternatively, as described below, the transform coefficients are encoded using methods developed in information theory so that data representing the original picture is first compressed by the transform which concentrates the data in fewer points and then the transformed data are further compressed by quantization and encoding of the transform coefficients. To recreate the original image, the encoded transform coefficients are decoded, inverse quantized, and inverse transformed. The quality of the reconstructed image is directly dependent on the errors introduced by the transform, quantization, and the encoding-decoding processes.

The Karhunen-Loeve (KL) transform is usually identified as the optimal transform for decorrelating the data in the transform domain and packing a maximum energy in a given number of samples. However, there are two generally recognized problems with the KL transform. One, the KL transform is unique for only one class of signals, and two, a fast KL transform algorithm is not known. Accordingly, alternative mathematical transforms have been investigated The discrete cosine transform is generally used for transform domain coding of video images because a fast discrete cosine transform algorithm exists and the cosine transform has been shown to be virtually identical to the KL transform for numerous practical conditions.

In the traditional discrete cosine transform compression methods, the video frame is divided into a series of nonoverlapping blocks. Typically, a block is sixteen pixels wide and sixteen pixels high. The discrete cosine transform of a two dimensional block is implemented by transforming the digital data for the pixels in a first direction and then transforming in the second direction. The resulting cosine transform coefficients include a single term which represents the average signal energy in the block, sometimes referred to as the DC term, and a series of terms, sometimes referred to as the AC terms, which represent the variation of the signal energy about the DC component for the block.

A quantizer is used to reduce the range of the cosine transform coefficients. A quantizer is a mapping from the continuous variable domain of transform coefficients into the domain of integers. Commonly used is the uniform quantizer, which may be specified by a number. The number is divided into each transform coefficient with the resulting quotient rounded to the nearest integer. The quantized cosine transform coefficients are then encoded for transmission over a data channel.

There are two basic coding techniques, adaptive coding techniques and nonadaptive coding techniques. With an adaptive coding technique, the transform, quantization, and coding of the video image produce compressed data at a variable rate, but the transmission of the compressed data representing the video image over a communication channel is at a fixed rate. Therefore, the adaptive compression system employs a buffer which interfaces the variable rate compression system with the fixed rate communication channel. The buffer is typically designed to provide variable feedback of compression parameters so that the coding of the transform coefficients is adapted to the conditions in the buffer. This form of adaptive coding limits the quality of the compression because the process is governed by the state of the buffer and not by considerations which provide optimal compression.

Irrespective of either the coding scheme for the discrete cosine transform coefficients or the quantization method, the methods or processes which utilize a discrete cosine transform generally suffer from a common problem. For each block compressed and reconstructed, utilization of the cosine transform results in greater pixel error at the edges of the block with the error decreasing towards the center of the block. Since each of the blocks is coded independently, the distortion introduced by the compression scheme using the cosine transform is discontinuous at each block boundary. Highly correlated errors, that is one error on top of the other such as those introduced by the cosine transform at the block boundaries, stand out and are highly visible to the human eye.

Farrelle and Jain suggested in "Recursive Block Coding —A New Approach to Transform Coding," IEEE Transactions on Communications, Vol. COM-34, No. 2, pp. 161-179, Feb. 1986, a new method for compression of image data which is designed to minimize the highly correlated errors which occur at block edges using conventional cosine transform coding. In this method, referred to as Recursive Block Coding, each block is further subdivided into corner, edge and interior elements which are coded separately. Previously coded elements within the block are combined with elements from adjacent blocks to form a prediction of all pixels in the next block element to be coded. This prediction is used to reduce the complexity of the data to be compressed and to reduce error at the edge pixels. Farrelle and Jain show that the theoretical and practical performance of the recursive block coding is superior to the conventional block by block discrete cosine transform methods and the block effect distortion is substantially reduced. In recursive block coding, the use of previously coded block elements for prediction yields a residual signal which has relatively small correlated errors at block boundaries. Farrelle and Jain, using computer simulation, developed their method using a discrete sine transform with uniform quantizers and nonadaptive zonal transform coefficient coding techniques. Thus, while the Recursive Block Coding technique combined with the discrete sine transform minimizes the correlated boundary error problems of the prior art discrete cosine transform methods, the method of Farrelle and Jain is limited by the use of uniform quantizers and nonadaptive coding techniques. Further, demonstration of the method does not establish that the method is suitable for a video compression system that must operate with constraints on the time, memory and storage space available for compression.

The present invention overcomes the problems of the prior art by providing a system for developing data bases of compressed video images, as well as data bases of other analog data that are amenable to digitization, which eliminates the boundary errors of the discrete cosine transform methods and utilizes both nonuniform quantization and adaptive coding techniques to achieve optimal compression while maintaining image quality. The compression system provides a fast means of data compression that can be implemented in a wide variety of applications.

SUMMARY OF THE INVENTION

A computer-based video compression system incorporating the principles of the present invention includes a unique subsystem, a compression/expansion system, which uses a high speed signal processor to compress video images and to expand compressed video images. The compression process and the expansion process used by the high speed signal processor provide optimal compression and expansion of the video image. In the compression/expansion system (compression system) of the present invention, a color video camera generates analog signals that represent a color video image. The analog signals are provided to a frame grabber subsystem of the computer-based video compression system which filters the analog signals and generates a frame of digital data which represents a still image. The frame of digital data is made up of lines of discrete pixels. The frame is stored in a random access memory (RAM) of the frame grabber subsystem.

A selected portion of the digital data in the RAM of the frame grabber subsystem is moved by a computer program, running in the computer containing both the frame grabber subsystem and the compression subsystem, to a data RAM of the compression system. After the data is loaded in the data RAM of the compression system, the signal processor of the compression subsystem compresses the data and stores the compressed data back in the data RAM of the compression system. The processed data in the data RAM of the compression system is moved by the program in the host computer to a storage area in the memory of the host computer.

In an alternative mode of operation, compressed data is expanded by the signal processor and the reconstructed data is stored in the RAM of the frame grabber system. The reconstructed data in the RAM of the frame grabber is subsequently displayed on a video monitor.

The function performed by the signal processor of the compression system is determined by the computer program in the host computer. The computer program loads either the compression process program code or the expansion process program code from the memory of the host computer into the program RAM of the compression system and then initializes the compression system so that it is ready to either perform the expansion or the compression process. After initialization of the compression system and the transfer of the first portion of the frame from the RAM of the frame grabber to the data RAM of the compression system, the program in the host computer issues a command to the compression system which directs the compression system to process the data in the data RAM of the compression system.

After each portion of data representing the video image in the data RAM of the compression system is compressed, the host computer moves the compressed data from the data RAM of the compression system to the memory of the host computer. The compression process is applied on each subsequent portion of data transferred to the data RAM of the compression system from the data RAM of the frame grabber until the entire frame is compressed and stored in the memory of the host computer.

In an expansion process, after each portion of data is expanded, the host computer program moves the expanded data from the data RAM of the compression system to the RAM of the frame grabber system. When a complete frame of reconstructed data is present in the frame grabber subsystem, the frame is transferred to a digital-to-analog converter which changes the frame of reconstructed digital data to analog signals which are then supplied to a video display device.

The compression process implemented by the signal processor in the compression system first converts the red, green and blue pixel data from the frame grabber to luminance pixel data (Y) and chrominance component pixel data (I,Q). The luminance data is processed by a quality retention process which first divides the portion of luminance data in the RAM of the compression system into blocks 16 pixels wide and 16 lines high. Each block is further subdivided into an interior block vector, a right edge vector, a lower edge vector and a corner pixel. The corner pixel for each block is coded with a specific number of bits and stored in the memory of the compression system.

Next the quality retention process forms a linear estimate of the right edge vector using linear interpolation between the corner pixel of the block being processed and the corner pixel of the block immediately above the block being processed. The predicted right edge vector is then subtracted from the right edge vector to form a right edge error vector. The right edge error vector is processed by a discrete sine transform and the resulting vector of transform coefficients is quantized using a nonuniform quantizer. The nonuniform quantizer was selected such that quantized coefficients are peaked about zero because this quantization improves the coding efficiency. The vector of quantized transform coefficients is coded using an adaptive vector coder, described below.

The quantized coefficients are then reconstructed (inverse quantized), processed by an inverse discrete sine transform, added to the predicted right edge vector, and stored back in the data RAM of the compression system, overwriting the original right edge vector.

The lower edge vector of the block is processed in a manner similar to that of the right edge vector. However, to form the linear estimate for the predicted lower edge vector, the corner pixel of the block being processed and the corner pixel of the block immediately to the left of the block being processed are used to form the linear estimate. As with the right edge vector, the lower edge vector is inverse processed and the reconstructed values are stored in RAM such that the original values are overwritten.

The predicted interior block vector is generated using the reconstructed lower edge vector of the block being processed, the reconstructed lower edge vector of the block immediately above the block being processed, the reconstructed right edge vector of the block being processed, and the reconstructed right edge vector of the block immediately to the left of the block being processed. The four edge vectors are used to form a bilinear prediction of each pixel in the interior block vector. Again, the predicted value for each pixel in the predicted interior block vector is subtracted from each point in the interior block vector to form an interior error block vector. The interior error block vector is processed using a two-dimensional discrete sine transform and then quantized. The two-dimensional vector of quantized transform coefficients is compressed by the same process used for the lower edge vector and the right edge vector except that a table is employed to designate the order in which the transform coefficients are coded, effectively reordering the block into a one-dimensional vector.

After the corner pixel, the right edge vector, the lower edge vector and the interior block vector are compressed for each block in the luminance strip of data, the compressed luminance data for the strip is moved from the data memory of the compression system by the program in the host computer to a temporary buffer in the memory of the host computer.

The two chrominance components in the first strip of data are each filtered and sampled using a low-pass (sin X)/X finite impulse response filter in both directions on a 4:1 basis so that the sixteen line strip of data is reduced to a four line strip of data. The filtered and sampled data are stored in the data memory of the compression system.

The compression of the luminance data and filtering and sampling of the chrominance data continues until four strips of data have been processed. After the fourth strip of luminance data is processed and moved to the temporary buffer in the memory of the host computer, the memory of the compression system contains a 16 line strip of data for each of the chrominance components. Thus, each of the chrominance components are compressed in the same manner as the luminance component, and after compression are moved to permanent compressed image storage in the memory of the host computer. When both chrominance components are stored in the memory of the host computer, the host computer moves the four strips of coded luminance data from the temporary buffer to the permanent compressed image storage area. This process is repeated until all lines in the memory of the frame grabber have been processed.

The adaptive vector coder of this invention, which is used to code all the vectors in a block, uses six empirically generated Huffman coding tables to code each one-dimensional vector of quantized transform coefficients. For each coefficient in the vector, a predicted mean is calculated. The predicted mean is used to select a Huffman code table. A table of predicted mean thresholds is employed to designate the Huffman code table used for a particular predicted mean value. These thresholds are chosen such that for a typical distribution of predicted mean values there is an equal probability of selecting any one of the six Huffman tables.

The expansion process of the present invention is the inverse process of each of the steps of the compression process. To initiate the expansion, the host computer moves a strip of data from the permanent compressed image storage to the data RAM of the compression system. For each block of data the corner pixel is first decoded, then the right edge vector, the lower edge vector and the interior block vector are sequentially decoded. This is necessary because the corner pixel is used with the corner pixel of adjacent blocks to form the the predicted right edge vector and the predicted lower edge vector, as previously described. The predicted vector is used to generate the associated reconstructed vector. The reconstructed right edge vectors and lower edge vectors are used, as previously described, to form the predicted interior block vector which in turn is used in reconstruction of the interior block vector. In the first step of the expansion process the adaptive vector decoder decodes each of the coded quantized transform coefficients. The adaptive vector decoder uses six decoding tables, which are based on the six empirically generated Huffman coding tables, and again a predicted mean is used to select the table for decoding of each coefficienta. After a vector is decoded, an inverse quantization process generates a vector of sine transform coefficients. Then an inverse discrete sine transform operates upon the vector of sine transform coefficients to generate an error vector.

The predicted vector for the vector being decoded is formed in the same manner as in the quality retention process and the error vector and the predicted vector are added together to form the reconstructed vector. After each of the blocks in a strip is reconstructed and stored in data memory of the compression system, bilinear interpolation is used to generate any points removed by filtering and sampling in the compression process.

After the strip of data is reconstructed in the memory of the compression system, the strip is passed through a YIQ to RGB converter to generate the red, green and blue pixel data The red, green and blue pixel data are then transferred from the data memory of the compression system to the memory of the frame grabber.

To enhance the speed of the compression and expansion process in the IBM PC XT and IBM PC XT compatible computers, a special circuit was developed which causes the IBM PC XT to transfer data at rates of approximately 900K bytes per second. This transfer rate is more than twice the normal IBM PC XT transfer rate.

While the preferred embodiment of this invention compresses and expands color video images, the compression system and the compression/expansion process of this invention can be used for any information data source such as audio or video signals.

The compression/expansion process of this invention provides greater and better compression than the prior art methods. The segmentation and predictive techniques in conjunction with a discrete sine transform diminish the effect of correlated errors which occur at block boundaries. The method of this invention was optimized for fixed quality compression which provides superior compression over prior art methods which use feedback from a buffer to facilitate fixed rate data transmission over a communication channel.

DESCRIPTION OF THE DRAWINGS

FIG. 10 through FIG. 21 are the schematic drawings of the circuit of this invention.

DETAILED DESCRIPTION

Figure 1:
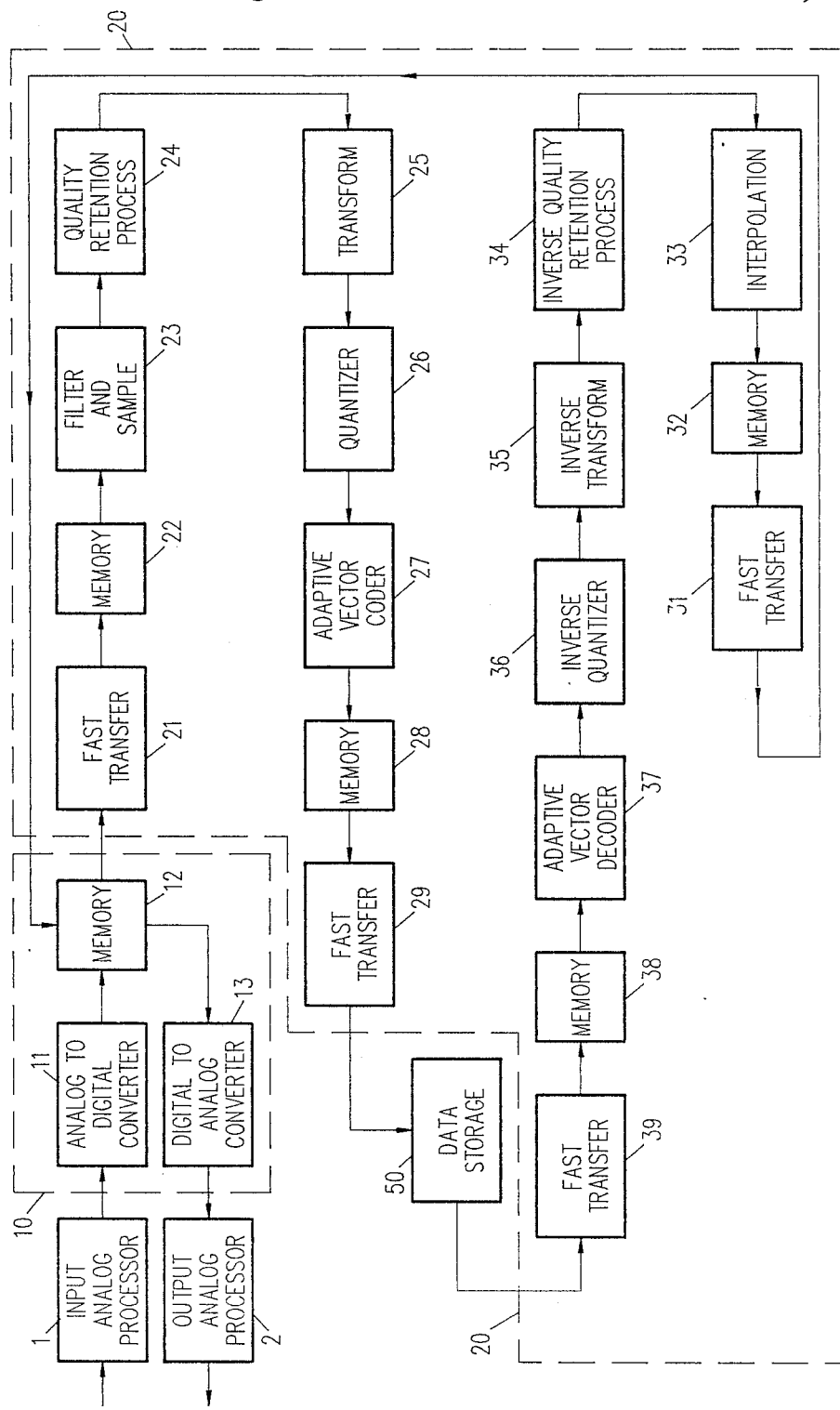
FIG. 1 is a general block diagram of the computer-based information compression system of this invention.

A functional block diagram of the computer-based information compression system of this invention is provided by FIG. 1. An analog processor 1 receives signals from an information source, for example a video image, and generates analog signals which are provided to a analog to digital converter 11. The analog to digital converter 11 performs necessary pre-filtering of the analog signal, performs analog to digital conversion, and creates in a first memory 12 a digital representation of the information received by analog processor 1. The analog to digital converter 11 and memory 12 are part of a frame grabber 10 which is incorporated in a host computer system. For a video image, the digitized information is stored in memory 12 as lines of discrete pixels.

After the image is stored in memory 12 of frame grabber 10, the host computer in conjunction with the compression/ expansion subsystem 20, which is also incorporated in the host computer, performs a a block transfer 21 which provides a strip of 16 lines of data from the digitized frame in memory 12 to a memory 22 in compression/expansion subsystem 20 (compression system). In FIG. 1, several different memories are illustrated in the block diagram of compression system 20. This indicates that data in memory is processed by compression system 20 and then stored in the memory. Hence, there are not multiple data memory units in compression system 20, but rather a single data memory that is used repeatedly.

The filter and sample system 23 defines the resolution of the digitized data that is passed to a quality retention process 24 and if the resolution is reduced, the filter and sample system 23 pre-filters the data to prevent aliasing. The quality retention process 24, as described more completely below, initially processes the data from filter and sample system 23 so as to optimize the compression of the data while maintaining the characteristics of the information so that a quality reconstruction of the compressed data can be performed to yield data equivalent to the initial digital data generated by frame grabber 10.

The quality retention process 24, after initial processing of the data supplies data to a discrete sine transform 25, The coefficients produced by the discrete sine transform 25 are quantized by quantizer 26 and passed to the adaptive vector coder 27. The adaptive vector coder 27 compresses the transform coefficients by assigning Huffman codes to the quantized transform coefficients.

The Huffman coded information is written into memory 28 and subsequently transferred to data storage 50. Subsequent 16 line strips of data of the frame are processed in the same manner until all the lines in memory 12 of frame grabber 10 have been compressed and transferred to data storage 50.

The compression system 20 of this invention also includes means to form the original information, e.g. the image, by reconstruction of the information from the Huffman coded data stored in data storage 50. To reconstruct the image a portion of the compressed data is retrieved from data storage 50 and stored in memory 38 of compression system 20 by a fast transfer 39. The adaptive vector decoder 37 recreates the quantized discrete sine transform coefficients. The transform coefficients are reconstructed by the inverse quantizer 36. Then, the inverse discrete sine transform 35 operates on the transform coefficients to produce the data originally generated by quality retention process 24. Data are further processed by inverse quality retention process 34 to reconstruct the signals that were originally supplied by the filter and sample system 23. Finally, interpolation 33 is used to approximate the data removed by filtering end sampling in the compression process. If the resolution of the original image was reduced by the compression process, linear interpolation is used with the reconstructed data points to generate an image having the same resolution as that of the original image. After the strip of data is reconstructed, a fast transfer 31 is used to move the reconstructed data from memory 32 to memory 12 of frame grabber 10.

Again, the expansion process is repeated until all the compressed data for a frame in data storage 50 has been expanded and moved to memory 12. After the entire reconstructed digital data is in memory 12, the digital to analog converter 13 recreates the original analog signals which are sent to output analog processor 2 which generates the original video image.

While a video image has been used as an example, the compression system of this invention may be used for any information data source such as audio or video signals. However, an analog processor and an analog to digital processor that can reduce the analog signals to a known digital format is necessary. The novel compression system of this invention may be modified by one skilled in the art to compress stored digital data using the features of this invention.

In the preferred embodiment, the input analog processor 1 comprises a color television camera, which provides analog representations of color images to the analog to digital processor and the output analog processor 2 comprises a color television monitor. Accordingly, the invention is described in terms of a color video still image. However, this description is for illustrative purposes only and is not intended to limit the scope of the invention. For example, this invention can compress data generated by an audio digitizer for music, voice or other sounds or digitized black and white video images.

For a color still image, additional processing means are added to the general system of FIG. 1. The analog processor, the color television camera, generates a red analog signal, a green analog signal, and a blue analog signal. The analog to digital converter 11 changes the three analog signals to a frame having a specified number of pixels wherein each pixel has three numbers which vary between 0 and 255. The three numbers for each pixel represent the intensity of the red, green, and blue image components for that pixel. Accordingly, each line of the frame is stored in the memory 12 of frame grabber 10 (FIG. 1) as three N data points where N is the number of pixels for the line. Compression of the color digital frame requires compression of each of the three sets of data wherein each set corresponds to one of the colors red, green and blue (RGB).

In another embodiment, the analog to digital converter converts the analog video signal from the color television camera to luminance, Y, and to chrominance components, I, Q. Each pixel is represented in memory 12 of frame grabber 10 by the three components Y, I, Q. The preferred embodiment is to use a frame grabber which provides the Y, I and Q components for the video image, but most of the currently available color frame grabbers provide only the red, green and blue information for each pixel.

Figure 2:
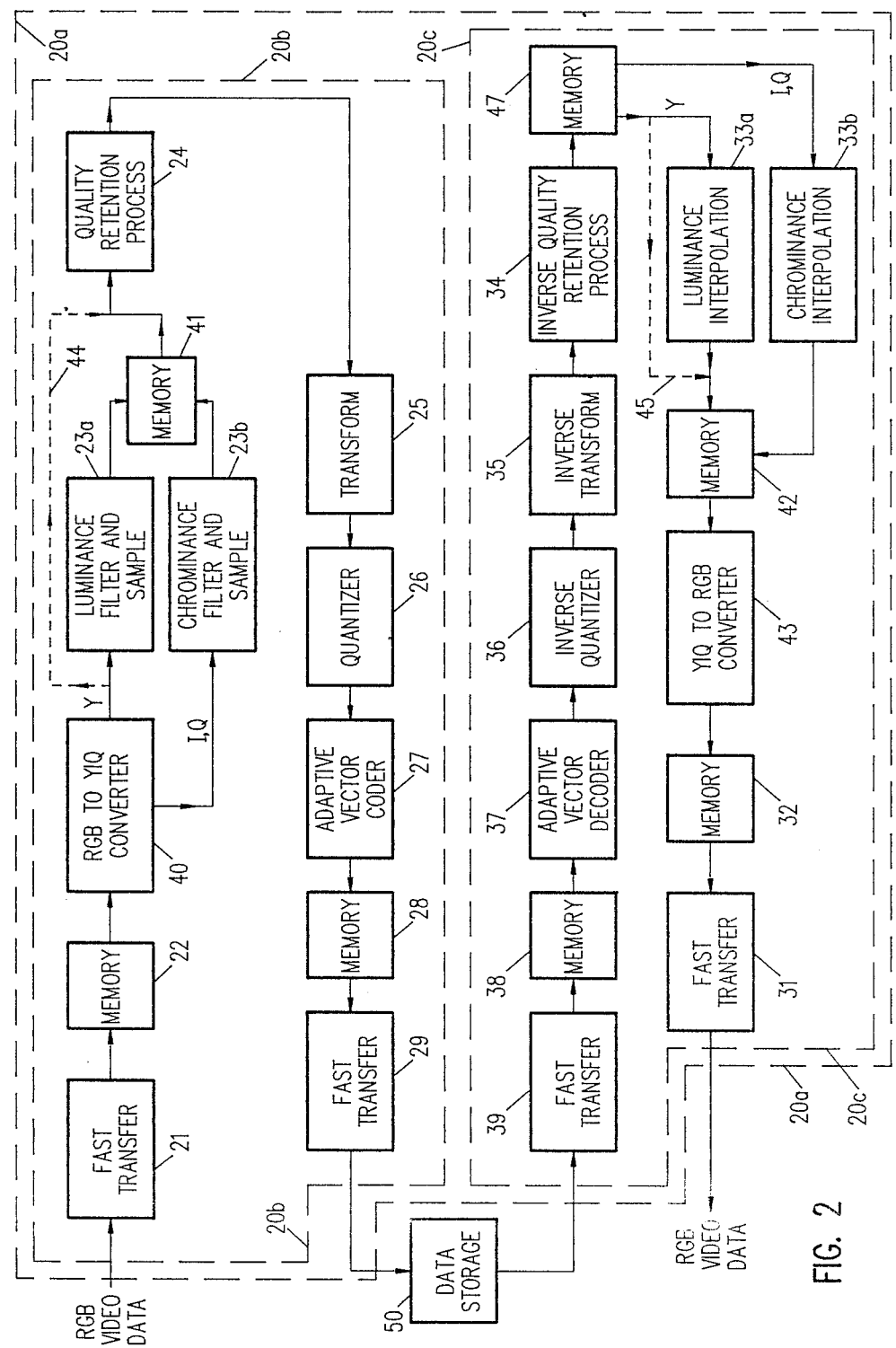
FIG. 2 illustrates a block diagram of the preferred embodiment of the compression subsystem of this invention.

Since the compression system of this invention operates on luminance and chrominance components, a RGB to YIQ converter was added to coding system 20b of compression system 20a in FIG. 2. The block transfer 21 passes the data from memory 12 of frame grabber 10 sixteen lines at a time to RGB to YIQ converter 40 which translates the RGB components to YIQ components. If the frame grabber generates the YIQ components directly, the RGB to YIQ converter 40 is not utilized.

The RGB to YIQ converter 10 also separates the luminance component Y from the chrominance components I, Q. The luminance component Y, which corresponds to the black and white component of the color picture, is more critical to reconstruction of the image after compression than the chrominance components I, Q, because the human eye is more sensitive to errors in the luminance than errors in the chrominance components. Hence, the luminance Y and the chrominance components I, Q are filtered and sampled separately as shown in FIG. 2, but the remainder of coding system 20b is the same as described with respect to FIG. 1. The filtering and sampling is described more completely below.

The decoding system, i.e., the expansion system 20c of compression system 20a in FIG. 2 also has additional components to interpolate the luminance and chrominance data 33a, 33b, and to recombine the luminance and chrominance components and to convert the YIQ data to RGB data 43.

The data compression system of this invention processes a frame of data comprised of lines with each line having pixels. The system operates at normal VCR resolution, 256 lines per frame; TV resolution, 512 lines per frame; or high resolution of 1024 lines per frame. To initiate the compression, the lines of pixel data are moved into the compression system using a fast block transfer 21 as shown in FIG. 2. There are two basic ways to perform a fast block transfer, the direct memory access block transfer and programmed block input/output transfer, which are described in further detail below. The method used depends upon the characteristics of the host computer. In either case, sixteen lines of up to 512 pixels per line are normally transferred from the memory of the frame grabber 10 to the data memory of the compression system in each fast block transfer. If the frame has more than 512 pixels per line, the fast block transfer divides the line into smaller units so that the number of pixels per line is within the capability of compression system 20a.

As explained above, in the preferred embodiment, the color data for each pixel is luminance Y and chrominance I, Q. However, most of the commercially available color digitizers generate RGB data for the pixels, and so the compression system includes a means to transform RGB data to YIQ data. For example, compression system 20a of this invention is compatible with the following frame grabbers: (1) Truevision TARGA 8/16/24/32; (2) Truevision VISTA; (3) Atronics PIB; (4) Chorus PC-EYE; (5) Everex Vision 16; and (6) Matrox MVP-AT. All of these frame grabbers generate RGB data.

There are several transformations which are used to transform the red, green, blue (RGB) data to luminance Y and chrominance I, Q data. The following relationship was used in RGB to YIQ converter 40 to translate the RGB values for each pixel to the YIQ values for the pixel.

$$\begin{bmatrix} Y \\ I \\ Q \end{bmatrix} = \begin{bmatrix} *0.299 & 0.587 & 0.114 \\ 0.596 & -0.274 & -0.322 \\ 0.211 & -0.523 & 0.312 \end{bmatrix} \begin{bmatrix} R \\ G \\ B \end{bmatrix}$$

After the transformation into Y, I, Q components the luminance component Y is separated from the chrominance components I, Q. The luminance Y is passed through a first filter and sample means 23a while the chrominance components I, Q are subsequently passed through a second filter and sample means 23b. Both filter and sample means simultaneously define the resolution of the components and filter the digital data to prevent aliasing. Each of the components after processing by the filter and sample means is compressed.

The functions performed by the filter and sample system for the luminance component Y and the chrominance components I, Q are performed separately, but the function of the two systems are directly related. The filter and sample system operates in two modes. In the first mode, the resolution of the luminance Y is not changed. The luminance data bypasses the filter and sample system 23a as shown by the dashed line 44 in FIG. 2. The chrominance components I, Q are each sampled at a 4:1 ratio in each dimension. Thus, the chrominance sampling provides an initial compression on the total amount of data retained.

The sampling of the chrominance components reduces the sixteen lines of chrominance component I to four lines and the sixteen lines of chrominance component Q to four lines. Further, each line of chrominance data contains only one-fourth the original number of pixels. The filtered and sampled chrominance data are not passed directly to quality retention process 24, but instead the data are temporarily stored in compression system memory 41.

After the compression of the first strip of luminance data, the coded luminance data is stored in data memory 28 of the compression system 20a and then transferred to a temporary buffer in data storage 50 by fast transfer 29. Next, a fast block transfer 21 loads a second strip of 16 lines into the compression system and the luminance is processed in the same manner as the first strip and stored in a temporary buffer in data storage 50. The chrominance components for the second strip are filtered and sampled. The resulting four lines for each chrominance component are also stored in memory 41.

The third and fourth strips of data are processed in a manner similar to the first and second strips. However, after the fourth set of luminance data are stored in the temporary buffer in data storage 50, there are sixteen lines of filtered and sampled chrominance component I and sixteen lines of filtered and sampled chrominance component Q in memory 41. Thus, the sixteen lines of chrominance component I are compressed and stored in memory 28. The coded chrominance component I in memory 28 is then transferred to compressed image data storage in data storage 50. The sixteen lines of chrominance component Q are similarly processed and transferred to compressed image data storage in data storage 50. After the coded chrominance components I, Q are moved to compressed image data storage in data storage 50, the four coded strips of luminance data in the temporary buffer are moved into the compressed image data storage in data storage 50 so that the compressed image data storage contains a 16 line strip of coded chrominance component I data, a 16 line strip of coded chrominance component Q data, and four 16 line strips of coded luminance component Y data. The coding process is then repeated for subsequent 16 line strips of the frame until the entire frame of data is coded and stored in compressed image data storage.

In the second mode of operation of the filter and sample system, the resolution in the initial frame is higher than desired, e.g., the initial frame has 512 lines and only 256 lines are desired. To lower the resolution both the luminance data and the chrominance data are filtered and sampled. The luminance data are sampled on a 2:1 basis in both dimensions. The chrominance components are again sampled on a 4:1 basis relative to the sampled luminance data which means that chrominance components are reduced in resolution by a factor of eight in each dimension.

After filtering and sampling, each of the resulting components are stored in memory 41 and a component is processed only when a sixteen strip line of the component is formed in memory 41. Hence, two strips of luminance data are filtered and sampled and then the resulting data are compressed and stored in the temporary buffer of data storage 50. Eight strips of 16 lines are processed before the chrominance components are coded, stored in memory 28, and transferred to compressed data storage in data storage 50. Finally, the four strips of coded luminance data are again moved from the temporary buffer to compressed data storage.

In both the chrominance sampling 23a and the luminance sampling 23b, the subsampling is performed in combination with low pass filtering of the digital signals. The low pass filtering prevents aliasing. For luminance filtering and sampling, the filter is a (sin X)/X filter with a cut off frequency of one half pi, which is implemented as a seven tap finite impulse response filter. The luminance filter employed in each dimension is:

$$Y_i^F = -0.114779\ Y_{i+3} + 0.0\ Y_{i+2} + 0.344337\ Y_{i+1} + \quad (1)$$

$$0.540883\ Y_i + 0.344337\ Y_{i-1} + 0.0\ Y_{i-2} - 0.114779\ Y_{i-3}$$

where $Y_i^F$ = the filtered luminance for the ith pixel;

$Y_{i+n}$ = the luminance for the ith + n pixel where $$n = (-3, -2, -1, 0, +1, +2, +3).$$

This filter is implemented by applying the center tap to every other pixel first in the horizontal direction and second in the vertical direction. However, this filter may not work near the beginning or end of a line in the horizontal direction or near the beginning or end of a column in the vertical direction because all the luminance terms required by the filter may not be defined. In such cases, the undefined luminance values are set to the value of the pixel which is immediately adjacent to the undefined values. For example, when the center tap is located on the first pixel in a line, so that i=1, the value of the first pixel is used for the $Y_{-2}$, $Y_{-1}$, $Y_0$ terms in the filter. Similarly, the first line of filtered luminance data is repeated three times so as to generate the $Y_{-2}$, $Y_{-1}$, $Y_0$ terms for each column filtered in the vertical direction.

Chrominance subsampling in combination with low pass filtering is performed for all images. The low pass filtering again prevents aliasing. The chrominance filter is a (sin X)/X filter with a cut off frequency of $\frac{1}{2}$, $\frac{1}{4}$, or $\frac{1}{8}$ pi. The preferred embodiment is a filter with a cutoff frequency of $\frac{1}{4}$ pi in each dimension for each chrominance component I and Q and is given by the following expression:

$$I_i^F = 0.064206\ I_{i+3} + 0.136202\ I_{i+2} + 0.192619\ I_{i+1} + \\ 0.213946\ I_i + 0.192619\ I_{i-1} + 0.136202\ I_{i-2} + 0.064206\ I_{i-3} \quad (2)$$

where $I_i^F$ = the filtered chrominance component I for the ith pixel;

$I_{i+n}$ = the chrominance component I for the ith + n pixel where $$n = (-3, -2, -1, 0, +1, +2, +3);$$

An identical expression is applied to the chrominance component Q. Again, the filter is applied in a first direction and then the filter is applied in a second direction to the filtered data.

To implement the chrominance filtering when the luminance resolution is not changed and the chrominance resolution is filtered on a 4:1 ratio. The center tap of the filter, i.e., the tap which operates on the $I_i$ data point in Equation 2, is first centered on the first pixel in the line and the three undefined chrominance values are set equal to the value of the first pixel as described above for the luminance filtering. The center tap of the filter is then moved to the fifth pixel and the filter is again applied, to the ninth pixel where it is again applied, and so forth. This process is repeated in the second direction where again the first line of filtered chrominance data is used three times to generate the terms $I_{-2}$, $I_{-1}$, $I_0$ for each column.

When the luminance resolution is reduced, the filter in Equation 1 is applied so that the center tap is located at every other pixel in the line, and the luminance data points are reduced by one half in both directions. In this situation, the center tap of the chrominance filter is located at every eighth pixel of the chrominance data.

After the initial processing, each filtered and sampled chrominance component and the luminance Y are processed by a quality retention process 24 which is designed to process a 16 line strip of data. Thus, the quality retention process operates in the same manner independent of the particular data being processed.

The quality retention process 24 (FIG. 2) first divides each 16 line strip into blocks 24a (FIG. 4) wherein each block contains 16 rows of 16 pixels. Next, the quality retention process works with each block and further subdivides the block into four regions 24b. The interior block B(1,1), ..., B(15,15), a two dimensional vector, is 15 pixels wide and 15 pixels high. The 1,1 point, which defines the first pixel in the first row of the block and the first pixel in the first column of the block, is the upper left hand corner of the block. The interior block contains all the pixels in the block except the pixels in the right hand column of the block, i.e., the sixteenth column of the block, and those in the lowest row of the block, i.e., the sixteenth row of the block. The right edge vector R(1), ..., R(15) is comprised of all the pixels in the right hand column of the block except the pixel in the lower right hand corner, i.e., the 16,16 point. Similarly, the lower edge vector L(1), ..., L(15) is comprised of all the pixels in the lowest row of the block except for the pixel in the lower right hand corner. The lower right hand corner pixel is called the corner pixel CP.

Figure 3A:
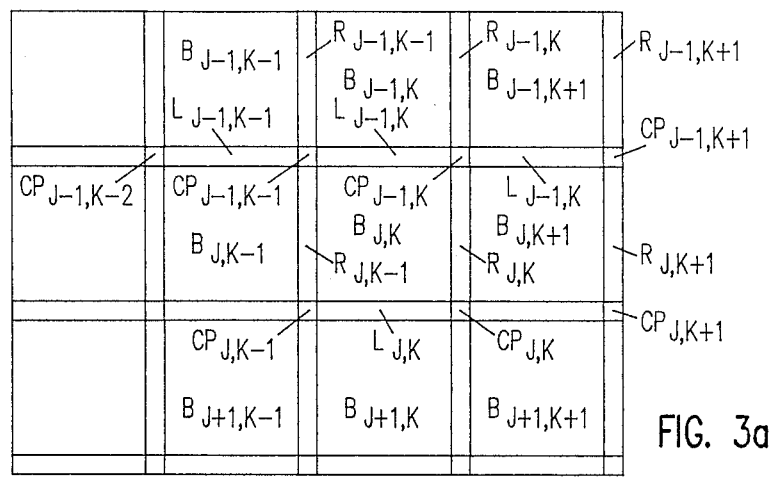
FIGS. 3a through 3c illustrate the implementation of block coding of the quality retention process in this invention.
Figure 3B:
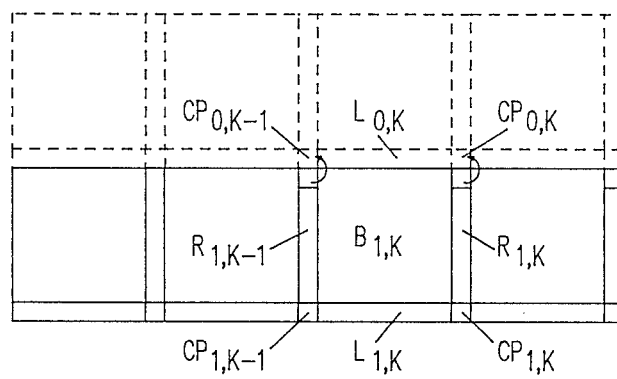
Figure 3C:
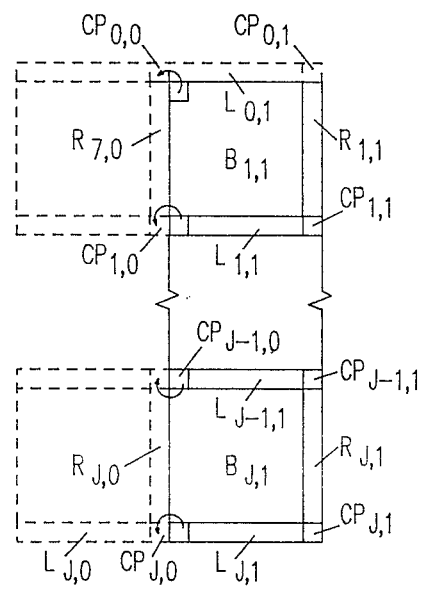

The quality retention process is first described in terms of a general block which is surrounded by blocks on all sides as illustrated in FIG. 3a. The block being processed is the J, K block, and the vector $B_{J,K}$ represents the pixels in the interior block of the J,K block, as described previously. The vector $R_{J,K}$ represents the fifteen pixels in the right edge vector of the J,K block as described previously, and the vector $L_{J,K}$ represents the lower edge vector of the J,K block. The corner pixel for the J,K block is represented by $CP_{J,K}$.

Initially, corner pixel $CP_{J,K}$ is quantized 24c using a uniform quantizer Q0. This step is stage 1 in FIG. 4. In the preferred embodiment, the value of the uniform quantizer Q0 is 1 so that the value of the corner pixel is not changed by the quantization. A fixed number of bits are used to code the quantized value of the corner pixel $CP_{J,K}$. Since the value is unchanged by the quantization step and the value may range between 0 and 255, eight bits are required to code the quantized $CP_{J,K}$ in the preferred embodiment.

If a quantizer Q0 other than 1 is used, $CP_{J,K}$ is quantized by dividing $CP_{J,K}$ by Q0 and rounding the quotient. The quantized value of $CP_{J,K}$ is coded, as described above, using a fixed number of bits consistent with the quantized value and stored in memory 28. The coded value of $CP_{J,K}$ is moved from memory 28 to data storage 50 with the first transfer of a coded sixteen line strip.

To reconstruct the value of $CP_{J,K}$ 24d, the quantized value of $CP_{J,K}$ is retrieved from memory and multiplied by quantizer Q0. The reconstructed value of $CP_{J,K}$ is returned to the original image position in memory 41a of the compression system because $CP_{J,K}$ is used in the quality retention process for the block J,K+1 and the block J+1,K.

Figure 4:
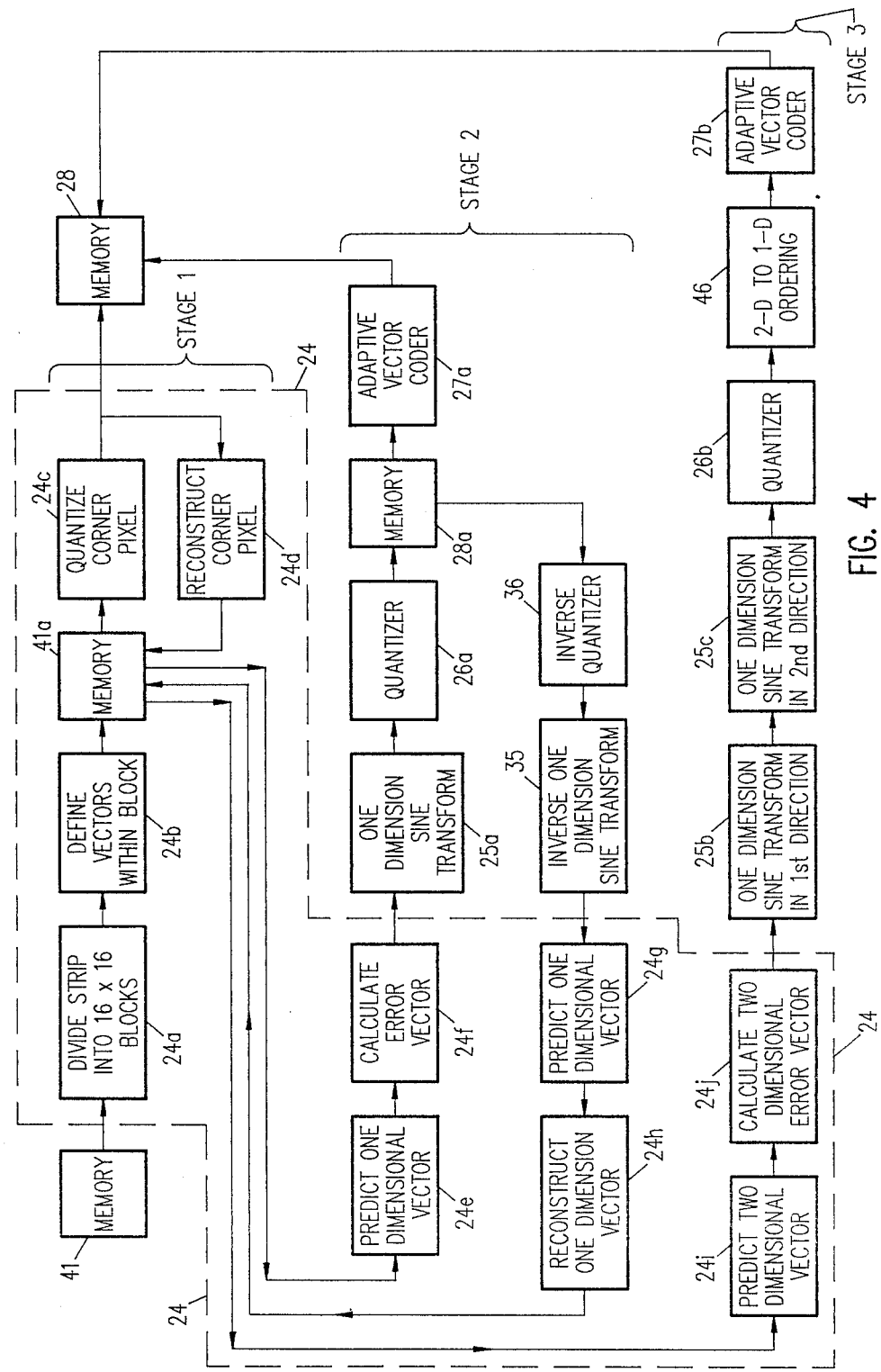
FIG. 4 is a detailed block diagram of the quality retention process of this invention.

The next step in the quality retention process is the compression of the right edge vector $R_{J,K}$ using stage 2 in FIG. 4. The first step 24e is to form a predicted right edge vector $PR_{J,K}(1)$, ..., $PR_{J,K}(15)$. Each element of the predicted right edge vector is a weighted average estimate of the corresponding pixel in the right edge vector $R_{J,K}$. The ith element of the predicted right edge vector is given by:

$$PR_{J,K}^i = \frac{(16-i)CP_{J-1,K} + (i)CP_{J,K}}{16} \quad (3)$$

$i = 1, 2, 3, \ldots, 15$ where

-continued $PR^i_{J,K}$ = prediction of ith pixel in the right edge vector $CP_{J,K}$ = value of corner pixel for block $J,K$ $CP_{J-1,K}$ = value of corner pixel of block $J-1,K$ Hence, the predicted right edge vector is formed using the values of the corner pixel for the J,K block and the corner pixel for the subblock immediately above the J,K block, i.e., the J−1,K block (FIG. 3a).

Next, the right edge error vector 24f, which is comprised of the difference between corresponding values of each pixel in the right edge vector and the predicted right edge vector, is formed as shown in Equation 4.

$$ER^i_{J,K} = R^i_{J,K} - PR^i_{J,K} \quad (4)$$

$i = 1, 2, 3, \ldots, 15$ where $ER^i_{J,K}$ = error in prediction of ith pixel in the right edge vector $R^i_{J,K}$ = actual value of ith pixel in the right edge vector $PR^i_{J,K}$ = predicted value of ith pixel in the right edge vector as given by Eq. (3).

After formation of the right edge error vector, the vector is transformed using a one dimensional discrete sine transform 25a. The calculation of the discrete sine transform coefficients is described more completely below. The coefficients of the discrete sine transform are then quantized by quantizer 26a and coded using adaptive vector coder 27a. In FIG. 4, the one dimensional discrete sine transforms 25a, 25b, 25c, the quantizers 26a, 26b and the adaptive vector coders 27a, 27b are discrete sine transform 25, quantizer 26 and adaptive vector coder 27, respectively, of FIG. 2. The letter suffix is added to the identification number of these elements only to differentiate the steps in the compression process and is not intended to limit the invention to the specific number of elements illustrated.

The quantized transform coefficients are also stored in memory 28a. Again, as previously described, the various memory elements 41, 41a, 28, 28a as shown in FIG. 4 are the same memory and the various elements are shown to illustrate the compression process and not to limit the process by specifying multiple memory elements. The quantized transform coefficients are retrieved from memory 28a and each of the quantized coefficients is reconstructed using the inverse quantizer 36. The inverse discrete sine transform 35 is performed on the reconstructed coefficients. The resulting reconstructed error pixels are added to the predicted vector $PR_{J,K}$ 24g to form a reconstructed right edge vector 24h which is stored in the original image location 41a. This operation is necessary because the right edge vector is used in processing the interior block vector.

The next step in the quality retention process 24 is to form the predicted lower edge vector $PL_{J,K}(1) - PL_{J,K}(15)$ using stage 2 in FIG. 4 again. Each element of the predicted lower edge vector 24a is also a weighted average estimate for the corresponding pixel in the lower edge vector $L_{J,K}$. The ith element for the predicted lower edge vector is given by:

$$PL^i_{J,K} = \frac{(16 - i)CP_{J,K-1} + (i)CP_{J,K}}{16} \quad (5)$$

$i = 1, 2, 3, \ldots, 15$ where $PL^i_{J,K}$ = prediction of ith pixel in the lower edge vector $CP_{J,K}$ = value of corner pixel for block $J,K$ $CP_{J,K-1}$ = value of corner pixel of block $J,K-1$ Hence, the predicted lower edge vector is formed using the values of the corner pixel for the J,K block and the corner pixel for the block immediately to the left of the J,K block, i.e., the J,K−1 block (FIG. 3a).

Next, the lower edge error vector 24f, which is comprised of the difference between corresponding values of each pixel in the lower edge vector and the predicted lower edge vector, is formed as shown in Equation 6.

$$EL^i_{J,K} = L^i_{J,K} - PL^i_{J,K} \quad (6)$$

$i = 1, 2, 3, \ldots, 15$ where $EL^i_{J,K}$ = error in prediction of ith pixel in the lower edge vector $L^i_{J,K}$ = actual value of ith pixel in the lower edge vector $PL^i_{J,K}$ = predicted value of ith pixel in the lower edge vector as given by Eq. (5).

After formation of the lower edge error vector, the vector is transformed using a one-dimensional discrete sine transform 25a. Again, the coefficients of the discrete sine transform are quantized by quantizer 26a and coded using the adaptive vector coder 27a. As in the reconstruction of the right hand edge vector, the quantized coefficients for the lower edge error vector are retrieved from memory 28a and the values for the original image reconstructed in a manner totally equivalent to that described above for the right edge vector.

The final step in the quality retention process 24 is the compression of the interior block as shown in stage 3 of FIG. 4. As for the lower edge vector and the right edge vector, a predicted interior block vector is formed 24i. Each element of the predicted block vector is a two-dimensional weighted average for the corresponding pixel in the interior block vector. The i,j element of the predicted block vector is formed using bilinear interpolation as shown in Equation 7.

$$PB^{i,j}_{J,K} = \frac{(16 - j)\left(\dfrac{(16 - i)L^i_{J-1,K} + (i)L^i_{J,K}}{16}\right)}{16} + \quad (7)$$

$$\frac{(j)\left(\frac{(16-j)R^j_{J,K-1} + (j)R^j_{J,K}}{16}\right)}{16}$$

$i = 1, 2, \ldots, 15$ $j = 1, 2, \ldots, 15$ where $PB^{ij}_{J,K}$ = prediction of $i,j$ pixel in the interior block $L^i_{J-1,K}$ = value of ith term in lower edge vector of block $J-1,K$ $L^i_{J,K}$ = value of ith term in lower edge vector of block $J,K$ $R^i_{J,K-1}$ = value of ith term in right edge vector of block $J,K-1$ $R^i_{J,K}$ = value of ith term in right edge vector of block $J,K$ Hence, the predicted interior block vector is formed using the values of the lower edge vector for the $J-1,K$ block and the lower edge vector for the $J,K$ block as well as the right edge vector for the $J,K-1$ block and the right edge vector for the $J,K$ block.

The error vector $24j$ for the interior block is comprised of the difference between the corresponding values of each pixel in the interior block vector and the predicted interior block vector. The error terms are formed as shown in Equation 8.

$$EB^{ij}_{J,K} = B^{ij}_{J,K} - PB^{ij}_{J,K} \qquad (8)$$

$i = 1, 2, 3, \ldots, 15$ $j = 1, 2, 3, \ldots, 15$ where $EB^{ij}_{J,K}$ = error in prediction of $i,j$ pixel in the interior block vector $B^{ij}_{J,K}$ = actual value of $i,j$ pixel in the interior block vector $PB^{ij}_{J,K}$ = predicted value of $i,j$ pixel in the interior block vector as given by Eq. (7).

After formation of the interior block error vector $24j$, the interior block error vector is transformed using a two-dimensional discrete sine transform. The two-dimensional discrete sine transform is performed by using a one-dimensional discrete sine transform in a first direction $25b$. The transform coefficients generated by the sine transform in the first direction are then transformed in the second direction using the same one-dimensional discrete sine transform $25c$. The quantization of the transformed coefficients for the interior block error vector by quantizer $26b$, the ordering of the two dimensional interior block error vector to a one dimensional vector $46$ and the coding of the quantized transform coefficients using the adaptive vector coder $27b$ are described in more detail below.

The formation of the error vectors for the block $J,K$ utilized the values of the pixels in the line immediately above the first line of the block $J,K$, but the fast block transfer $21$ (FIG. 2) to the compression system only provides sixteen lines and not seventeen lines. Accordingly, as the processing of each sixteen line strip is completed, the data for the sixteenth line is retained in memory for use with the next sixteen line strip. Hence, the error vectors for each block are defined using information from adjacent blocks. Therefore, the coded information for each block is not independent of the information in the adjacent blocks. In the prior art methods, each block was coded independently from the other blocks.

The quality retention process is used for all blocks in the frame. However, for the first sixteen line strip analyzed, there is no line above the first strip, i.e., a zeroth line, to provide the values of the lower edge vector and the right corner pixel in the interpolations described above. Thus, for the first sixteen lines in the frame, the lower edge vector and the right corner pixel for the zeroth line are estimated using the values of selected pixels in the first line of data.

Using the block $1,K$ in FIG. $3b$ as an example of a typical block in the first strip analyzed by the quality retention process, the corner pixel corresponding to $CP_{0,K}$ in FIG. $3a$ is set equal to the upper right hand piece of the block $1,K$, i.e. the first pixel in right edge vector $R_{J,K}$. This estimate of $CP_{0,K}$ is used in Equation 3 to generate the predicted right edge vector for block $1,K$.

The corner pixel corresponding to $CP_{0,K-1}$ in FIG. $3a$ is set equal to the upper right hand pixel of the block $1,K-1$, i.e., the first pixel in right edge vector $R_{1,K-1}$. The lower edge vector $L_{0,K}$ for the $0,K$ block is then created using these values for $CP_{0,K}$ and $CP_{0,K-1}$ in the following equation:

$$L^i_{0,K} = \frac{(16-i)CP_{0,K-1} + (i)CP_{0,K}}{16} \qquad (9)$$

$i = 1, 2, 3, \ldots, 15$

Hence, to process the first strip of data in the quality retention process the lower edge vector for the block immediately above the block being processed in the first strip is estimated using pixels in the first line of the block to estimate the corner pixels for the zeroth line.

For blocks along the left hand edge of the frame, the corner pixels $CP_{J-1,0}$ and $CP_{J,0}$ as well as the right edge vector $R_{J,0}$ of the block $J,0$ must be estimated where the block $J,1$ in FIG. $3c$ is the left most block in a strip. The corner pixel $CP_{J-1,0}$ for the block $J-1,0$ is estimated by using the lower left hand pixel in the block $J-1,1$, i.e., the first pixel in the lower edge vector for block $J-1,1$. The corner pixel $CP_{J,0}$ for the block $J,0$ is similarly estimated by using the first pixel in the lower edge vector $L_{J,1}$ of block $J,1$, i.e., the pixel in the lower left hand corner of the block. The pixels in the right edge vector of block $J,0$ are estimated using $$R^i_{J,0} = \frac{(16-i)CP_{J-1,0} + (i)CP_{J,0}}{16} \qquad (10)$$

$i = 1, 2, 3, \ldots, 15$

The estimated value for $CP_{J,0}$ is used in Equation 5 to form predictions of the lower edge vector for block $J,1$.

The above estimates must be further defined for the first block in each frame (FIG. $3c$) because for this block both the lower edge vector $L_{0,1}$ for block $0,1$ and the right edge vector $R_{1,0}$ for block $1,0$ must be estimated. For these estimates the corner pixel $CP_{0,0}$ is set equal to the first pixel, i.e., the 1,1 pixel in the block, and then the estimates for the lower edge vector $L_{0,1}$ for block 0,1 and the estimates for the right edge vector $R_{1,0}$ for block 1,0 are formed using Eq. 9 and Eq. 10 respectively.

The estimated corner pixels are each coded with 8 bits and stored in memory 28 prior to compression of the first 16 line strip.

The method described above for interpolating along the upper edge of the frame and the left hand edge of the frame has been shown to provide superior results to methods which simply use an average value for each pixel, say 128, along the upper and lower edge and perform the interpolations based upon these values.

In the preferred embodiment, implementation of the discrete sine transform is based upon a discrete sine transform algorithm suggested by P. Yip and K. R. Rao in a paper entitled "A Fast Computational Algorithm For the Discrete Sine Transform," published in IEEE Transactions on Communications, Vol. Com-28, No. 2, pp. 305–307, Feb. 1980. As explained in that paper, the discrete sine transform is faster and requires less multiplications and additions than the discrete cosine transform used in the prior art. Accordingly, not only does the present invention provide a new and better way to compress video still images which results in improved image quality upon reconstruction, but the advantages of the fast discrete sine transform enhance the performance over a similar system which uses the discrete cosine transform.

The discrete sine transform coefficients $X(j)$ are given by $$X(j) = \sum_{i=1}^{15} x(i)\phi_{ij}, \quad (11)$$

$$j = 1, 2, 3, \ldots, 15$$

where $$\phi_{ij} = \sqrt{\frac{2}{N+1}} \sin \frac{(ij\pi)}{N+1}$$

$x(i)$ = ith element of the error vector

Figure 5:
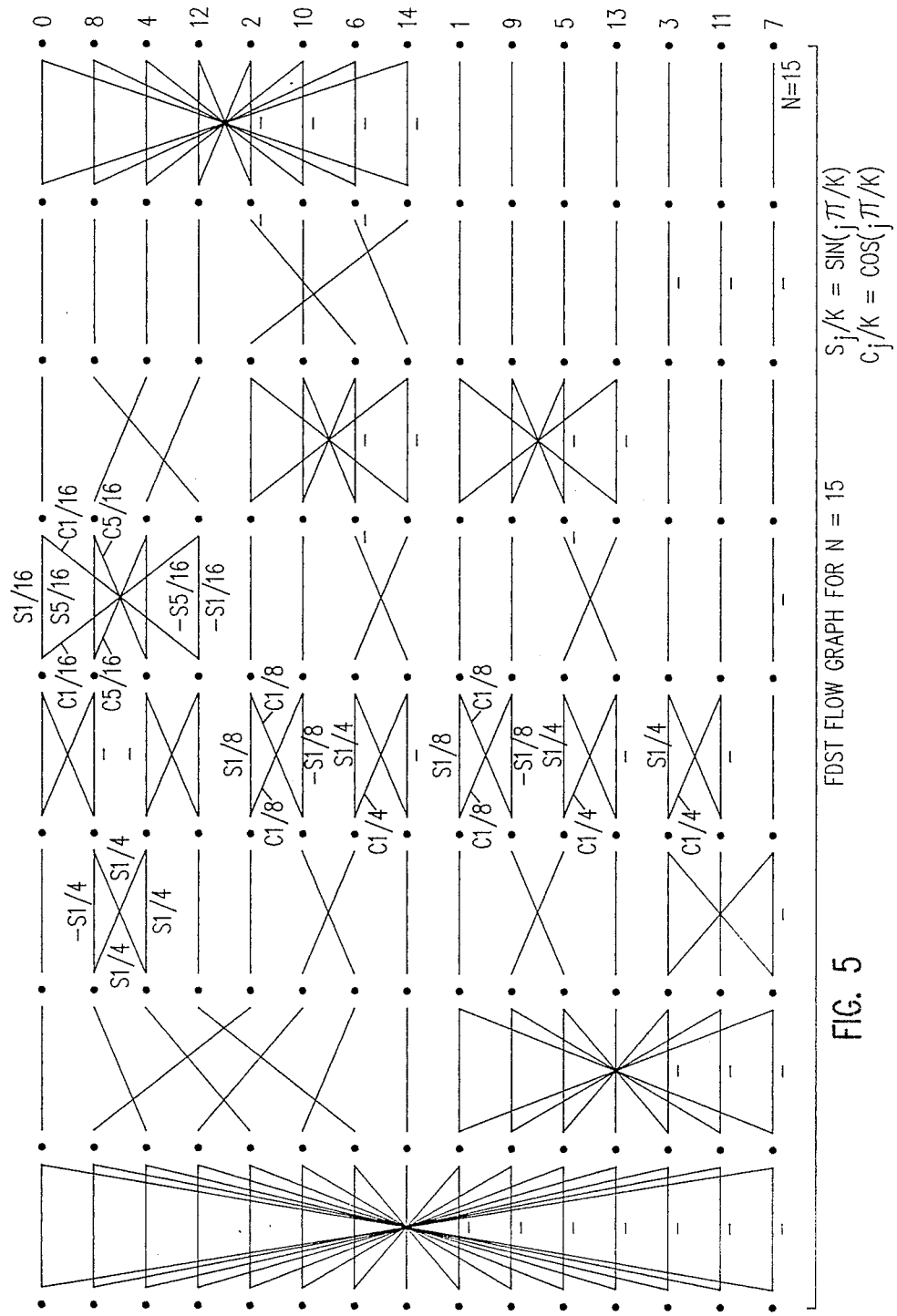
FIG. 5 is a trellis diagram used to implement the discrete sine transform and the discrete inverse sine transform in this invention.

The trellis diagram in FIG. 5 was used to implement the 15 point one dimensional transform. Computation of the transform coefficient is grouped into eight sets of fifteen operations as shown in FIG. 5.

The discrete sine transformation changes the fifteen values in an error vector $x(i)$ into a vector of fifteen transform coefficients $X(j)$. The vector of transform coefficients is quantized using quantizer 26 and coded using the adaptive vector coder 27 (FIG. 2) to provide the data compression. Each transformed Vector is coded by the same method.

The transformed vector is quantized 26 using a variable Q for the particular vector and the quantizer threshold QTHR as shown in Equation 12.

$$QCOEF_i = \text{integer}\left( \frac{|COEF_i - QTHR|}{Q} + 0.5 \right) \quad (12)$$

where $QCOEF_i$ = the ith quantized sine transform coefficient

-continued $COEF_i$ = the ith sine transform coefficient.

The variable Q is given by Q1 for the transform coefficients of the right edge vector and the lower edge vector and by Q2 for transform coefficients generated by the two dimensional discrete sine transform of the interior block.

The actual values of the variables Q1 and Q2 are related to a number which is specified by the user. The user chooses a quality factor which varies between 1 and 100. The value of 1 gives the greatest compression and provides a somewhat lower quality reconstructed image while a value of 100 gives the least compression but a higher overall quality reconstruction of the original image. Accordingly, the user must balance the need for quality in the reconstructed image against the available storage space for the compressed data base. The variable Q2 is defined as:

$$Q_2 = 3(100 - \text{Quality}) + 1 \quad (13)$$

The variable Q1 defaults to:

$$Q_1 = \{2.67\ Q_2\} \quad (14)$$

unless the value of $Q_2$ equals one. If $Q_2$ equals one, then $Q_1$ is also taken as one.

In a preferred embodiment, the quantizer threshold QTHR is the variable Q divided by 4 so that Equation 12 becomes $$QCOEF_i = \text{integer}\left( \frac{|COEF_i|}{Q} + 0.25 \right) \quad (15)$$

Using Equation 15, it is easy to see that the quantization is variable because coefficients having an absolute value between 0 and 0.74 Q are assigned the coefficient 0, numbers between 0.75 Q and 1.74 Q are assigned the coefficient 1, numbers between −0.75 Q and −1.74 Q are assigned the coefficient −1, numbers between 1.75 Q and 2.74 Q are assigned the coefficient 2, and so forth. The sign of the coefficient is retained for all non-zero coefficients and thus the quantization interval around zero is 1.5 Q wide and all other intervals are Q wide.

This quantization was chosen to produce more zero coefficients which in turn improves coding efficiency. In the preferred embodiment, each of the quantized sine transform coefficients comprises a sixteen bit character having 1 sign bit and 15 bits of magnitude.

After the quantization of the coefficients, the quantized coefficients are coded. However, the coding process is designed for a one dimensional vector. While the quantized transform coefficients for the right edge error vector and the lower edge error vector are one dimensional, the quantized transform coefficients for the interior block error vector are two dimensional. Hence, the quantized two dimensional transform coefficients are ordered to form a one dimensional vector. The ordering is accomplished by following the diagonal path illustrated in FIG. 7.

The one dimensional vector of quantized transform coefficients is coded using multiple Huffman code tables. A predicted mean $PM_K$ for the K+1 term in the vector is calculated, as described below, using the Kth term of the vector and the predicted mean $PM_{K-1}$ for the Kth term in the vector. The predicted mean is used to select one of the six Huffman code tables as shown in Microfiche Appendix B, which are incorporated herein by reference. In general, the calculated predicted mean $PM_K$ is used to select the Huffman code table for quantized coefficient K+1, $PM_{K+1}$ is used to select the Huffman code table for quantized coefficient K+2, and so forth.

The six Huffman code tables of Microfiche Appendix B were calculated using empirical methods. A group of color video images were processed using the compression process of this invention. Each image was processed using the quality retention process above, a discrete sine transform was performed and the quantized sine transform coefficients were coded using the predicted mean calculated for each coefficient. Predicted mean thresholds used for table selection were adjusted so that the probability of selecting any given table was one sixth, i.e. there is an equal probability of choosing any one of the tables.

Since the distribution of quantized transform coefficients are peaked near zero, the initial boundaries for the six tables had a logarithmic distribution. The boundaries were adjusted by trial-and-error until the specified boundaries were achieved. Hence, the procedure to determine the distributions for each Huffman code table and the probabilities of falling within a given range of the distribution were determined using the compression scheme of this invention to generate a large number of predicted means and then grouping the means into six equal probability groups.

Figure 6:
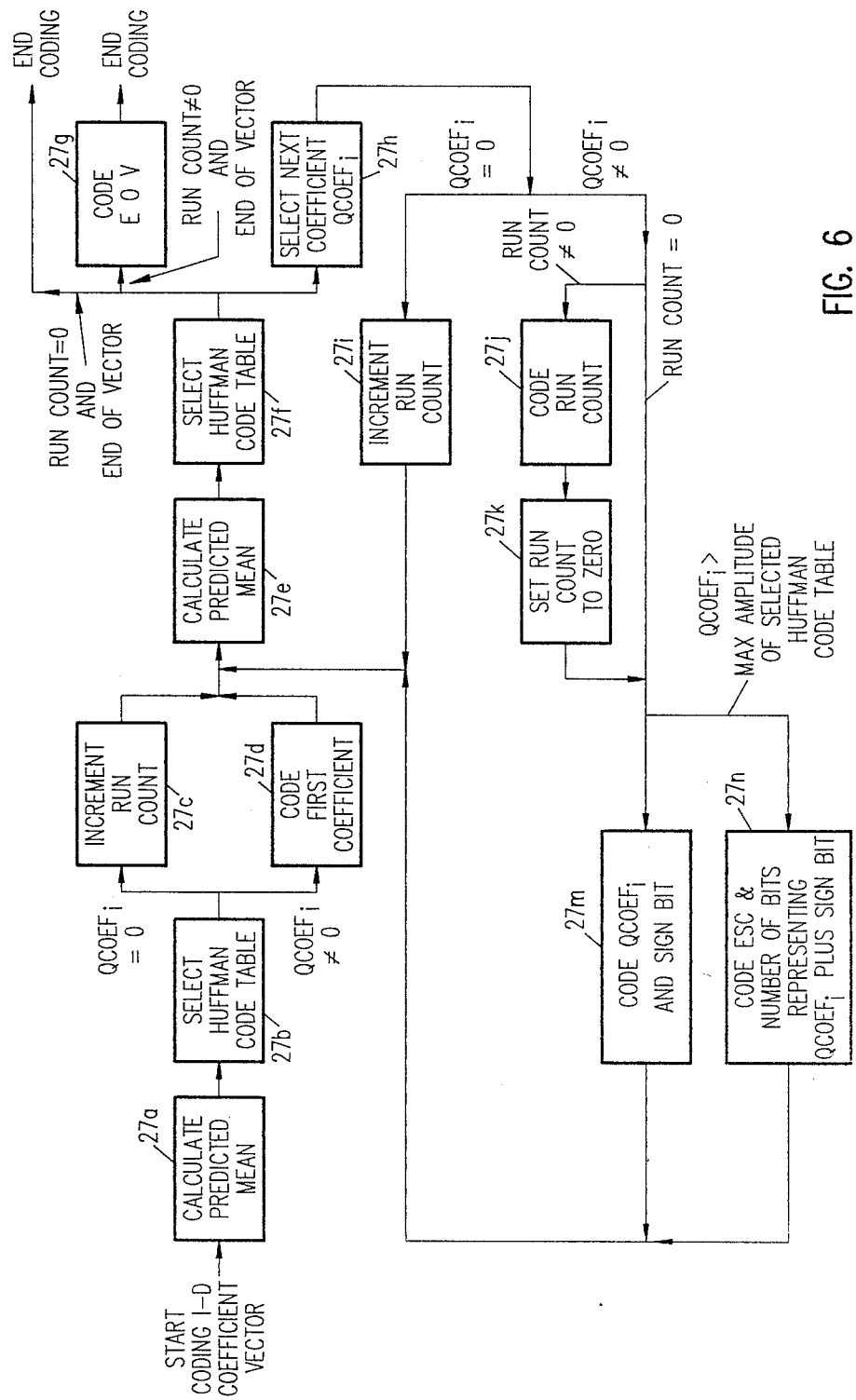
FIG. 6 is a block diagram of the adaptive vector coder of this invention.

The first step in coding a one dimensional vector of quantized transform coefficients is to compute the initial value of the predicted mean $PM_0$ 27a (FIG. 6) that is used to select the Huffman code table 27b for the first member in the vector. The initial value of the predicted mean $PM_0$ is calculated using:

$$PM_0 = PMINIT/Q \qquad (16)$$

where $Q = Q_1$ for the quantized transform coefficients of the right edge error vector and the quantized transform coefficient of the lower edge error vector;

$Q = Q_2$ for the quantized transform coefficient of the interior block error vector.

In a preferred embodiment, PMINIT is taken as 512. Conceptually, PMINIT is a constant which is approximately equal to the mean value of the first quantized coefficient amplitude $QCOEF_0$ when Q=1. This constant was also determined empirically. To determine the value of PMINIT, approximately 25 video images were digitized as described above and the mean amplitude of the first coefficient $QCOEF_0$ was determined. Actually, each block has three values of $QCOEF_0$ associated with each of the three components which are generated in the compression of the block. The images were chosen to represent a cross section of the images that are typically encountered in digitization. After the coefficients $QCOEF_0$ were determined for the selected images, the total number of coefficients were added together and divided to define PMINIT.

After calculation of $PM_0$, the Huffman code table is selected by determining which table has boundaries that include the calculated value of $PM_0$. If the first coefficient is zero, the zero run count is incremented 27c. If the first coefficient is not zero, the selected Huffman code table is used to code the first coefficient amplitude 27d and the sign for the first coefficient is coded with an additional bit.

After the coding of the first coefficient in the vector, the predicted mean is calculated 27e using the following relationship:

$$PM_K = \tfrac{1}{4} QCOEF_K + \tfrac{3}{4} PM_{K-1} \qquad (17)$$

where $PM_K$ = the predicted mean for the $K + 1$ quantized transform coefficient;

$QCOEF_K$ = the value of the Kth quantized coefficient; and $PM_{K-1}$ = the predicted mean for the Kth quantized transform coefficient.

The Huffman code table 27f having boundary thresholds which bracket the calculated predicted mean is selected for coding the next coefficient in the vector.

If the next quantized coefficient $QCOEF_K$ is zero the run count, i.e. the count of the number of consecutive zeros, is incremented 27i and the value of the predicted mean 27e for the next coefficient is calculated.

If the quantized coefficient $QCOEF_K$ is non-zero and the run count is also non-zero, the repeat code is coded 27j using the selected Huffman code table 27f and the run count is set to zero 25k. The amplitude of the quantized coefficient is then coded 27m using the selected Huffman code table 27f as previously described. However, if the amplitude is too large to have a corresponding code in the selected code table 27n, then an escape ESC is coded followed by a fixed number of bits which represents the amplitude of the quantized coefficient. For any non-zero coefficient, an additional bit is coded to represent the coefficient sign. Finally, the new predicted mean 27e is calculated using Equation 17 for the next coefficient.

If the quantized coefficient is not the last one in the vector this process is repeated until the final term in the vector is reached. If the final coefficient is zero, then a EOV is coded 27g using the code table selected using the predicted mean.

After a 16 line strip is coded, the coded strip is moved by a fast block transfer, as previously described, to data storage 50.

The compression system of this invention also includes means for retrieving a compressed image from the compressed image data storage 50 (FIG. 2) and reconstructing the data so that it may be moved into the memory of frame grabber 10, shown in FIG. 1. The process is the expansion, sometimes called decoding, of the compressed data. The precise calculation performed in each of the expansion steps is simply the inverse of the operation described in the coding of the compressed data. In the block transfer from data storage 50, one strip of coded quantized chrominance component I data, one strip of coded quantized chrominance component Q data and one strip of coded quantized luminance data are sequentially moved into data memory 38 (FIG. 2) of the compression system 20 and then expanded. For each block of compressed data within a strip, the coded corner pixel, the coded quantized transform coefficients in the right edge error vector, in the left edge error vector, in the interior block error vector are sequentially processed in the order given. For each of the vectors the decoding process is similar.

Figure 8:
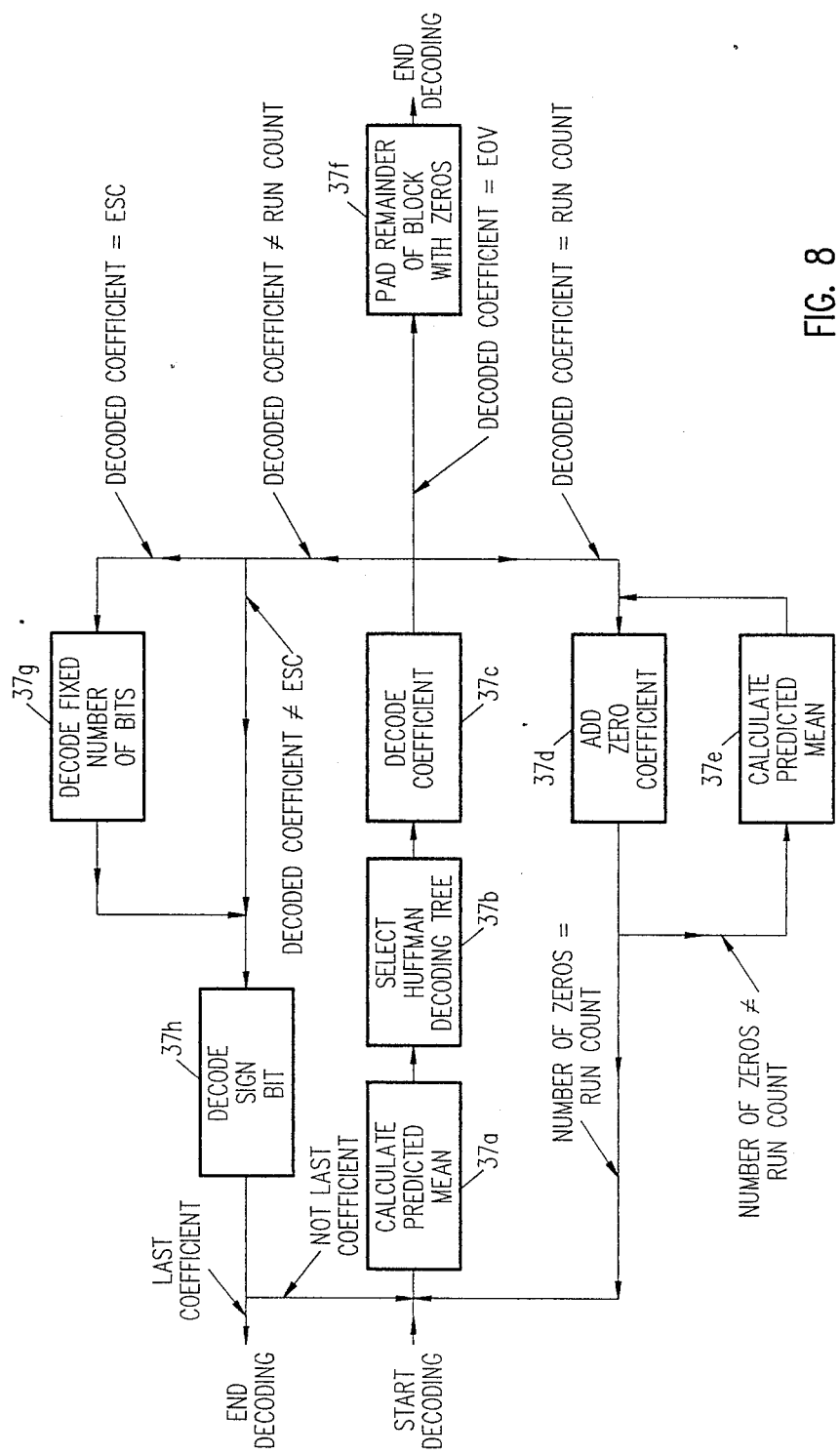
FIG. 8 is a block diagram of the adaptive vector decoder of this invention.

The adaptive vector decoder 37 (FIG. 2 and FIG. 8) uses the predicted mean to select a Huffman decoding tree for decoding each term of a vector. The Huffman decoding trees which correspond to the six Huffman coding tables are also shown in Microfiche Appendix B and are incorporated herein by reference. The boundaries for the decoding trees are the same as those for the coding tables. Thus the value of $PM_0$, as previously defined in Eq. 16, is used to select the first Huffman decoding tree and the first coefficient in the vector is decoded using the first value of the selected Huffman decoding tree. Then the decoded coefficient and the value of $PM_0$ are used to form the next value of the predicted mean using Equation 17 and the next Huffman coded coefficient is decoded using the Huffman decoding tree selected by the predicted mean. If a zero run count is decoded, then the specified number of zeroes are added to the vector and the predicted mean is calculated using each of the zeroes so that the value of the predicted mean remains in phase with the term being decoded. This process is continued until all the quantized coded coefficients have been decoded using the Huffman decoding trees.

After the quantized coded vectors are decoded the inverse quantization process 36 is performed. The inverse quantization is given by:

$$|COEF_j| = integer\{Q \bullet QCOEF_j + QTHR + 0.5\} \quad (18)$$

where the terms in this equation are defined as in Equation 12. In Equation 12 and in Equation 18, the constant, 0.5, has been added for rounding prior to converting the calculated number to integer. The decoded sign bit for the inverse quantized coefficient is then applied to the coefficient generated by Equation (18) to complete the inverse quantization process. After the inverse quantization process 36, a vector has been generated containing the discrete sine transform coefficients. Accordingly, an inverse discrete sine transform 35 is performed. The inverse discrete sine transform is given as:

$$x(i) = \sum_{j=1}^{15} X(j)\phi_{ji} \quad (19)$$

$$i = 1, 2, 3, \ldots, 15$$

where the terms in Eq. 19 have the same definitions as the terms in Eq. 11. The trellis diagram in FIG. 5 is again used to implement the inverse sine transform.

The inverse sine transform generates a reconstructed error vector. Prior to processing the coded right edge error vector, the coded lower edge error vector, or the coded interior block error vector, the coded corner pixel was retrieved from memory 38, decoded and placed in memory 47. Thus, the appropriate decoded corner pixels are retrieved from memory 47 and the appropriate one-dimensional predicted vector is formed using Equation 3 if the right edge vector is being decoded and Equation 5 if the lower edge vector is being decoded. If the block being decoded is in the first strip or the first column of blocks, then the required corner pixels are estimated in a manner identical to that previously described in the coding process. After formation of the predicted vector, the predicted vector is added to the reconstructed error vector to create the reconstructed one-dimensional vector.

After reconstruction of the right edge vector and the lower edge vector using the above process, the coded interior error block is decoded using a similar process. Since the coded interior error block vector was a one-dimensional vector, the vector is decoded 37 (FIG. 2) in a manner identical to that for the lower edge vector and the right edge vector and the inverse quantization process 36 is similarly performed.

Figure 7:
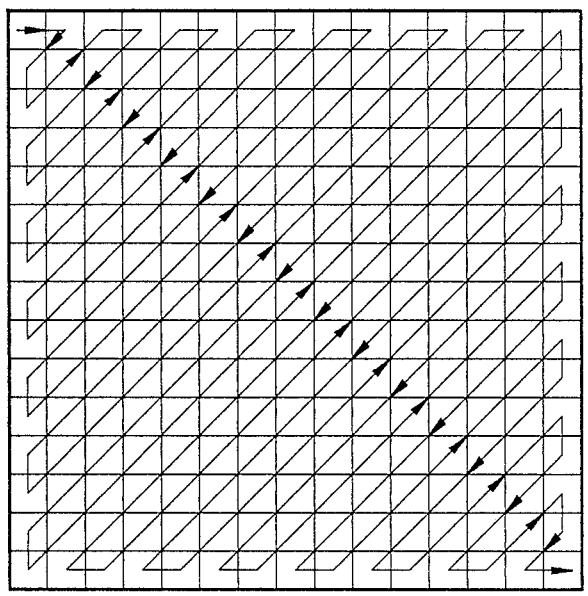
FIG. 7 illustrates the diagonal ordering of the two-dimensional interior block error vector.

However, prior to performing the inverse discrete sine transforms 35, the one-dimensional vector is converted to a two-dimensional vector using the path shown in FIG. 7. After the two-dimensional vector is formed a one-dimensional inverse sine transform is performed in the second direction and a one-dimensional inverse sine transform is performed in the first direction.

Next, the reconstructed right edge vector and the reconstructed lower edge vector, along with the reconstructed right edge vector for the block preceding the current block, the reconstructed lower edge vector for the block above the current block, which was retained in the memory just as in the original coding process, are used to form the predicted interior block vector using Equation 7. After the predicted vector is formed, the reconstructed error vector is added to the predicted interior block vector to form the reconstructed interior block vector.

The reconstruction process proceeds somewhat differently from the coding process, because the chrominance data for a 16 line strip are decoded first and then the luminance component for that strip is decoded.

As the data for each 16 line strip is reconstructed, the reconstructed data is stored in memory 47. The reconstructed chrominance components I, Q for each 16 line strip are passed through chrominance interpolator 33b which uses bilinear interpolation to replace the pixels that were removed in filter and sample step 23b during coding of the data. The interpolation used is given by Equation 20 in the vertical direction and then equation 21 in the horizontal direction.

$$P_{i+k,j} = \frac{(n-k)P_{i,j} + (k)P_{i+1,j}}{n} \quad (20)$$

$$k = 1, 2, \ldots, n-1$$

where $P_{i+k,j}$ = the kth interpolated pixel between reconstructed pixels $P_{i,j}$ and $P_{i+1,j}$ $P_{i,j}$ = the i,j reconstructed pixel $P_{i+1,j}$ = the $i+1,j$ reconstructed pixel $n-1$ = the number of pixels to be added between reconstructed pixels $P_{i,j}$ and $P_{i+1,j}$ $$P_{i,j+k} = \frac{(n-k)P_{i,j} + (k)P_{i,j+1}}{n} \quad (21)$$

$$k = 1, 2, \ldots, n-1$$

where

-continued $P_{i,j+k}$ = the kth interpolated pixel between reconstructed pixels $P_{i,j}$ and $P_{i,j+1}$ $P_{i,j}$ = the i,j reconstructed pixel $P_{i,j+1}$ = the i,j + 1 reconstructed pixel $n - 1$ = the number of pixels to be added between reconstructed pixels $P_{i,j}$ and $P_{i,j+1}$ If the resolution of the luminance was not changed in the coding process, then the reconstructed luminance strip is passed directly to memory 42 as shown by dotted line 45 in FIG. 2. However, if luminance filter and sample process 23a was used in coding the compressed data and the original luminance resolution is desired, the reconstructed luminance data is processed by luminance interpolation 33a. Luminance interpolation 33a also used Equations 20 and 21 to generate the values for the additional pixels.

After the luminance and chrominance components are defined for each of the pixels in the final frame, the pixels in the chrominance and luminance data for each pixel in the strip are combined and the data is passed through a YIQ and RGB converter 43 to change the luminance and chrominance data into red, green and blue data. The YIQ to RGB transformation is given in Equation 22.

$$\begin{bmatrix} R \\ G \\ B \end{bmatrix} = \begin{bmatrix} 1.000 & 0.956 & 0.621 \\ 1.000 & -0.272 & -0.647 \\ 1.000 & -1.106 & 1.703 \end{bmatrix} \begin{bmatrix} Y \\ I \\ Q \end{bmatrix} \quad (22)$$

The compression/expansion process of this invention provides greater and better compression than the prior art methods. The segmentation and predictive techniques in conjunction with the discrete sine transform diminish the effect of correlated errors which occur at block boundaries. The errors are moved into the center of the blocks where they are less detectable. Further, since the method is not designed for real time data transmission, the quantized value may be fixed for a given image. This provides superior compression over prior art methods which used feedback from a buffer to control the compression and the problem of interfacing asynchronous compression with a synchronous real-time data transmission channel is not relevant. Therefore, the method of this invention was optimized for fixed-quality compression rather than compression that facilitates fixed-rate data transmission over a communications channel.

In the prior art, video compression systems have implemented the compression process using hardware. Hardware was selected for the implementation because the signal processors available were slow compared to the processing time of a hardware based system. However, with new signal processors, which can multiply and accumulate in approximately 100 nanoseconds, a hardware implementation of the compression process is unnecessarily restrictive. A hardware compression system is limited to compression via the process implemented in the hardware, but a compression system which uses software can be modified by changing only the software when or if changes to the compression process are necessary. Accordingly, the compression system of this invention is implemented using circuitry for interfacing with a host computer and for providing data to a signal processor which uses the assembly language program in Microfiche Appendix A, which is incorporated herein by reference, to perform the compression of the data.

Figure 9:
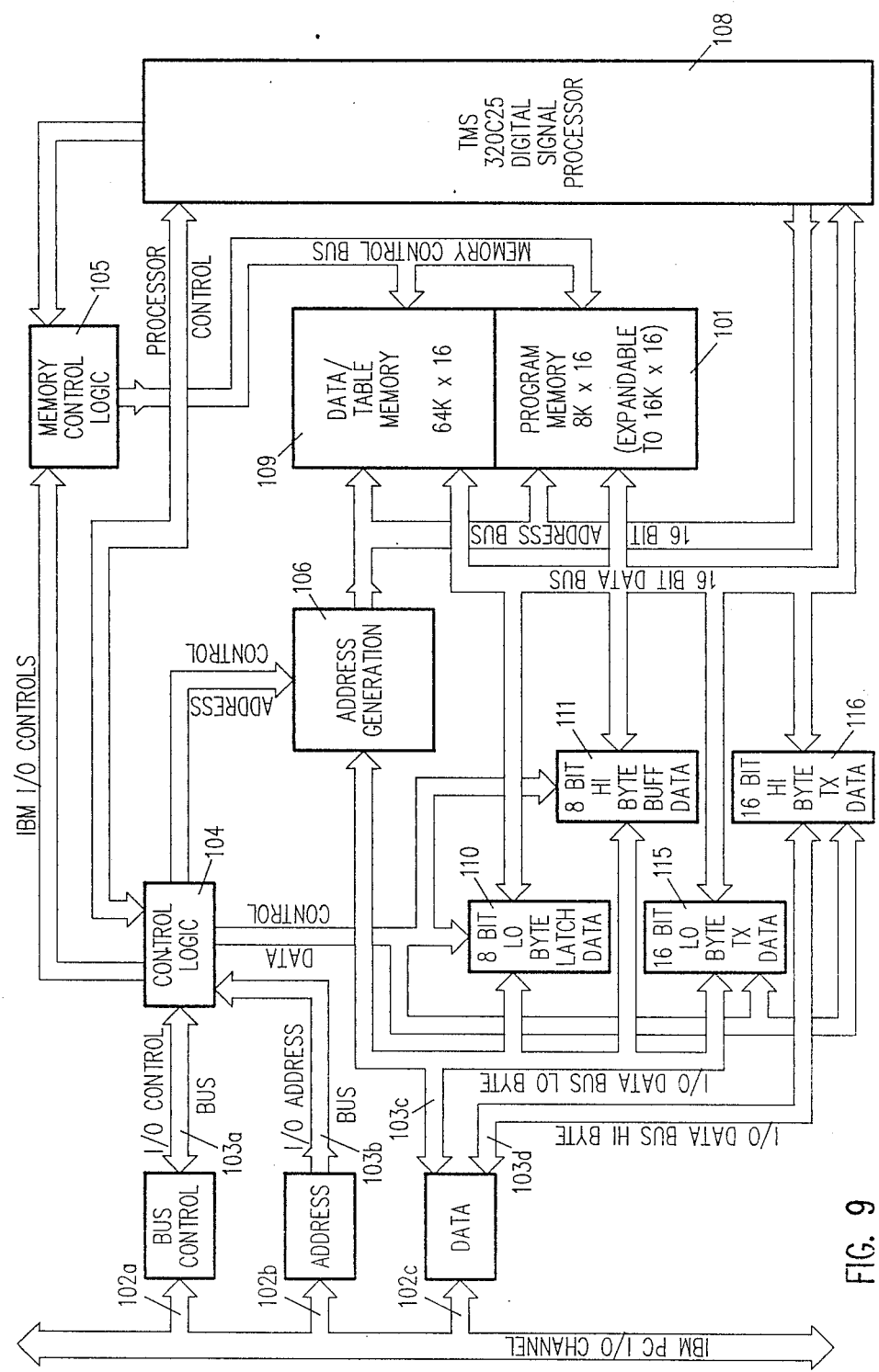
FIG. 9 is a general block diagram of the circuit of this invention as used in a computer having an 8-bit or 16-bit data bus.

More specifically, FIG. 9 illustrates a block diagram of the compression system of this invention which can be used in an IBM PC XT or compatible computer. In FIG. 9, the program which implements the compression process is stored in the program memory 101, which is an 8K×16 static RAM. The host computer provides signals on a I/O data bus 102c, an I/O address bus 102b, and an I/O control bus 102a. These busses are interfaced to the control bus 103a, the address bus 103b and the data bus 103c of the compression system. While data bus 103c, as shown in FIG. 9, carries eight bits, the compression system includes means 103d, 115, 116 for interfacing with a 16 bit data bus which is described later. The signals provided by the host computer over the I/O control bus and the I/O address bus are processed by a control logic system 104 which in turn provides signals to a memory control circuit 105, to an address generation circuit 106 to a 8-bit low byte latch 110, to a 8-bit high byte buffer 111, to a 16-bit LO byte Tx data 115, to a 16-bit HI byte Tx data 116 and to signal processor 108.

The host computer initiates a data transfer to and from the compression system, while the signal processor 108 of the compression system interfaces only with data memory 109, and the program memory 101. When the host computer transfers data to or from the compression system, the signal processor 108 address, data and control busses are tri-stated.

To initiate a data transfer to or from the compression system, the host computer initializes the compression system by providing signals on the I/0 address and data bus of the host computer. The host computer provides Over the data bus 103c an initial address in the memory 109 of the compression system for storing or retrieving the first byte of data. The host computer also generates signals over the control bus 103a, and the address bus 103b which control operation of logic circuit 104. In response to the signals from the host computer, the control logic circuit 104 generates signals to the address generation circuit 106 which cause the address circuit to latch the initial address. When the host processor accesses signal processor memory, the control logic circuit 104 generates signals which cause the signal processor 108 to go tri-state.

After the initialization of the address generation circuit 106 the host computer starts the data transfer over the data bus. For host computers which have an 8 bit data bus, the data must be configured for the 16 bit structure of the compression system. Hence, the control logic circuit 104 controls the address generation circuit 106 and the memory control circuit 105 using signals provided over the control bus 103a so that the data is alternatively supplied or taken from the memory 109 through the high byte buffer 111 and the low byte latch 110. Simultaneously with alternating between latch 110 and buffer 111, the memory control circuit 105 enables the appropriate section of memory so that valid data is written into memory 109 or taken from memory 109 and the address generation circuit 106 increments the address for memory 109. While a transfer to and from data memory 109 was described here, a similar process is used to load either the compression process or expansion process into program memory 101.

The control logic circuit 104 provide signals which the host computer can interrogate to determine the status of the transfer to or from the compression system. When the transfer is complete, the control logic circuit 104 generates signals, which cause the host computer to release control of the busses.

After the data transfer, the signal processor 108 takes control and expands or compresses the data in memory 109 using Huffman coding or decoding tables in memory 109 and the process, described previously, which is stored in program memory 101. The processed data is stored in memory 109 for subsequent transfer by the host computer. After a compression or expansion has been completed, the signal processor raises a flag which can be read through the status register indicating that the current process is completed and the signal processor is again available for either compression or expansion.

The interface of the host computer and the compression/ expansion system is controlled by a program in the host computer. The C language program used in this invention is given in Appendix C and is incorporated herein by reference. As described above, the primary purpose of the program is to transfer data from the frame grabber board 10 as shown in FIG. 1 to the compression system 20. In addition, the program provides a user interface with the compression system and a means for initializing and configuring the compression system to perform either a compression or an expansion. The size of the program memory in compression/ expansion system 20 prevents simultaneously loading both the process for compression of the data and the process for expansion of the data. Thus, the compression process or the expansion process is loaded into program memory 101 and the system is initialized for the appropriate function.

The initial step in the compression process is for the program in the host computer to load the compression program, the expansion program, the Huffman code tables, the decoding tables, and the table used to order the two dimensional interior block vector as a one dimensional vector into the memory of the host computer. Next, the program interfaces with the user so that the user can specify the quality, as defined previously. The user specified quality is used to calculate the quantization factors $Q_1$, and $Q_2$, as defined above. After calculating the quantization factors, the host computer program loads the compression program code into the program memory of the compression system, and the 2D to 1D ordering table. The Huffman code tables are loaded into the data memory of the compression system.

Then the parameters which describe the data in the memory of the frame grabber, the filtering and subsampling of the luminance and chrominance data and the quantization factors are loaded into pre-defined locations within the data memory of the compression system by the program in the host computer. Thus, the host computer program has initialized the compression system so that it is ready to receive data by a fast transfer and start the compression of each 16 line strip.

However, prior to initiating the compression of the frame, the compression system requires further initialization. First, as described above, the filtering of the chrominance data requires the generation of three lines of data above the first line of the first strip so that the terms in the seven tap finite impulse response filter are defined when the filter is applied on the first line of the data. Therefore, the program in the host system loads four lines of data into the data memory of the compression system so that the vertical filter can be preloaded. Also at this time the compression parameters are written as a header of compressed image storage in data storage 50. After the compression system preloads the vertical filter, the compression system is ready to perform the compression process as previously described, and the host computer program transfers sixteen lines of RGB data from the frame grabber board to the data memory of the compression system and issues a compress command.

The compression system then takes control and compresses the sixteen lines of luminance data and subsamples and filters the chrominance components using the process previously described. After the compression of the luminance data, the host computer program again takes control and transfers the compressed luminance data from the data memory of the compression system to a temporary buffer in the data storage 50 as previously described. This cycle is repeated three more times, i.e., the host computer program supplies sixteen lines of RGB data from the frame grabber board, issues another compress command and after compression moves the 16 line strip of compressed luminance data to the temporary buffer in data storage 50.

After the fourth strip of compressed luminance data is transferred to the temporary buffer, the host computer issues a compress-no data command and the compression system then processes the filtered and subsampled chrominance component I data, which now comprises a sixteen line strip. After compression, the host computer program transfers the compressed chrominance component I data to the compressed image buffer. The computer program then issues another compress-no data command and the compression system processes the sixteen line strip of filtered and subsampled chrominance component Q data. After the data is compressed, the host computer program transfers the compressed chrominance Q data to the compressed image buffer. The host computer program then moves the four sixteen line strips of compressed luminance data from the temporary buffer to the compressed image storage in data storage 50 so that the luminance data is located after the compressed I and Q data.

The host computer program repeats this cycle, i.e., initiates the transfer and compression of four more strips of sixteen lines from the frame grabber memory and issues two compress-no data commands and stores the compressed data, as described previously, until the entire frame of data in the memory of the frame grabber has been compressed.

The frame in the frame grabber memory has 480 lines which is divisible by 16 so that the luminance data are completely processed by the above method. However, 64 lines of data, i.e. 4 strips, are required to generate one 16 line strip of chrominance data. Thus, when the 480 lines are processed, the strips of chrominance data in the data memory of the compression system contain only 8 lines because 480 is not divisible by 64. To complete the processing of the chrominance data, the program in the host computer generates two strips of grey RGB data which are processed by the compression system. Thus, after filtering and sampling, the chrominance components have the 16 lines necessary for processing by the compression process and all the data from the frame grabber memory is processed by the compression system.

As explained above, both the compression process and the expansion process cannot be loaded in the compression/ expansion system at the same time. Accordingly, to perform an expansion, the expansion process, the Huffman decoding trees, and the table to convert the one dimensional interior block vector into a two dimensional vector are loaded into the compression/expansion system by the host computer program. Next, the host computer program obtains the compression/expansion parameters from the compressed image storage where they were stored in the compression process. The compression/expansion parameters are then transferred to the compression system and the first sixteen line strip of compressed chrominance component I is moved into the data memory of the compression system. The program in the host computer then issues an expand initialization command which resets the internal variable s of the signal processor in the compression system, expands the compressed chrominance component I data, and stores the reconstructed data in the internal I buffer in the data memory of the compression system.

Next, the host computer program transfers the compressed chrominance component Q data from the compressed image storage into the data memory of the compression system and issues an expand command. Accordingly, the compression system expands the chrominance component Q data and stores the expanded chrominance also in the internal buffer in the data memory of the compression system.

After the expansion of the chrominance data, the host computer program loads a sixteen line strip of the compressed luminance data into the compression system and issues an expand command. When the expansion is completed, sixteen lines of RGB data are transferred from the data memory of the compression system to the memory of the frame grabber by the host computer program. This process, the loading of sixteen lines of compressed luminance data Y, the expansion and the transfer of sixteen lines of RGB data from the compression system to the frame grabber, is repeated for a second sixteen line strip and a third sixteen line strip. A fourth sixteen line strip of compressed luminance data Y is moved into the compression system, the expand command is given by the host computer program, and the expansion is completed by the signal processor, but only twelve lines of red, green and blue image data are moved from the data memory of the compression system to the memory of the frame grabber.

Next, a sixteen line strip of compressed chrominance component I data is moved to the compression system and the expand command is given and no lines of data are moved from the data memory of the compression system to the memory of the frame grabber. The compressed chrominance component Q data is moved into the data memory of the compression system, an expand command is given by the host computer, and the chrominance component data Q is expanded by the compression system. After the expansion is complete, four lines of red, green, blue, four lines of RGB data are moved from the data memory of the compression system to the memory of the frame grabber. The four expansions of the compressed luminance data with a 16 line, 16 line, 16 line and 12 line transfer of reconstructed data, the expansion of the compressed I with no transfer of reconstructed data and the expansion of compressed Q data with the transfer of 4 lines of reconstructed data are repeated by the host computer program until the 480 lines of compressed image data are processed and moved to the memory of the frame grabber.

The above description of the program in the host computer describes the preferred embodiment wherein the frame has 512 pixels per line, 480 lines are stored in the compressed frame, the chrominance data is filtered and subsampled on a 4:1 basis, and the resolution of the luminance data is not reduced. However, the compression process has the ability, as described above, to further reduce the resolution of the luminance and the chrominance components. The data transfers and the commands necessary to either expand or compress the image for these other modes are included in the program given in Appendix C.

The schematic drawings for the system illustrated in FIG. 9 are given in FIG. 10 through FIG. 21. Each of the integrated circuits or logic gates in FIG. 10 through FIG. 21 is represented by a number, the first letter of which is an alphanumeric character and the second letter of which is an arabic numeral. The alphanumeric character and arabic number identify a specific integrated circuit which is identified in the parts list given in Table 1.

TABLE 1

| ITEM | QUAN | PART NUMBER DESCRIPTION | REF DES |
|---|---|---|---|
| 1 | 1 | 320C25 - TI Digital Signal Processor | E1 |
| 2 | 4 | 43256 - 32K × 8 Static RAM (200 NS) - 10L | H3, H5, K3, K5 |
| 3 | 2 | SSM7164-35 8K × 8 Static RAM | H1, K1 |
| 4 | 1 | 74F00 - Fast TTL Quad Two Input NAND | A4 |
| 5 | 1 | 74ALS04 - ALS TTL Hex Inverter | D1 |
| 6 | 1 | 74ALS08 - ALS TTL Quad 2 Input and Gate | C5 |
| 7 | 2 | 74LS08 - LS TTL Quad 2 Input and Gate | A3, C2 |
| 8 | 1 | 74LS14 - LS TTL Hex Inverter with Schmitt Trigger | B4 |
| 9 | 1 | 74S22 - Schottky TTL Dual 4-Input NAND, OC Output | B3 |
| 10 | 3 | 74F32 - Fast TTL Quad 2 Input OR Gate | B6, F6, F7 |
| 11 | 3 | 74LS32 - LS TTL Quad 2 Input OR Gate | B5, C1, C3 |
| 12 | 3 | 74LS74 - LS TTL Dual D Flip-Flop | A2, B2, C4 |
| 13 | 1 | 74LS138 - LS TTL 3/8 Decoder | C6 |
| 14 | 5 | 74LS161 - LS TTL /16 Sync Counter, Direct CLEAR | D3, D4, D5, D6, E6 |
| 15 | 1 | 74LS175 - LS TTL Hex D Flip-Flops With CLEAR | E7 |
| 16 | 2 | 74F244 - Fast TTL Octal Buffer | C7, H6 |
| 17 | 3 | 74LS244 - LS TTL Octal Buffer | A5, E4, E5 |
| 18 | 3 | 74F245 - Fast TTL Octal Bus Transceiver | A7, D7, K7 |
| 19 | 1 | 74LS245 - LS TTL Octal Bus Transceiver | K6 |
| 20 | 1 | 74LS273 - LS TTL Octal D Flip-Flop With CLEAR | A6 |
| 21 | 1 | 74LS374 - LS TTL Octal Flip-Flop | H7 |
| 22 | 1 | 74LS688 - 8 Bit Comparator | B7 |
| 23 | 29 | Capacitor, .1MFD, Ceramic +80, −50% | C51, C53-C80 |

TABLE 1-continued

| ITEM | QUAN | PART NUMBER | DESCRIPTION | REF DES |
|---|---|---|---|---|
| 24 | 2 | 50-150v Aux SR275 = 104ZAA (Radial 0.3")<br>Capacitor, 22MFD Electrolytic +/− 25%<br>25V (Radial 0.2") SPR 513D226M025JA4 | | C52, C81 |
| 25 | 1 | DIP Switch, 8 Switches, 16 pin Dip, P/N ADP-08 | | A1 |
| 26 | 1 | 40 MHZ Oscillator | | D2 |
| 27 | 1 | Resistor Pak, 1K Ohm, 16 Pin Dip, P/N 898-1-RIK | | B1 |
| 28 | 2 | Board Mount Pins (2 Pin) | | J1, J2 |
| 29 | 2 | Jumper | | J1, J2 |
| 30 | 1 | 68 Pin IC socket, McKenzie P/N P6M068-IA1133-DC | | E1 |
| 31 | 2 | 28 Pin IC socket, Solder 0.3", Augat 528-AG11D<br>-OR- | | H1, K1, |
|  | 4 | 14 Pin IC socket, solder 0.3", Augat 514-AG11D | | H1, K1 |
| 32 | 1 | PC Board P/N 88-100002-00 | | |

Figure 10B:
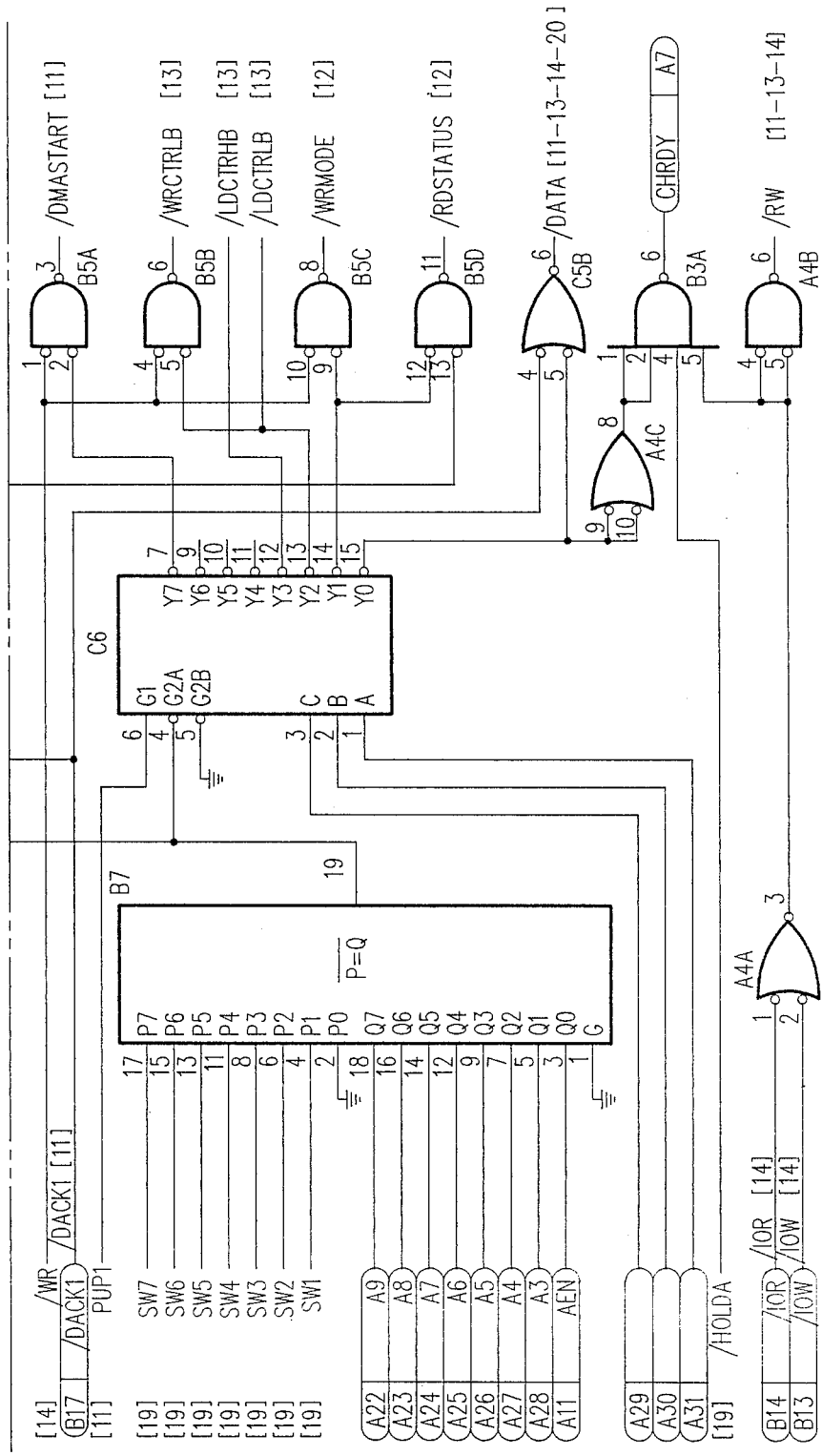

If the integrated circuit contains more than one logic gate, the individual gates are identified by another alphanumeric character after the first two characters. For example, OR gate B5A in FIG. 10 is the first OR gate in integrated circuit B5 which in turn is identified in Table 1 as a 74LS32-LS TTL QUAD 2 input OR gate. Individual terminals of an integrated circuit are identified in the figures by using the identifiers for the integrated circuit or the component in the integrated circuit followed by a dash and the number of the integrated circuit pin which corresponds to the terminal.

In FIGS. 10 through 21, lines which perform a specific function are given a name and the complement of the signal is shown by a slash prior to the name. Similarly named lines on the different figures are directly connected. Further, the number or numbers in square brackets are the numbers of the Figures where the line is continued.

In Table 2, a wire list for the compression system of this invention is given. The wire list describes the various interconnections in the compression system. For example, the ninth entry in Table 2 is

| 9 | /DSPHOLDA | D1-5 | E1-E10 |
|---|---|---|---|

Figure 15A:
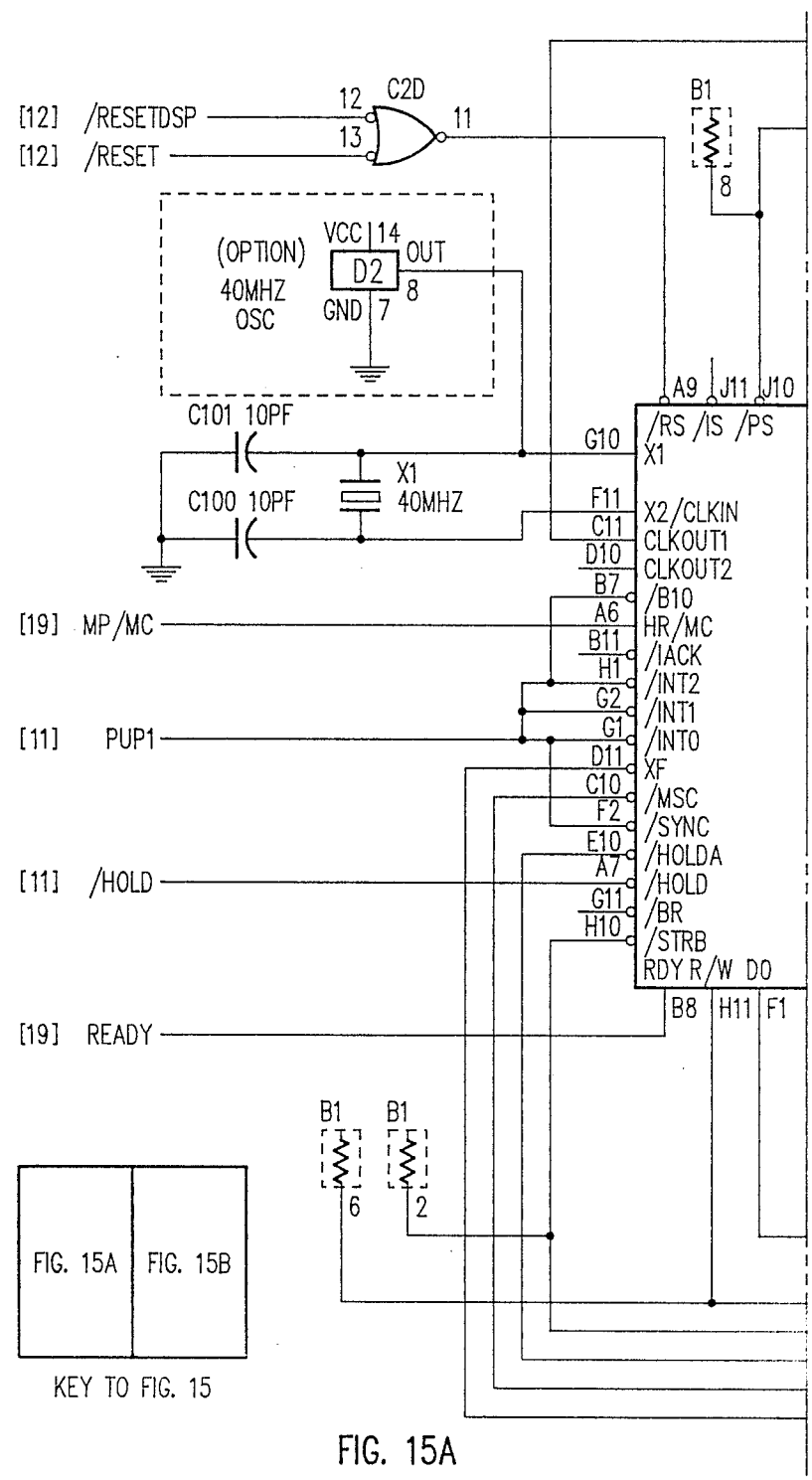
Figure 15B:
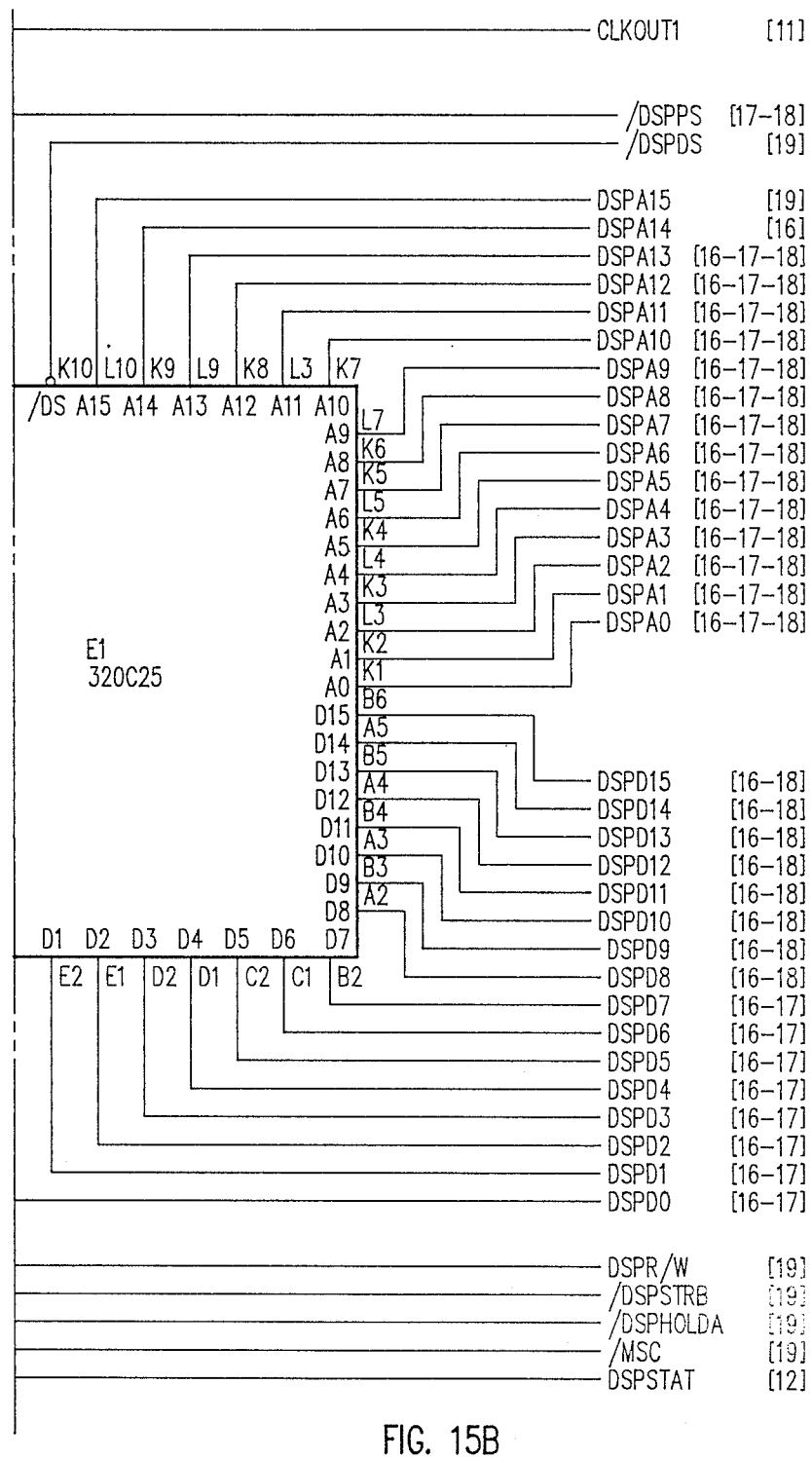
Figures 19A, 19B:
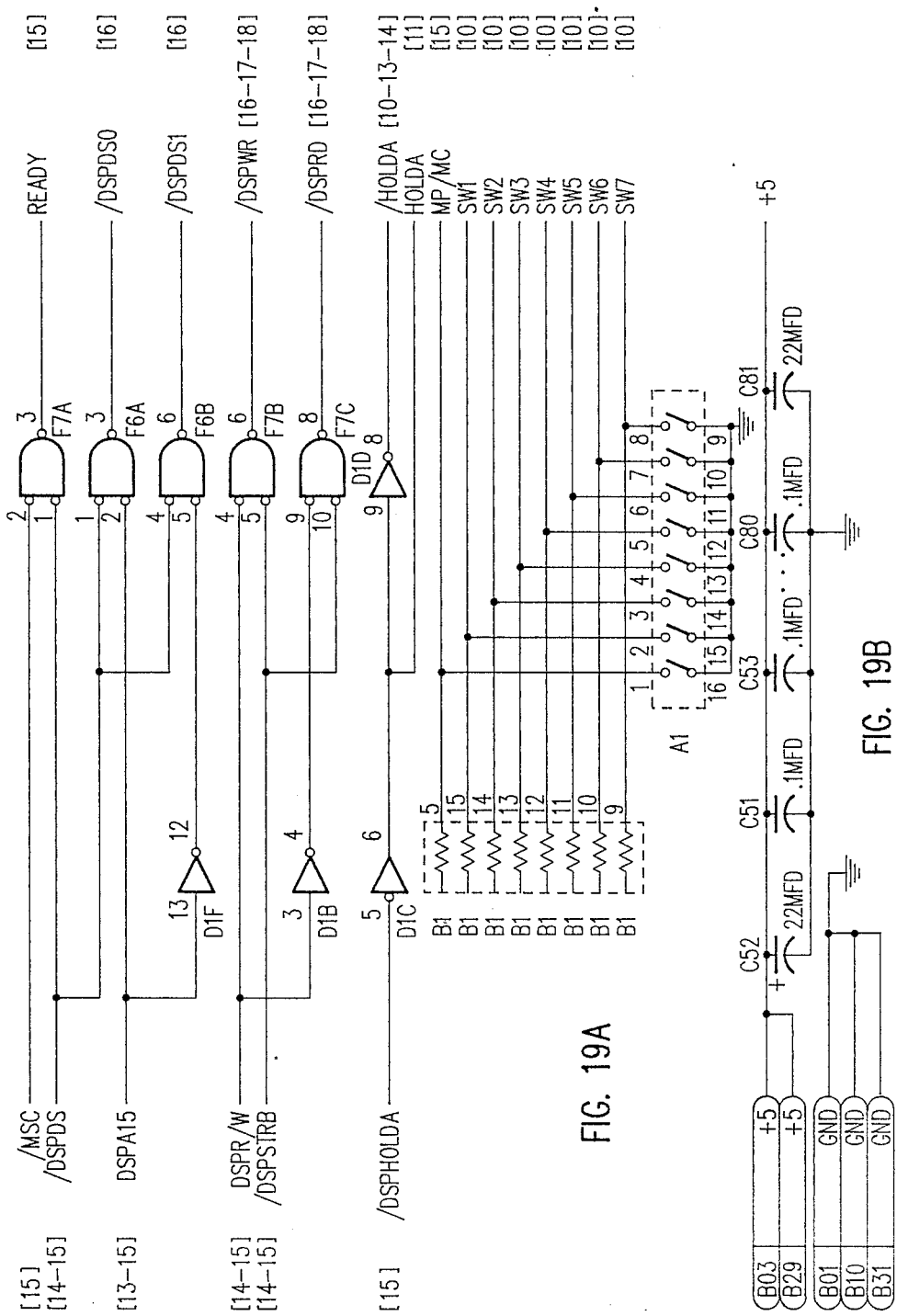

This means that the line carrying the complement of the DSPHOLDA signal goes from the fifth pin of the circuit element D1, which appears in FIG. 19, to the pin E10 of circuit element E1, which is the signal processor in FIG. 15. Thus, the first column in Table 2 give the signal on the line which interconnects the points given in the next four columns.

TABLE 2

| | | | | | |
|---|---|---|---|---|---|
| 1 | +5 | A2-14 | A3-14 | A4-14 | A5-20 |
| | | A6-20 | A7-20 | B03-EDGE | B29-EDGE |
| | | C53-T | C99-T | C73-T | C52-T |
| | | B2-14 | B3-14 | B4-14 | B5-14 |
| | | B6-14 | B7-20 | C1-14 | C2-14 |
| | | C3-14 | C4-14 | C5-14 | C6-16 |
| | | C7-20 | D1-14 | D3-16 | D4-16 |
| | | D5-16 | D6-16 | D7-20 | E1-A10 |
| | | E1-B10 | E1-H2 | E1-L6 | E4-20 |
| | | E5-20 | E6-16 | E7-16 | F6-14 |
| | | F7-14 | H1-28 | H2-28 | H3-28 |
| | | H5-28 | H6-20 | H7-20 | K1-28 |
| | | K2-28 | K3-28 | K5-28 | K6-20 |
| | | K7-20 | | | |
| 2 | /BT16 | A5-6 | C4-4 | F6-10 | A4-12 |
| | | A4-13 | B1-6 | J2-2 | |
| 3 | /DACK1 | B4-1 | C5-4 | C5-2 | B17-EDGE |
| 4 | /DATA | B4-11 | B4-3 | B6-10 | B6-4 |
| | | B6-12 | C3-1 | C3-4 | C5-6 |
| 5 | /DMASTART | B2-13 | A3-9 | B5-3 | |
| 6 | /DSPDS0 | F6-3 | H5-20 | K5-20 | |
| 7 | /DSPDS1 | F6-6 | K3-20 | H3-20 | |
| 8 | /DSPDS | C7-7 | E1-K10 | F6-1 | F6-4 |
| | | F7-1 | | | |
| 9 | /DSPHOLDA | D1-5 | E1-E10 | | |
| 10 | /DSPPS | C7-9 | D1-11 | H2-20 | E1-J10 |
| | | B1-8 | K2-20 | | |
| 11 | /DSPRD | F7-8 | H1-22 | H2-22 | H5-22 |
| | | H3-22 | K3-22 | K5-22 | K2-22 |
| | | K1-22 | | | |
| 12 | /DSPSTRB | C7-5 | E1-H10 | B1-2 | F7-10 |
| | | F7-5 | | | |
| 13 | /DSPWR | F7-6 | H1-27 | H2-27 | H5-27 |
| | | K5-27 | H3-27 | K3-27 | K1-27 |
| | | K2-27 | | | |
| 14 | /HOLDA | B3-4 | C1-10 | C1-12 | C7-19 |
| | | D1-8 | E4-19 | E4-1 | E5-1 |
| | | E5-19 | | | |
| 15 | /HOLD | A2-5 | E1-A7 | | |
| 16 | /IOR | A4-1 | B14-EDGE | C7-2 | |
| 17 | /IOW | A4-2 | B13-EDGE | C7-4 | |
| 18 | /LDCTRHB | C6-12 | D4-9 | D3-9 | |
| 19 | /LDCTRLB | B5-5 | C6-13 | D6-9 | D5-9 |

TABLE 2-continued

| | | | | | |
|---|---|---|---|---|---|
| 20 | /MSC | E1-C10 | F7-2 | | |
| 21 | /RDSTATUS | A5-1 | A5-19 | B5-11 | |
| 22 | /RD | A7-1 | B5-13 | D7-1 | K6-1 |
| | | K7-1 | C7-18 | B6-13 | |
| 23 | /RESETDSP | A6-2 | C2-12 | | |
| 24 | /RESET | A2-4 | A3-10 | A3-1 | A6-1 |
| | | B4-8 | C2-13 | D3-1 | D4-1 |
| | | D6-1 | C2-4 | D5-1 | E7-1 |
| | | E6-1 | | | |
| 25 | /RWDATA | A3-4 | C3-6 | C4-3 | C5-10 |
| 26 | /RW | A4-6 | C3-5 | C7-15 | D5-2 |
| | | D6-2 | D3-2 | D4-2 | |
| 27 | /WRCTRLB | B5-6 | C2-5 | | |
| 28 | /WRMODE | A6-11 | B5-8 | | |
| 29 | /WR | B5-1 | B5-4 | B5-10 | C7-16 |
| | | C3-2 | | | |
| 30 | ADDHI | C1-11 | C1-1 | C3-12 | F6-9 |
| 31 | BD0 | A5-3 | A6-3 | A7-18 | D5-3 |
| | | D4-3 | H6-18 | K7-2 | H7-3 |
| | | K6-2 | | | |
| 32 | BD1 | A5-18 | A6-18 | A7-17 | D4-4 |
| | | D5-4 | H6-16 | K7-3 | H7-4 |
| | | K6-3 | | | |
| 33 | BD2 | A5-5 | A6-4 | A7-16 | D4-5 |
| | | D5-5 | K6-4 | K7-4 | H7-7 |
| | | H6-14 | | | |
| 34 | BD3 | A5-16 | A6-17 | A7-15 | D5-6 |
| | | D4-6 | H6-12 | H7-8 | K7-5 |
| | | K6-5 | | | |
| 35 | BD4 | A5-7 | A6-7 | A7-14 | D3-3 |
| | | D6-3 | H7-13 | K7-6 | H6-9 |
| | | K6-6 | | | |
| 36 | BD5 | A5-14 | A6-14 | A7-13 | D6-4 |
| | | D3-4 | H6-7 | K7-7 | H7-14 |
| | | K6-7 | | | |
| 37 | BD6 | A5-9 | A6-8 | A7-12 | D3-5 |
| | | D6-5 | H7-17 | K7-8 | H6-5 |
| | | K6-8 | | | |
| 38 | BD7 | A5-12 | A6-13 | A7-11 | D3-6 |
| | | D6-6 | H6-3 | H7-18 | K7-9 |
| | | K6-9 | | | |
| 39 | CLKOUT1 | A2-3 | E1-C11 | | |
| 40 | DEN | C1-3 | C7-17 | C3-10 | |
| 41 | DMAENA | A2-12 | A6-9 | | |
| 42 | DMA_IN_PROG | A5-8 | B2-9 | | |
| 43 | DRQEN | B2-5 | C2-9 | | |
| 44 | DSPA0 | E1-K1 | E5-18 | H1-21 | H2-21 |
| | | H3-10 | H5-10 | K1-21 | K2-21 |
| | | K3-10 | K5-10 | | |
| 45 | DSPA10 | E1-K7 | E4-14 | H1-8 | H2-8 |
| | | H3-21 | H5-21 | K1-8 | K2-8 |
| | | K3-21 | K5-21 | | |
| 46 | DSPA11 | E1-L8 | E4-12 | H1-9 | H2-9 |
| | | H3-23 | H5-23 | K1-9 | K2-9 |
| | | K3-23 | K5-23 | | |
| 47 | DSPA12 | E1-K8 | E4-9 | H1-10 | H2-10 |
| | | H3-2 | H5-2 | K1-10 | K2-10 |
| | | K3-2 | K5-2 | | |
| 48 | DSPA13 | E1-L9 | E4-7 | H1-20 | H2-26 |
| | | H3-26 | H5-26 | K2-26 | K1-20 |
| | | K3-26 | K5-26 | | |
| 49 | DSPA14 | E1-K9 | E4-5 | H3-1 | H5-1 |
| | | K3-1 | K5-1 | | |
| 50 | DSPA15 | D1-13 | F6-2 | E1-L10 | E4-3 |
| 51 | DSPA1 | E1-K2 | E5-16 | H1-23 | H2-23 |
| | | H3-9 | H5-9 | K1-23 | K2-23 |
| | | K3-9 | K5-9 | | |
| 52 | DSPA2 | E1-L3 | E5-14 | H1-24 | H2-24 |
| | | H3-8 | H5-8 | K1-24 | K2-24 |
| | | K3-8 | K5-8 | | |
| 53 | DSPA3 | E1-K3 | E5-12 | H1-25 | H2-25 |
| | | H3-7 | H5-7 | K1-25 | K2-25 |
| | | K3-7 | K5-7 | | |
| 54 | DSPA4 | E1-L4 | E5-9 | H1-2 | H2-2 |
| | | H3-6 | H5-6 | K1-2 | K2-2 |
| | | K3-6 | K5-6 | | |
| 55 | DSPA5 | E1-K4 | E5-7 | H1-3 | H2-3 |
| | | H3-5 | H5-5 | K1-3 | K2-3 |
| | | K3-5 | K5-5 | | |
| 56 | DSPA6 | E1-L5 | E5-5 | H1-4 | H2-4 |
| | | H3-4 | H5-4 | K1-4 | K2-4 |
| | | K3-4 | K5-4 | | |

TABLE 2-continued

| | | | | | |
|---|---|---|---|---|---|
| 57 | DSPA7 | E1-K5 | E5-3 | H1-5 | H2-5 |
| | | H3-3 | H5-3 | K1-5 | K2-5 |
| | | K3-3 | K5-3 | | |
| 58 | DSPA8 | E1-K6 | E4-18 | H1-6 | H2-6 |
| | | H3-25 | H5-25 | K1-6 | K2-6 |
| | | K3-25 | K5-25 | | |
| 59 | DSPA9 | E1-L7 | E4-16 | H1-7 | H2-7 |
| | | H3-24 | H5-24 | K1-7 | K2-7 |
| | | K3-24 | K5-24 | | |
| 60 | DSPD0 | E1-F1 | H1-11 | H2-11 | H3-11 |
| | | H5-11 | H7-2 | H6-2 | K6-18 |
| 61 | DSPD10 | D7-16 | E1-A3 | K1-13 | K2-13 |
| | | K3-13 | K5-13 | K7-16 | |
| 62 | DSPD11 | D7-15 | E1-B4 | K1-15 | K2-15 |
| | | K3-15 | K5-15 | K7-15 | |
| 63 | DSPD12 | D7-14 | E1-A4 | K1-16 | K2-16 |
| | | K3-16 | K5-16 | K7-14 | |
| 64 | DSPD13 | D7-13 | E1-B5 | K1-17 | K2-17 |
| | | K3-17 | K5-17 | K7-13 | |
| 65 | DSPD14 | D7-12 | E1-A5 | K1-18 | K2-18 |
| | | K3-18 | K5-18 | K7-12 | |
| 66 | DSPD15 | D7-11 | E1-B6 | K1-19 | K2-19 |
| | | K3-19 | K5-19 | K7-11 | |
| 67 | DSPD1 | E1-E2 | H1-12 | H2-12 | H3-12 |
| | | H5-12 | H7-5 | H6-4 | K6-17 |
| 68 | DSPD2 | E1-E1 | H1-13 | H2-13 | H3-13 |
| | | H5-13 | H7-6 | H6-6 | K6-16 |
| 69 | DSPD3 | E1-D2 | H1-15 | H2-15 | H3-15 |
| | | H5-15 | H7-9 | H6-8 | K6-15 |
| 70 | DSPD4 | E1-D1 | H1-16 | H2-16 | H3-16 |
| | | H5-16 | H7-12 | H6-11 | K6-14 |
| 71 | DSPD5 | E1-C2 | H1-17 | H2-17 | H3-17 |
| | | H5-17 | H7-15 | H6-13 | K6-13 |
| 72 | DSPD6 | E1-C1 | H1-18 | H2-18 | H3-18 |
| | | H5-18 | H7-16 | H6-15 | K6-12 |
| 73 | DSPD7 | E1-B2 | H1-19 | H2-19 | H3-19 |
| | | H5-19 | H7-19 | H6-17 | K6-11 |
| 74 | DSPD8 | D7-18 | E1-A2 | K1-11 | K2-11 |
| | | K3-11 | K5-11 | K7-18 | |
| 75 | DSPD9 | D7-17 | E1-B3 | K1-12 | K2-12 |
| | | K3-12 | K5-12 | K7-17 | |
| 76 | DSPPS | D1-10 | H1-26 | K1-26 | |
| 77 | DSPR/W | B1-6 | E1-H11 | C7-3 | D1-3 |
| | | F7-4 | | | |
| 78 | DSPSTAT | A5-11 | C56-T | E1-D11 | |
| 79 | ENSPHI2 | C3-11 | K7-19 | | |
| 80 | ENSPHI | C3-8 | H7-1 | | |
| 81 | GND | A1-9 | A1-10 | A1-11 | A1-12 |
| | | A1-13 | A1-14 | A1-15 | A1-16 |
| | | A2-7 | A3-7 | A4-7 | A5-10 |
| | | A5-13 | A5-17 | A5-2 | A5-15 |
| | | A5-4 | A6-10 | A7-10 | B01-EDGE |
| | | B31-EDGE | B10-EDGE | C73-B | C52-B |
| | | C99-B | C53-B | B2-7 | B3-7 |
| | | B4-7 | B5-7 | B6-7 | B7-10 |
| | | B7-1 | B7-2 | C1-7 | C101-L |
| | | C100-L | C2-7 | C3-7 | C4-7 |
| | | C5-7 | C56-B | C6-8 | C6-5 |
| | | C7-10 | C7-1 | C7-6 | C7-8 |
| | | D1-7 | D2-7 | D3-8 | D4-8 |
| | | D5-8 | D6-8 | D7-10 | E1-B1 |
| | | E1-K11 | E1-L2 | E4-10 | E5-10 |
| | | E6-8 | E6-3 | E6-5 | E7-8 |
| | | F6-7 | F7-7 | H1-14 | H2-14 |
| | | H3-14 | H5-14 | H6-10 | H7-10 |
| | | K1-14 | K2-14 | K3-14 | K5-14 |
| | | K6-10 | K7-10 | | |
| 82 | HOLDA | B2-3 | D1-6 | D1-9 | |
| 83 | LB/HB | B4-13 | C1-9 | D5-10 | C4-5 |
| 84 | MP/MC | B1-5 | A1-1 | E1-A6 | |
| 85 | PROG/DATA | A6-19 | B6-9 | B4-5 | |
| 86 | PUP1 | B2-4 | B2-10 | B2-12 | A2-1 |
| | | B1-3 | A2-10 | C6-6 | E1-H1 |
| | | E1-B7 | E1-G2 | E1-F2 | E1-G1 |
| 87 | READY | E1-B8 | F7-3 | | |
| 88 | SW1 | B1-15 | A1-2 | B7-4 | |
| 89 | SW2 | A1-3 | B1-14 | B7-6 | |
| 90 | SW3 | A1-4 | B1-13 | B7-8 | |
| 91 | SW4 | A1-5 | B1-12 | B7-11 | |
| 92 | SW5 | A1-6 | B1-11 | B7-13 | |
| 93 | SW6 | A1-7 | B1-10 | B7-15 | |
| 94 | SW7 | B1-9 | A1-8 | B7-17 | |

TABLE 2-continued

| | | | | | |
|---|---|---|---|---|---|
| 95 | $A02-XEDGE/01 | A02-EDGE | A7-9 | | |
| 96 | $A03-XEDGE/01 | A03-EDGE | A7-8 | | |
| 97 | $A04-XEDGE/01 | A04-EDGE | A7-7 | | |
| 98 | $A07-XEDGE/01 | A07-EDGE | A7-4 | | |
| 99 | $A10-XEDGE/01 | A10-EDGE | B3-6 | | |
| 100 | $A2-I2/02 | A2-2 | A3-6 | | |
| 101 | $A2-08/02 | A2-8 | A3-5 | | |
| 102 | $A2-09/02 | A2-9 | B2-2 | | |
| 103 | $A22-XEDGE/01 | A22-EDGE | B7-18 | | |
| 104 | $A23-XEDGE/01 | A23-EDGE | B7-16 | | |
| 105 | $A24-XEDGE/01 | A24-EDGE | B7-14 | | |
| 106 | $A25-XEDGE/01 | A25-EDGE | B7-12 | | |
| 107 | $A27-XEDGE/01 | A27-EDGE | B7-7 | | |
| 108 | $A29-XEDGE/01 | A29-EDGE | C6-3 | | |
| 109 | $A3-I13/02 | A3-13 | B27-EDGE | | |
| 110 | $A3-I2/02 | A3-2 | B2-8 | | |
| 111 | $A3-011/02 | A3-11 | B2-11 | | |
| 112 | $A3-03/02 | A3-3 | B2-1 | A2-13 | |
| 113 | $A3-08/02 | A3-8 | A2-11 | | |
| 114 | $A31-XEDGE/01 | A31-EDGE | C6-1 | | |
| 115 | $A4-I5/01 | A4-5 | A4-4 | B3-5 | A4-3 |
| 116 | $A4-I9/01 | A4-9 | A4-10 | C5-5 | C6-15 |
| 117 | $A4-011/11 | A4-11 | C3-9 | C3-13 | |
| 118 | $A4-08/01 | A4-8 | B3-2 | B3-1 | |
| 119 | $A7-B2/01 | A7-2 | A09-EDGE | | |
| 120 | $A7-B3/01 | A7-3 | A08-EDGE | | |
| 121 | $A7-B5/01 | A7-5 | A06-EDGE | | |
| 122 | $A7-B6/01 | A7-6 | A05-EOGE | | |
| 123 | $B1-T1/12 | B1-1 | E6-6 | E6-7 | E6-10 |
| | | E6-4 | | | |
| 124 | $B3-I13/11 | B3-13 | B3-12 | B3-10 | B3-9 |
| | | B4-10 | | | |
| 125 | $B4-I9/03 | B4-9 | B02-EDGE | | |
| 126 | $B4-012/05 | B4-12 | C1-13 | | |
| 127 | $B4-02/02 | B4-2 | A3-12 | | |
| 128 | $B4-04/04 | B4-4 | D4-7 | D3-7 | D6-7 |
| | | D5-7 | | | |
| 129 | $B5-I12/01 | B5-12 | B5-9 | C6-14 | |
| 130 | $B5-I2/01 | B5-2 | C6-7 | | |
| 131 | $B6-I2/05 | B6-2 | B6-11 | | |
| 132 | $B6-I5/05 | B6-5 | B4-6 | | |
| 133 | $B6-03/05 | B6-3 | H6-19 | H6-1 | |
| 134 | $B7-I3/01 | B7-3 | A11-EDGE | | |
| 135 | $B7-I5/01 | B7-5 | A28-EDGE | | |
| 136 | $B7-I9/01 | B7-9 | A26-EDGE | | |
| 137 | $B7-019/01 | B7-19 | C6-4 | C5-1 | |
| 138 | $C1-I4/05 | C1-4 | C3-3 | C1-2 | |
| 139 | $C1-06/05 | C1-6 | H7-11 | | |
| 140 | $C1-08/05 | C1-8 | B6-1 | C1-5 | |
| 141 | $C100-XR/06 | C100-R | E1-F11 | D2-8 | X1-B |
| 142 | $C101-XR/06 | C101-R | E1-G10 | X1-T | |
| 143 | $C13-XEDGE/11 | C13-EDGE | D7-4 | | |
| 144 | $C14-XEDGE/11 | C14-EDGE | D7-5 | | |
| 145 | $C15-XEDGE/11 | C15-EDGE | D7-6 | | |
| 146 | $C16-XEDGE/11 | C16-EDGE | D7-7 | | |
| 147 | $C17-XEDGE/11 | C17-EDGE | D7-8 | | |
| 148 | $C18-XEDGE/11 | C18-EDGE | D7-9 | | |
| 149 | $C4-I1/04 | C4-1 | C2-6 | | |
| 150 | $C4-I2/04 | C4-2 | C4-6 | | |
| 151 | $C5-03/01 | C5-3 | A7-19 | | |
| 152 | $C6-I2/01 | C6-2 | A30-EDGE | | |
| 153 | $C7-I11/05 | C7-11 | B6-6 | | |
| 154 | $C7-I13/05 | C7-13 | B6-8 | | |
| 155 | $D02-XEDGE/11 | D02-EDGE | B3-8 | | |
| 156 | $D1-I1/12 | D1-1 | E7-4 | E6-15 | |
| 157 | $D1-012/10 | D1-12 | F6-5 | | |
| 158 | $D1-02/12 | D1-2 | F7-13 | C2-10 | |
| 159 | $D18-XEDGE/11 | D18-EDGE | J2-1 | | |
| 160 | $D3-I10/04 | D3-10 | D4-15 | | |
| 161 | $D3-011/04 | D3-11 | E4-17 | | |
| 162 | $D3-012/04 | D3-12 | E4-15 | | |
| 163 | $D3-013/04 | D3-13 | E4-13 | | |
| 164 | $D3-014/04 | D3-14 | E4-11 | | |
| 165 | $D4-I10/04 | D4-10 | D6-15 | | |
| 166 | $D4-011/04 | D4-11 | E4-8 | | |
| 167 | $D4-013/04 | D4-13 | E4-4 | | |
| 168 | $D4-014/04 | D4-14 | E4-2 | | |
| 169 | $D5-011/04 | D5-11 | E5-8 | | |
| 170 | $D5-012/04 | D5-12 | E5-6 | | |
| 171 | $D5-013/04 | D5-13 | E5-4 | | |
| 172 | $D5-014/04 | D5-14 | E5-2 | | |
| 173 | $D6-I10/04 | D6-10 | D5-15 | | |

TABLE 2-continued

| | | | | |
|---|---|---|---|---|
| 174 | $D6-011/04 | D6-11 | E5-17 | |
| 175 | $D6-012/04 | D6-12 | E5-15 | |
| 176 | $D6-013/04 | D6-13 | E5-13 | |
| 177 | $D6-014/04 | D6-14 | E5-11 | |
| 178 | $D7-B2/11 | D7-2 | C11-EDGE | |
| 179 | $D7-B3/11 | D7-3 | C12-EDGE | |
| 180 | $D7-I19/11 | D7-19 | K6-19 | F6-8 |
| 181 | $E1-IA8/06 | E1-A8 | C2-11 | |
| 182 | $E4-I6/04 | E4-6 | D4-12 | |
| 183 | $E6-I2/12 | E6-2 | C5-8 | |
| 184 | $E7-I12/12 | E7-12 | E7-7 | |
| 185 | $E7-I5/12 | E7-5 | E7-2 | |
| 186 | $E7-O10/12 | E7-10 | E7-13 | |
| 187 | $F6-I13/12 | F6-13 | E7-9 | B20-EDGE |
| 188 | $F6-O11/12 | F6-11 | C5-9 | |
| 189 | $F7-I12/12 | F7-12 | E7-14 | |
| 190 | $F7-I9/10 | F7-9 | D1-4 | |
| 191 | $F7-O11/12 | F7-11 | F6-12 | E6-9 |
| 192 | $J1-B1/12 | J1-1 | C2-8 | |
| 193 | $J1-B2/12 | J1-2 | B18-EDGE | |

Items 1 through 94 in the wire list in Table 2 represent specific signal lines and their connections in the compression system. Items 95 through 193 represent lines which do not carry a specific signal but are used to interconnect the pins on the components listed in the columns. For example, item 101 is given as

| 101 | $A2-O8/02 | A2-8 | A3-5 |
|---|---|---|---|

This signifies that the eighth pin of the integrated circuit A2 is connected to the fifth pin of the integrated circuit A3. The part numbers in Table 1 for the parts in the compression system interrelate the wire list in Table 2 and FIGS. 10 through 21.

In the preferred embodiment, the compression system can be used in either an IBM PC AT, an IBM PC XT, or any of the IBM PC AT or XT compatible computers. Since the IBM PC AT and the IBM PC XT are capable of transferring data differently, the operation of the compression system in each of these computers is described. All communications are initiated by the host computer. The signal processor of the compression system can communicate only with the data and program memory of the compression system.

When the compression system is used in the IBM PC XT, fast data transfers from and to the compression system are controlled by direct memory access (DMA), but when the compression system is implemented in the IBM PC AT, fast data transfers are performed using programmed 16 bit I/O transfers. The direct memory access function of the IBM PC XT as implemented with the compression system causes the IBM PC XT to transfer data at approximately 900K bytes per second to and from the compression system, which is more than twice the normal IBM PC XT transfer rate. The circuitry used to achieve this enhanced data transfer between the IBM PC XT and the memory of the compression system is described more completely below.

The first operation with the compression system is to select an address code range for the compression system when implemented in the host computer. The seven DIP single pole switches A1 in FIG. 19 are used to set the address decode range. Although many ranges are possible, a default setting for the address code of 308H has been selected to demonstrate the principles of this invention. In an address code, for example 308H, the first three characters are the address and the "H" indicates that the address code is specified using a hexidecimal number system.

For an address code of 308H, the switches are set so that switch one, represented by terminals 2 and 15 in FIG. 19, is open; switch two, terminals 3 and 14, is closed; switch three, terminals 4 and 13, is closed; switch four, terminals 5 and 12, is closed; switch five, terminals 6 and 11, is closed; and switches six and seven, terminals 7 and 10 and terminals 8 and 9 respectively, are both open. When a switch is open, the supply voltage is applied on the related signal line and when a switch is closed, the supply voltage is connected to ground. Accordingly, the signals on the lines S1 through S7 are 1, 0, 0, 0, 0, 1, 1 respectively which are applied to the input terminals P1 through P7, i.e., terminals B7-4, B7-6, B7-8, B7-11, B7-13, B7-15, B7-17 respectively, of eight bit comparator B7 in FIG. 10. Terminal B7-2 of comparator B7 is grounded.

Thus, when the signals on the address bus pins A22 through A28 from the host computer to the address lines A9 through A3 respectively are 308H through 30FH and the signal on the address bus pin A11 from line AEN in FIG. 10 is low, the output signal on terminal B7-19 from comparator B7 goes low. Since the signal on the power supply pullup line PUP1 is active or high, the signals on the enable input terminals C6-4, C6-5 and C6-6 of the three-to-eight decoder C6 are such that the signals on the input terminals A, B, C, terminals C6-1, C6-2 and C6-3 respectively, are decoded.

The signals on input terminals C6-1, C6-2, C6-3 of the three-to-eight decoder C6 are the address bits A0 through A2, respectively. When the address bits A0 through A2 have the values 0, 0, 0, the signal on the terminal C6-15 of the three-to-eight decoder C6 goes low. The low signal on terminal C6-15 drives the signal data on complement line /DATA, which is connected to output terminal C5B-6 of AND gate C5B, low. The low signal on line /DATA drives the first input terminal C3B-4 (FIG. 11) of OR gate C3B low. Hence, when the second input terminal C3B-5 is driven low by a low signal on read/write complement line /RW, OR gate C3B generates a low output signal on output terminal C3B-6.

The signal on line /RW goes low when either the signal on line /IOR, which is driven by the signal on pin B14 of the host computer, or the signal on line /IOW, which is driven by the signal pin B13 of the host computer goes low. A low signal on either line /IOR or line /IOW, which are connected to input terminals A4A-1 and A4A-2 respectively of NAND gate A4A, drives the output signal from NAND gate A4A high which in turn drives the output signal from NAND gate A4B low. The line /RW is connected to the output terminal of NAND gate A4B.

A low output signal from OR gate C3B (FIG. 11) drives a first input terminal A3B-4 of AND gate A3B low and drives the signal on line /RWDATA low. In response to the low output signal from OR gate C3B, AND gate A3B generates a low output signal on terminal A3B-6 The low signal from AND gate A3B is provided to the D input terminal A2A-2 of the D-type flip-flop A2A. On the next positive edge clock pulse on line CLKOUT1, which is connected to the clock input terminal A2A-3 of flip-flop A2A, flip-flop A2A generates a low signal on the hold complement line /HOLD which is connected to output terminal A2A-5 of flip-flop A2A.

The hold complement line /HOLD provides the low signal to input terminal E1-A7 of the signal processor E1 in FIG. 15. The low signal tristates the signal processor E1 from the address, data, and control busses of the compression system. The signal processor E1 in turn generates a low signal, on line /DSPHOLDA, which is connected to pin E1-E10 of processor E1. The low signal on the line /DSPHOLDA indicates that the signal processor E1 has gone into the hold mode and that the host computer may access the external memory of signal processor E1 in the compression system.

The low signal on line /DSPHOLDA (FIG. 19) is applied to a input terminal D1C-5 of inverter D1C which in turn generates a high signal on line HOLDA and on input terminal D1D-9 of inverter D1D. In response to the high input signal, inverter D1D generates a low signal on line /HOLDA, which is connected to output terminal D1D-8 of inverter D1D.

Hence, when the host computer provides the address code 308H on the address bus and simultaneously asserts either a read from the compression system by setting the signal on line /IOR low, or a write to the compression system by setting the signal on line /IOW low, the compression system generates a sequence of signals that tristate the signal processor E1 from the address, data, and control busses of the signal processor.

However, the low signal from terminal C6-15 of decoder C6 is only one way to drive the output signal from AND gate C5B (FIG. 10) low. The signal on the line /DACK1, which is driven by pin B17 of the host computer, is a second input signal to AND gate C5B. Hence, independent of the address code supplied to decoder C6, if the signal on line /DACK1 is driven low by the host computer, AND gate C5B generates a low signal on the line /DATA and the previously described response to a low signal on line /DATA generated by an address code of 308H is reproduced identically. The actual sequencing of the signals is described in more detail below.

A low signal on the data complement line /DATA generated by either the address code 308H on the address bus or a low signal on line /DACK1 is also applied to input terminal B4B-3 of Schmitt trigger inverter B4B (FIG. 13), and consequently Schmitt inverter B4B generates a high signal on the output terminal B4B-4 which is applied to the enable P terminals D3-7, D4-7, D5-7, D6-7 of the address counters D3, D4, D5, D6 respectively.

The low signal on data complement line /DATA is also applied to a first input terminal B6C-10 of OR gate B6C (FIG. 14) and a first input terminal B6B-4 of OR gate B6B. The signal on line PROG/DATA is applied to a second input terminal B6C-9 of OR gate B6C and the inverse of the signal on line PROG/DATA is applied to the second input terminal B6B-5 of OR gate B6B. The generation of the signal on the line PROG/DATA is described below, but since the signal on the /DATA line is low, the signal on the line PROG/DATA determines the output signals generated by OR gates B6C and B6B. The output signal of OR gate B6C is applied to input terminal C7-13 of octal buffer C7 and the output signal of OR gate B5B is applied to input terminal C7-11 of buffer C7. When the signal on line /HOLDA is low, the buffer C7 passes the signals on input terminals C7-13 and C7-11 to the line /DSPDS, which is connected to output terminal C7-7, and line /DSPPS, which is connected to the output terminal C7-9, respectively. The signals on line /DSPDS and line /DSPPS are used to select the memory of the compression system used in a data transfer, as described below.

Finally, a low signal on the data complement line /DATA generates a low signal on the line I/O CS16 back to the computer (FIG. 20).

Prior to starting a direct memory access (DMA) transfer to or from the data memory of the compression system, the IBM PC also provides the compression system with the starting address in the memory of the compression system for the transfer. The compression system initializes the address counter (FIG. 13) with the initial address and then increments the address counter for each 16 bit word transferred.

Figure 12:
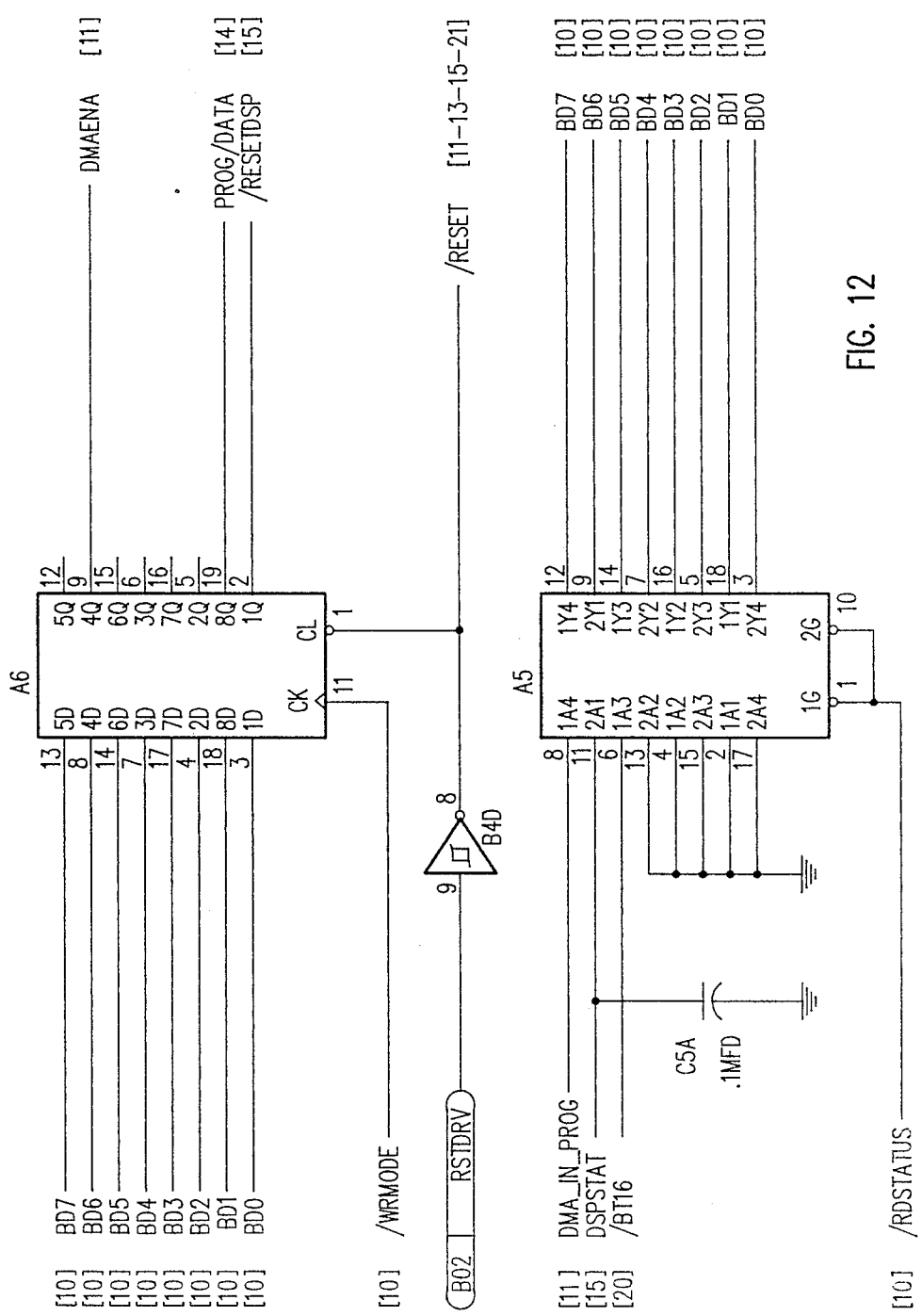

The initial phase of the direct memory access request cycle is initiated by the computer sending the address code 309H to the compression system address bus. As previously described, the address code is decoded using comparator B7 and decoder C6 (FIG. 10). Decoder C6 generates a low signal on output terminal C6-14 which in turn is applied to input terminal B5C-9 of OR gate B5C and to input terminal B5D-12 of OR gate B5D. The second input terminal B5C-10 of OR gate B5C is connected to line /WR and the second input terminal B5D-13 of OR gate B5D is connected to line /RD. As previously described, if the computer is writing to the compression system, the signal on line /WR is low, and the signal on line /RD is high, and if the computer is reading from the compression system, the signal levels on these lines are reversed. Thus, the output signal from OR gate B5C which drives line/WRMODE goes low when the address bits A0 through A2 have the values 1, 0, 0 and the signal on line /WR is low. The signal on line /WRMODE is used to clock the octal flip-flops A6 (FIG. 12). Thus, the flip-flops are clocked when the signal on line /WRMODE goes high again.

The signals on the data bus are passed through the bidirectional transceiver A7 to the octal D-type flip-flops A6 because the signal on line /RD is high. When the computers deasserts the write signal, i.e., the signal on line /IOW goes high, and so the signal on line /RW and the signal on line /WR both go high. The high signal on line /WR drives the output signal of OR gate B5C (FIG. 10) high and so the signal on line /WRMODE goes high. When the signal on line /WRMODE goes from low to high, the signal clocks the flip-flops in integrated circuit A6. (FIG. 12) Since the input signals to the flip-flops in A6 are the signals on the computer data bus, the flip-flops latch on the signals on the computer data bus.

When the flip-flops A6 are clocked by the signal on line /WRMODE, the signal on line DMAENA goes high and the signal on the line PROG/DATA goes either high or low. A low signal on the program/data line PROG/DATA directs incoming data to the compression system's data RAM, while a high signal on the program/data line directs incoming data to the program RAM. The DMA bank selection is described in more detail below. The DMA timing diagram (FIG. 22) shows the line DMAENA going high (FIG. 22b) when the signal on line /RW (FIG. 22c) goes high.

To provide the initial memory address to the compression system, the computer provides address code 30AH on A0 through A9 address lines (FIG. 10). Address code 30AH is the binary sequence of zero on A2 address line, one on A1 address line, and zero on the A0 address line. For this address code, comparator B7 has an identity with the dip switch signals on lines SW1 through SW7 and the output signal from comparator B7 energizes the three-to-eight decoder C6 as previously described. Decoder C6, in response to the 010 signal on input terminals C6-1, C6-2, C6-3, generates a low signal on terminal C6-13 which drives the load counter low byte complement line /LDCTRLB.

At the same time the host computer sends the address code 30AH to the address bus, the computer sends the low byte address to the data bus D0 through D7, which in turn is applied on the input terminals A7-2 through A7-9 respectively of bidirectional transceiver A7 (FIG. 10). At this time the signal on line /IOR (FIG. 10) is high. The high signal on line /IOR is passed through octal buffer C7 from input pin C7-2 to output pin C7-18 (FIG. 14) which drives line /RD. The high signal on line /RD is applied to the direction control terminal A7-1 of transceiver A7. Bi-directional transceiver A7 (FIG. 10) is enabled because the low output signal from comparator B7 in response to the address code 30AH drives the output signal of AND gate C5A low which in turn enables transceiver A7. Therefore, bi-directional transceiver A7 passes the low byte address signals from lines D0 to D7 to lines BD0 to BD7 respectively.

The low signal, generated in response to the address code 30AH, on line /LDCTRLB is applied to the load terminals D6-9 and D5-9 of counters D6 and D5 (FIG. 13) respectively. The low signal enables the load function of counters D5 and D6. Since the loading of counters D5 and D6 is synchronous, the low byte address signals on lines BD4 to BD7, which are connected to terminals D6-3 to D6-6 respectively of counter D6, and the low byte address signals on lines BD0 to BD3, which are connected to terminals D5-3 to D5-6 respectively of counter D7, are loaded into counters D6 and D5 respectively when the signal on line /RW goes low and then returns to a high signal because line /RW is connected to the clock terminals D6-2 and D5-2. The signal on line /RW is driven low by the computer asserting a low signal on the line /IOW, as previously described.

After the low byte address is loaded in the compression system, the host computer provides the computer address code 30BH, which corresponds to a 011 on address lines A0 through A2 respectively, and the high byte address on the data bus D0 through D7 (FIG. 10). The signals on line D0 through D7 are again passed through transceiver A7 to lines BD0 through BD7 respectively. The address code 30BH is decoded by the three-to-eight decoder C6 and a low signal is generated on the load counter high bit complement line /LDCTRHB, which is connected to output terminal C6-12 of decoder C6.

The low signal on line /LDCTRHB is applied to the input terminals D3-9 of counter D3 and to the input terminal D4-9 of counter D4 (FIG. 13) and in a manner identical to that described for the lower byte address signals, the high byte address signals on lines BD4 to BD7 are applied to input terminals D3-3 to D3-6 respectively of counter D3 and the high order address signals on lines BD0 to BD3 are applied to input terminals D4-3 to D4-6 respectively of counter D4. The next pulse on the read/write complement line /RW clocks counters D3, D4 so that the high byte address is loaded into the counters D3, D4. Thus, the IBM PC has initialized the initial address location in the compression system for the start of the direct memory access transfer by loading the address into the counters D3 through D6.

Figure 13A:
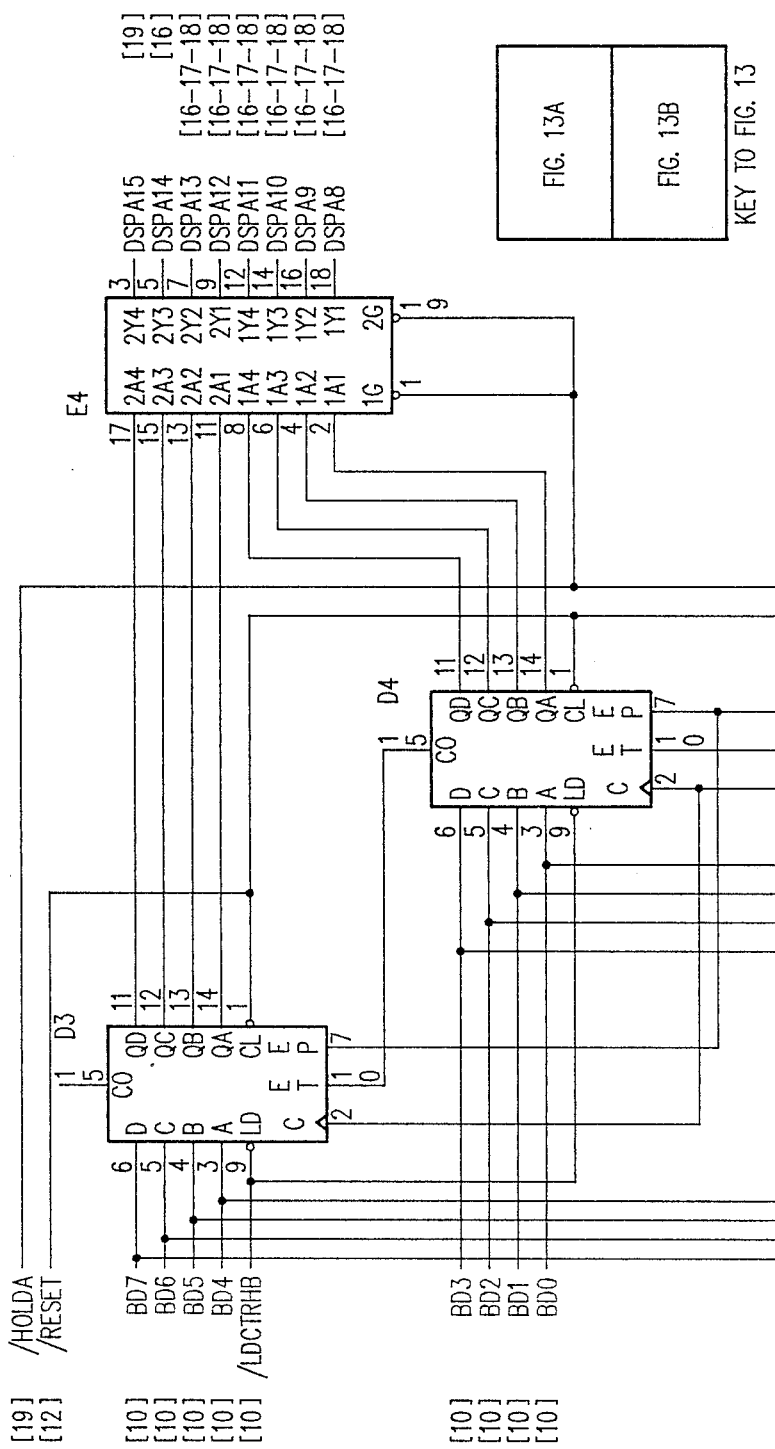
Figure 13B:
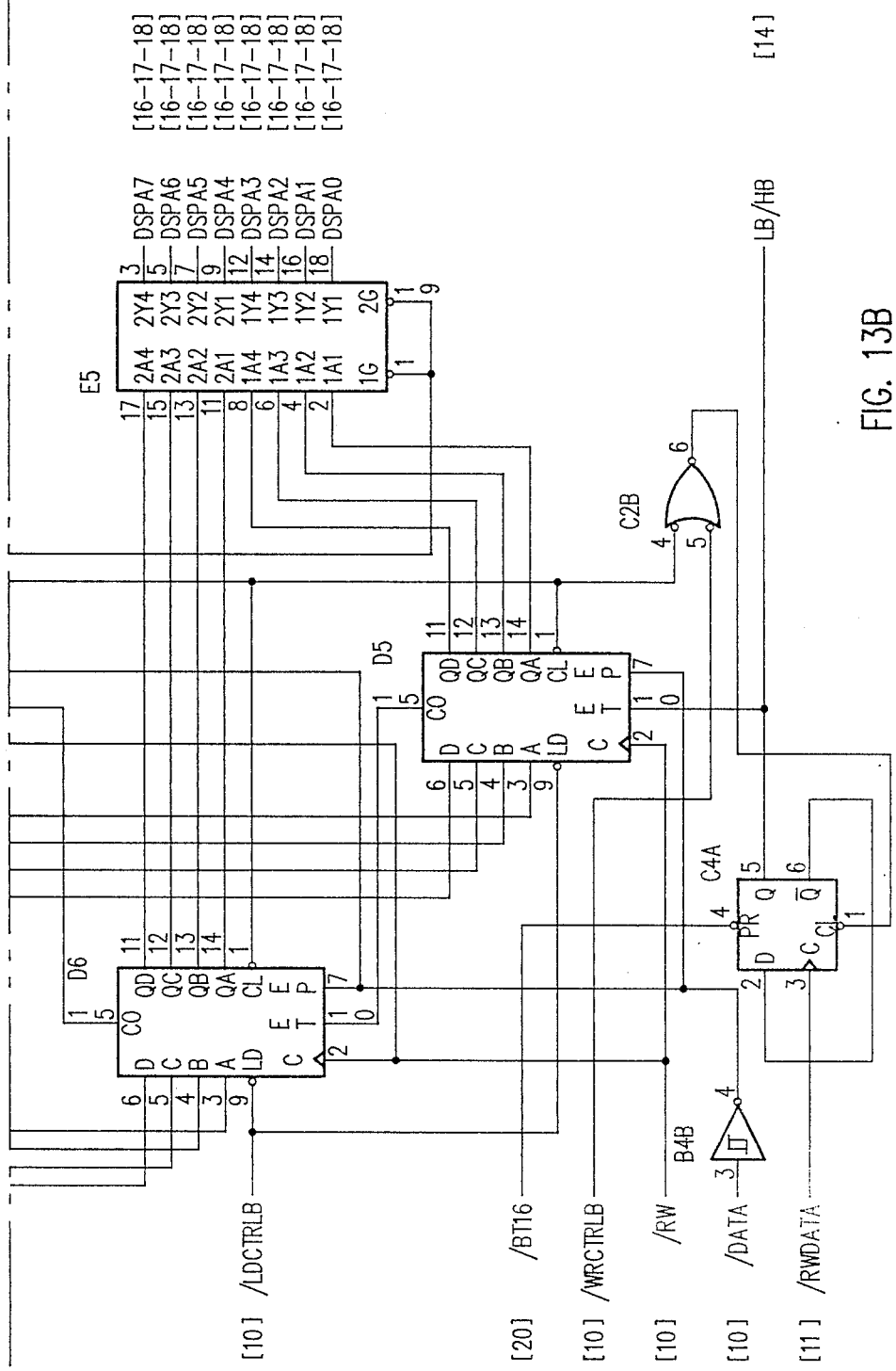

The address counter for the compression system is comprised of the counters D5, D6, D4, and D3 (FIG. 13). The counter D5 has its carry terminal D5-15 connected to the enable T terminal D6-10 of counter D6 and the carry output terminal of D6 is similarly connected to the enable T terminal of counter D4 and the carry output terminal of counter D4 is similarly connected to the enable T terminal of counter D3. As previously described, the enable P terminals of counters D3 to D6 are all driven by inverter B4B which in turn is driven by the signal on line /DATA. Accordingly with the counters connected in this fashion, counter D5 will count clock pulses on the line /RW and when it rolls over counter D6 is enabled. This cascading of the counters permits sequentially addressing the RAM of the compression system.

However, since the data bus transfers from the IBM PC XT are only one byte wide, the compression system address counter is incremented only during the low byte cycle time. This is accomplished by using the Q output signal on terminal C4A-5 of flip-flop C4A (FIG. 13) to drive the enable T terminal D5-10 of the counter D5. Flip-flop C4A is clocked by the signal on line /RWDATA, which is driven by the output signal from the OR gate C3B (FIG. 11), previously described. The output terminal Q complement C4A-6 is connected to D input terminal C4A-2. The signal on line /RW, which clocks counters D3 to D6, and the signal on line /RWDATA, which clocks flip-flop C4A are synchronous during a data transfer. Thus, flip-flop C4A effectively divides the clock signal on the line /RW by two because flip-flop C4A generates a signal to the T enable pin of counter D5 on every other clock cycle on line /RW. Hence, counter D5 is incremented only during the low byte cycle time.

As shown in FIG. 13, the output terminals of counters D5, D6 are connected to the input terminals of buffer E5 and the output terminals of counters D4, D3 are connected to the input terminals of buffer E4. The enable terminals E4-1, E4-19 of buffer E4, and the enable terminals E5-1, E5-19 of buffer E5, are driven by the signal on the line /HOLDA. As described previously, the signal on line /HOLDA is low and the buffers E4 and E5 are hence enabled only when the signal processor E1 (FIG. 15) is tristated. At all other times, buffers E4, E5 are tristated.

To ensure that the D type flip-flop C4A (FIG. 13) is in the proper phase, flip-flop C4A is cleared by the signal on line /WRCTRLB each time a new low byte address is loaded into counters D5 and D6. Recall that the counters are loaded when the address code 30AH is present on the address bus, and consequently decoder C6 generates a low signal on terminal C6-13. The low signal from terminal C6-13 is applied to a first input terminal B5B-5 of OR gate B5B. The second input terminal B5B-4 of OR gate B5B is driven by the signal on the line /WR. The signal on the line /WR is also low because the host computer is writing the low byte address to the compression system. Specifically, the signal on the line /IOW, which is driven by pin B13 of the host computer, is low and this low signal is passed through buffer C7 (FIG. 14) to the line /WR. Thus, the output signal from OR gate B5B, which drives line /WRCTRLB, is low. The low signal on line /WRCTRLB drives the output signal from AND gate C2B (FIG. 13) low which in turn clears flip-flop C4A. A low signal on the line /RESET also clears the counters D3 to D6 and also drives the output signal of AND gate C2B low which in turn clears flip-flop C4A.

The preset terminal C4A-4 of flip-flop C4A is connected to line /BT16. When the compression system is used with an IBM PC XT, the ground from pin D13 to jumper J2 (FIG. 20) is removed because the IBM PC XT does not have the C or D row connector and the signal on the line /BT16 is forced high allowing normal operation of flip-flop C4A. When the compression system is used in an IBM PC AT, pin D13 is grounded, and with jumper J2 left in place, the signal on line /BT16 is forced low. Consequently, the flip-flop C4A is inhibited from toggling. The line /BT16 is also connected to the host computer through buffer A5 (FIG. 12) and so the signal on line /BT16 is available for interrogation by the computer.

Figure 16A:
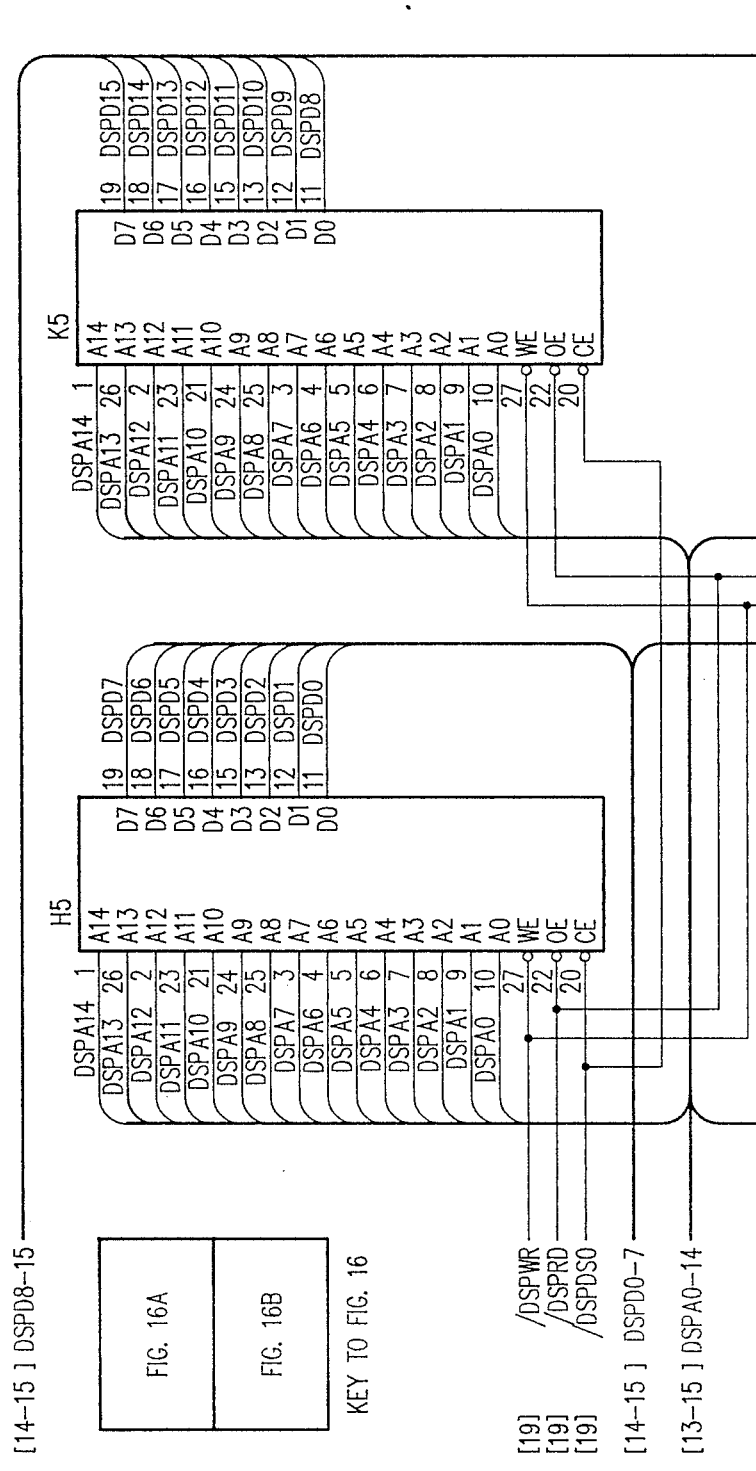
Figure 16B:
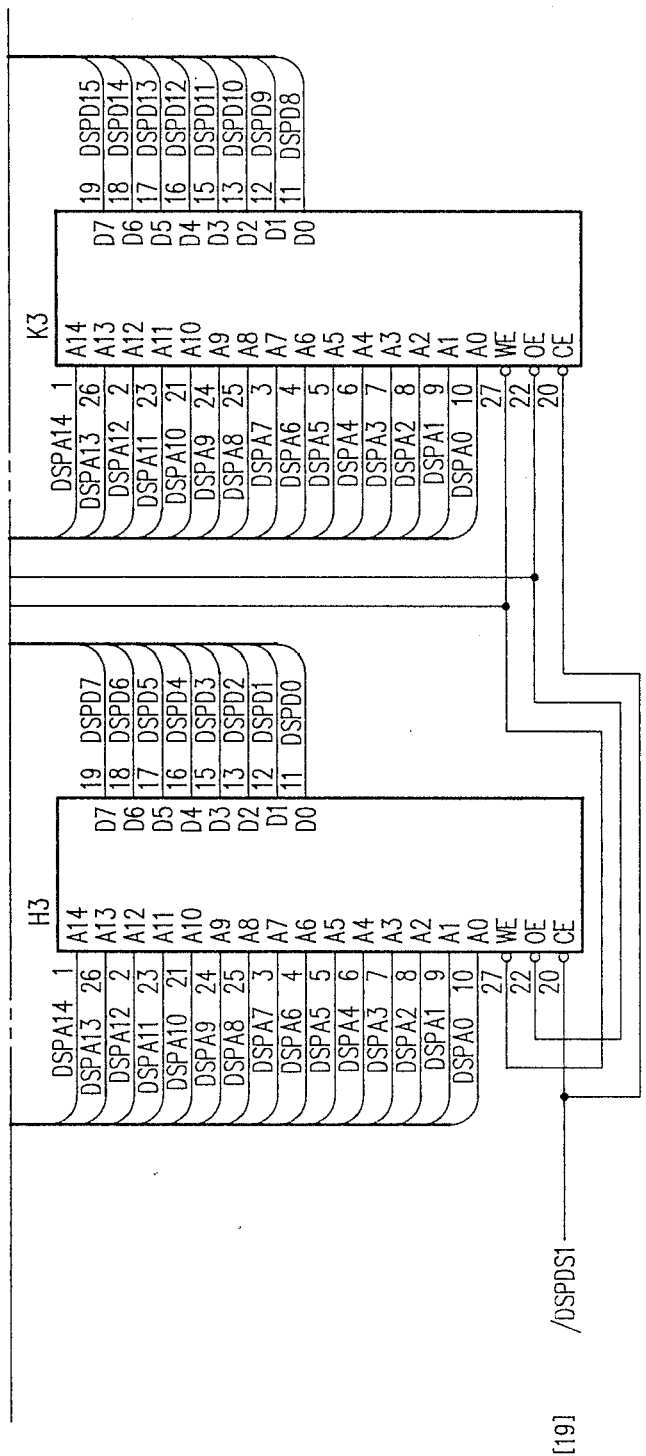
Figure 17:
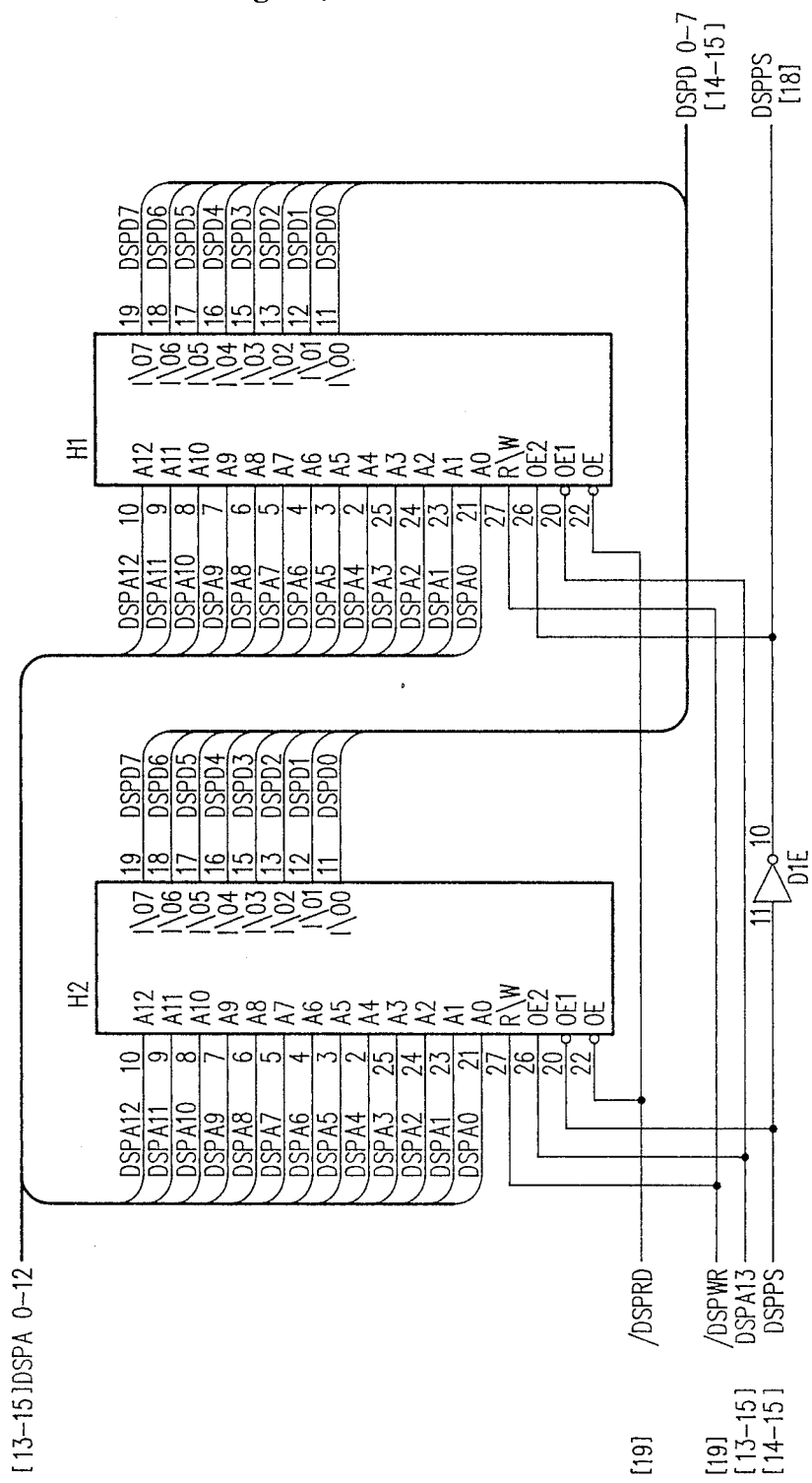
Figure 18:
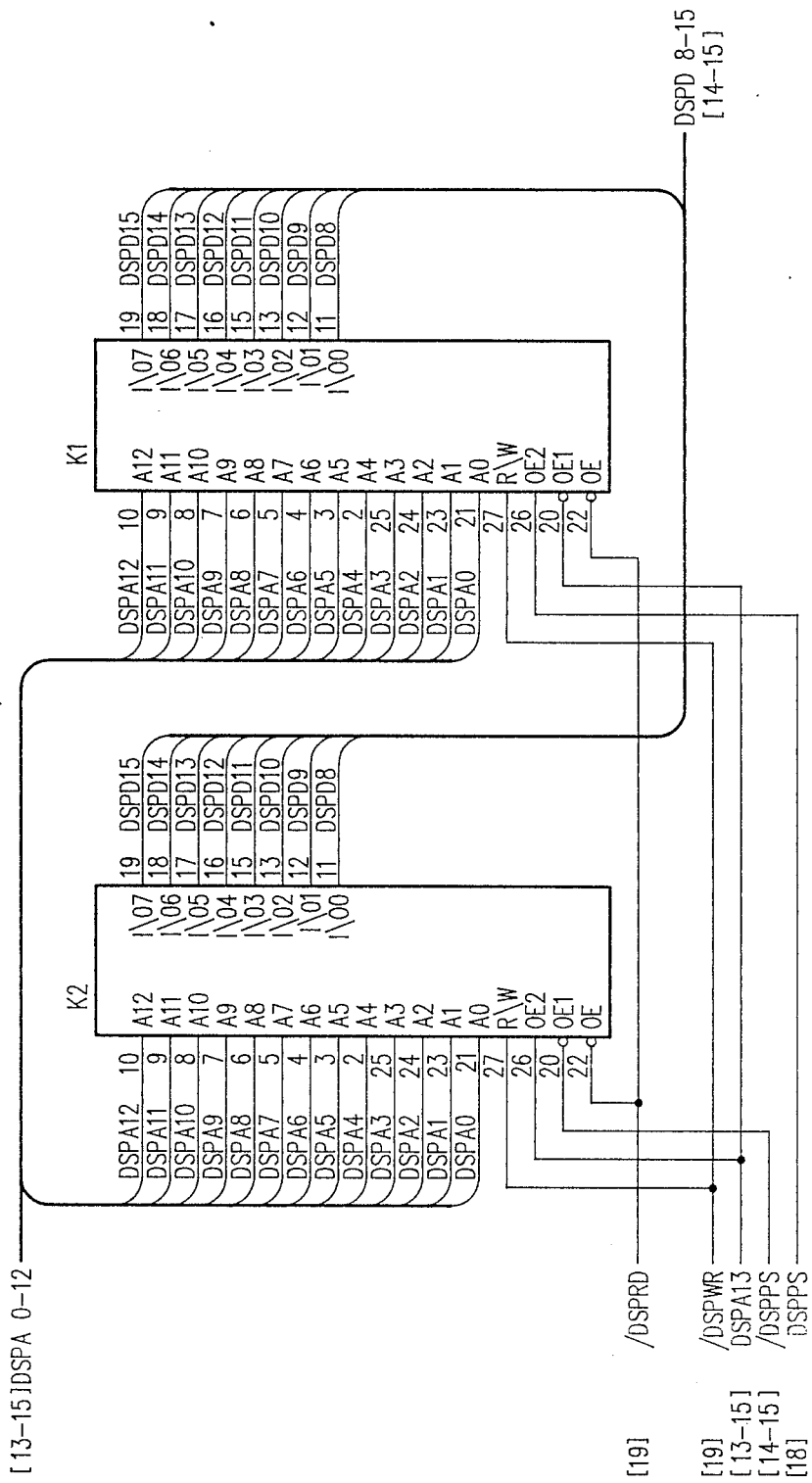

The data RAM of the compression system is four 32K×8 static RAM H5, K5, H3, K3, as shown in FIG. 16. The program memory bank of the compression system is four 8K×8 static RAM H1, H2, K1, K2 (FIG. 17 and FIG. 18). The low byte of the program memory H2, H1 is shown in FIG. 17 and the high byte of the program memory bank K1, K2 is shown in FIG. 18. Since the data memory and the program memory are comprised of more than one RAM, a method for selecting between the RAMs is necessary.

The compression system data memory H3, H5, K3, K5 are selected using signals on the lines /DSPDS0 and /DSPDS1. As previously described, the signal on line /DSPDS is determined by the signal on the line /DATA and the signal on the line PROG/DATA that was loaded in the compression system when the address code was 309H, as described above. The signal on the /DSPDS is low when the data memory has been selected by the computer.

The signal on line /DSPDS is provided to a first input terminal F6A-1 of OR gate F6A (FIG. 19) and to a first input terminal F6B-4 of OR gate F6B. The second input terminal F6A-2 is driven by the signal on line DSPA15. The line DSPA15 also drives inverter D1F which in turn generates a signal that is supplied to the second input terminal F6B-5 of OR gate F6B. Since the signal on line /DSPDS is low when the computer wants to write to the data memory banks of the compression system, the signal on line DSPA15 determines the output signal from OR gates F6A and F6B. If the signal on line DSPA15 is high, then the signal on line /DSPDS0, which is connected to the output terminal of OR gate F6A, is high and the signal on line /DSPDS1, which is connected to the output terminal of OR gate F6B, is low.

The signal level on line DSPA15 is determined by the address present on the data bus. If the address on the data bus is less than 8000H then the signal from the QD output terminal D3-11 of counter D3 (FIG. 13) is low and the low signal is passed by buffer E4 to line DSPA15. Consequently, the line /DSPDS0 is low and the data memories H5 and K5 are selected as the active memories. During this time, the signal on line /DSPDS1 is high and so the data memories K3 and H3 are tristated. Conversely if the address present on the data bus is greater than or equal to 8000H, then the signal generated on the line DSPA15 will be high so that data memories H3 and K3 are the active memories and the memories K5 and H5 are tristated.

The compression system program memory H2, K2 and H1, K1 are selected by the address signal line DSPA13. The address signal line DSPA13 is driven by the QB terminal D3-13 of counter D3 in a manner similar to the way line DSPA15 is driven by the QD terminal.

When the address present on the data bus is less than 2000H then the signal on line DSPA13 is low which in turn enables memory H1 and K1 and tristates memory H2 and K2. When the address on the data bus is greater than or equal to 2000H, the program memory H2 and K2 are enabled and the memory H1 and K1 are tristated. All the program memory is tristated when the signal on the line /DSPPS is deselected, i.e., when the computer has selected not to read or write to the compression system program memory. The line /DSPPS is selected when the computer has provided a one on the PROG/DATA line, the signal on the line /DATA is low, and the signal on the line /HOLDA is also low.

Figure 11:
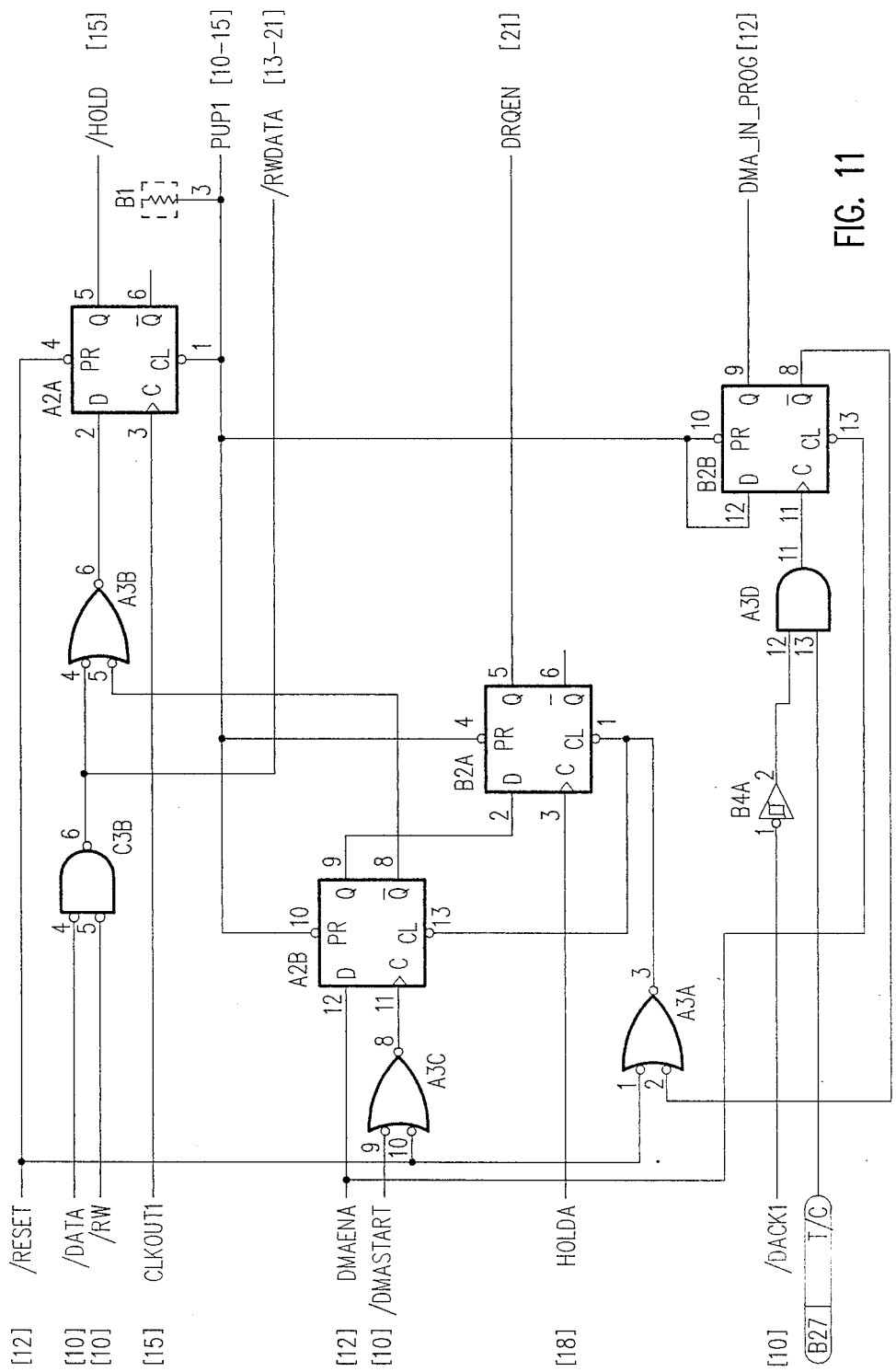

Using the address codes to capture data sent over the data bus, the computer has now initialized the address counters and configured the compression system so that the memory is ready to receive data. The computer next provides an address code of 30FH on the address bus. Accordingly, the signals on lines A2 through A0 are 1,1,1 (FIG. 10). Thus, the signals on the input terminals C6-1, C6-2, C6-3 of the three-to-eight decoder C6 are all high. Decoder C6 generates a low signal on output terminal C6-7. The low signal from terminal C6-7 is applied to a first input terminal B5A-2 of OR gate B5A. The signal on line /WR is applied to the second input terminal B5A-1 of OR gate B5A. When the address code 30FH is supplied by the computer, the signal on line /IOW is driven low which in turn drives the signals on lines /RW and line /WR both low, as previously described. Thus, the output signal from OR gate B5A on line /DMASTART is low (FIG. 10 and FIG. 22d). The low signal on line /DMASTART is applied to the clear terminal B2B-13 of the D flip-flop B2B (FIG. 11). Consequently, flip-flop B2B is cleared which generates a low signal on the Q output terminal B2-9, which is connected to the line DMA_IN_PROG. The low signal on line DMA_IN_PROG is available to the computer through buffer A5 (FIG. 12).

The low signal on line /DMASTART is applied also to a first input terminal A3C-9 of AND gate A3C (FIG. 11) which drives the output signal from AND gate A3C low. When the computer drives the signal on line /IOW high, both the signals on the line /RW (FIG. 22c) and the line /WR go high. Thus, the output signal from OR gates B5A drives the signal on line /DMASTART high (FIG. 22d). The rising edge of the signal on line /DMASTART drives the output signal from AND gate A3C high which in turn clocks flip-flop A2B.

The clocking of flip-flop A2B generates a low signal on Q complement output terminal A2B-8 because the high signal on line DMAENA, described previously, is applied to the D input terminal A2B-12 of flip-flop A2B. The low signal from terminal A2B-8 is applied to an input terminal A3B-5 of AND gate A3B. The resulting low output signal from AND gate A3B is applied to the D input terminal A2A-2 of flip-flop A2A. Thus, the next clock pulse on line CLKOUT1 (FIG. 22f) to the clock terminal A2A-3 of flip-flop A2A latches the low signal on input terminal A2A-2 and consequently generates a low signal on line /HOLD (FIG. 22e) which is connected to output terminal A2A-5 of flip-flop A2A.

The low signal on line /HOLD is applied to terminal E1-A7 of signal processor E1 (FIG. 15). If the signal processor is not active, the signal processor immediately generates a low signal on terminal E1-E10 which is connected to the line /DSPHOLDA, but if the signal processor is in the midst of an instruction, the low signal is not generated on line /DSPHOLDA by the processor until the processor has completed the instruction. As previously described, the low signal on line /DSPHOLDA generates a low signal on line /HOLDA (FIG. 22g) and a high signal on line HOLDA. The potential delay in generating the low signal on line /DSPHOLDA by the signal processor E1 is represented in FIG. 22g by the dashed lines which show that the initiation of the signal on line /HOLDA is variable.

When the signal on line HOLDA goes high, flip-flop B2A (FIG. 11) is clocked and the high signal on input terminal B2A-2, which was generated by the previous clocking of flip-flop A2B by the signal on line /DMASTART, is provided to the line DRQEN which is connected to output terminal B2A-5.

Figure 21:
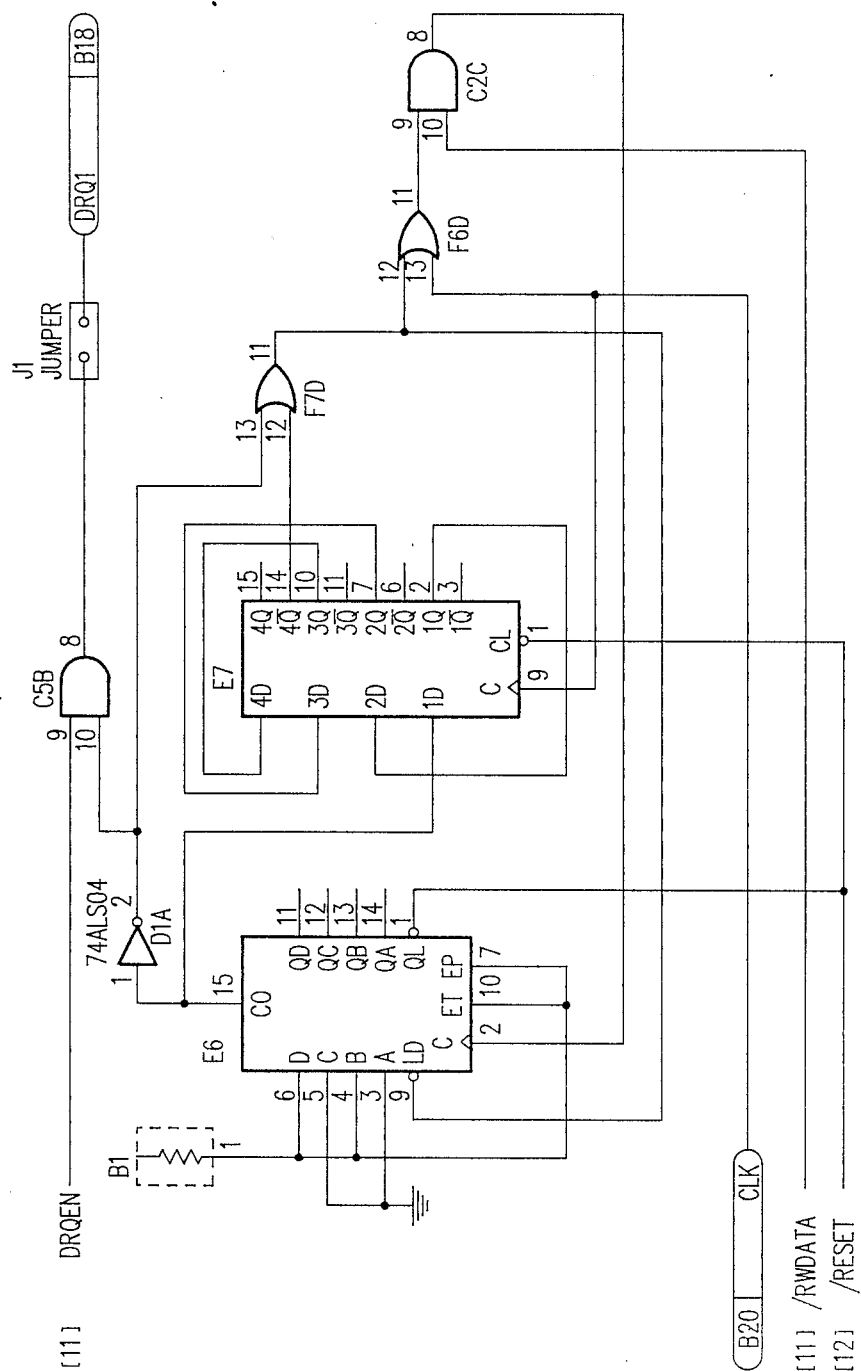

When the signal on line DRQEN goes high, the high signal is applied to the input terminal C5B-9 of AND gate C5B in FIG. 21. The second input terminal C5B-10 of AND gate C5B is also high because the carry ripple output terminal E6-15 of counter E6 is low. This low signal drives the output signal from inverter D1A high and this high signal is applied to input terminal C5B-10. Accordingly, the high output signal from AND gate C5B generates a high signal on the output line DRQ1 (FIG. 22h) to the IBM PC. The line DRQ1 is the DMA request line to the computer. Notice that the jumper J1 in FIG. 21 must be in place for line DRQ1 to operate. The computer and the compression system are now ready to start the actual transfer of data. During the transfer, the address counter and the RAM bank select function as described above.

Figure 23:
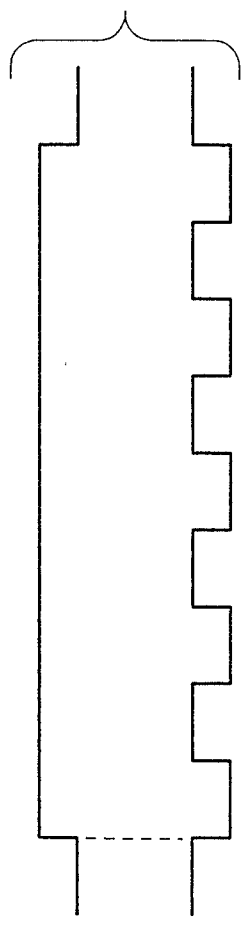
FIG. 23 illustrates the timing for a normal IBM PC XT direct memory access transfer of 5 bytes.

The section of the compression system shown in FIG. 21 is a unique circuit which significantly enhances the data transfer capability of the IBM PC XT. While this circuit is used in the preferred embodiment in a compression system, the circuit can be incorporated in any system to enhance DMA transfers. To fully understand the significance of this circuit, first consider a normal DMA data transfer using the IBM PC. To initiate the transfer as shown in FIG. 23, the DRQ1 signal goes high and remains high while data is to be transferred. The DACK complement signal goes low and a single data transfer is made. At the end of that transfer, the computer releases the DACK complement signal, i.e. the signal goes high, and the DRQ1 signal is interrogated by the computer to determine whether further data transfer is needed. Since DRQ1 is still high, the IBM PC sets the DACK complement signal low again, and permits another data transfer. The computer continues making single data transfers until the transfer is complete and the DRQ1 signal goes low.

In an ideal DMA data transfer, the DACK complement signal would simply go low and remain low until a complete block of data had been transferred. However, the volatile nature of the memory in the IBM PC requires that the memory be refreshed at set time intervals and accordingly, if a block transfer exceeded this time interval, the memory would be lost. Accordingly, an intermediate approach has been developed whereby a selected number of DMA data transfers are made and then the DACK complement signal is allowed to return to a high level by removing the high DRQ1 signal. The IBM PC XT, at this point, can refresh the memory if needed and if not, return the DACK complement signal to the low state since the DRQ signal has subsequently returned to a high level. This function is accomplished using the circuitry in FIG. 21.

When the IBM PC sets the signal on the line /DACK1 low the direct memory access transfer begins. Recall, that when the signal on line /DACK1 goes low, the signal on line /DATA also goes low. As previously described, when the signal on the /DATA line is low, the signal on line /RWDATA, which is connected to output terminal C3B-6 of OR gate C3B (FIG. 11), is determined by the signal on line /RW. Consequently, the signal on line /RWDATA clocks with the signal on line /RW, as shown in FIG. 22c and FIG. 22k.

The signal on line /RWDATA is applied to a first input terminal C2C-10 of the AND gate C2C (FIG. 21). The second input terminal C2C-9 of AND gate C2C is held high by a signal from inverter D1A, described previously, which passes through OR gates F7D and F6D to terminal C2C-9. Thus, the output signal of AND gate C2C on terminal C2C-8 follows the clock signal on line /RWDATA. The system clock clocks the flip-flops in integrated circuit E7 and the output signal from AND gate C2C clocks the counter E6.

When the signals on the input terminals of counter E6 are loaded into counter E6, the counter is programmed so that the counter E6 counts six clock pulses and generates a rollover signal on the carry ripple output terminal E6-15. When counter E6 generates a high signal on terminal E6-15, the high signal is applied to inverter D1A and to the input terminal E7-4 of the first flip-flop in the quad D type flip-flop integrated circuit E7. The four flip-flops in integrated circuit E7 are configured as a four-stage shift register. The inverter D1A generates a low output signal (FIG. 22m) in response to the high signal on its input terminal and the low output signal drives the output signal from AND gate C5B low. The low output signal from AND gate C5B drives line DRQ1 low (FIG. 22h).

Thus, the direct memory access allows six data transfers to occur and then the high signal on the line DRQ1 to the host computer is released. When the signal on line DRQ1 is released, the IBM PC XT releases the low signal on line /DACK1, as described below, before the signal on line /RW goes low again. When the signal on line /DACK1 goes high, the signal on line /DATA goes high. The high signal on the line /DATA drives the signal on the line /RWDATA to a high signal. Hence, no clock pulses are clocked through AND gate 2C2 to the clock input terminal E6-2 of counter E6. Notice that the input terminal F7D-12 or OR gate F7D is connected to the Q complement output terminal E7-14 of the fourth flip-flop in integrated circuit E7 so that a high signal is maintained at the second input terminal C2C-9 of AND gate C2C even though the output signal from inverter D1A to the input terminal F7D-13 of OR gate F7D has gone low.

Four system clock pulses (FIG. 22n) are required to shift the high signal on terminal E7-4 into the fourth flip-flop in integrated circuit E7 and this allows enough time for the host computer to release the low signal on line /DACK1 and thus relinquish the computer control bus. On the fourth system clock pulse, a high signal is loaded into the fourth shift register of integrated circuit E7 and so the output signal on the Q complement terminal E7-14 goes low (FIG. 22p). Thus, both input signals to OR gate F7D are now low, and consequently OR gate F7D generates a low output signal which is applied to the load terminal E6-9 of counter E6.

Further, the output signal of OR gate F6D to AND gate C2C is now controlled by the system clock on input terminal F6D-13 of OR gate F6D. Accordingly, the fifth system clock pulse loads counter E6 so that high signal on line DRQ1 (FIG. 22h) is reasserted. During this time, if the computer memory does not require refreshing (FIG. 22h through 22p), the DMA transfer cycle is continued by the computer setting the signal on the line /DACK1 low again.

However, if the memory requires refreshing (FIG. 22q through 22s), after the signal on line DRQ1 is low (FIG. 22r), the computer takes control of the DMA channel and the bus. The compression system waits until the refresh cycle has been completed before it again takes control of the bus. The compression system takes control of the bus when the signal on the line DACK1 again goes low (FIG. 22q) and at this point another six compression system DMA cycles are initiated (FIG. 22s).

Figure 22:
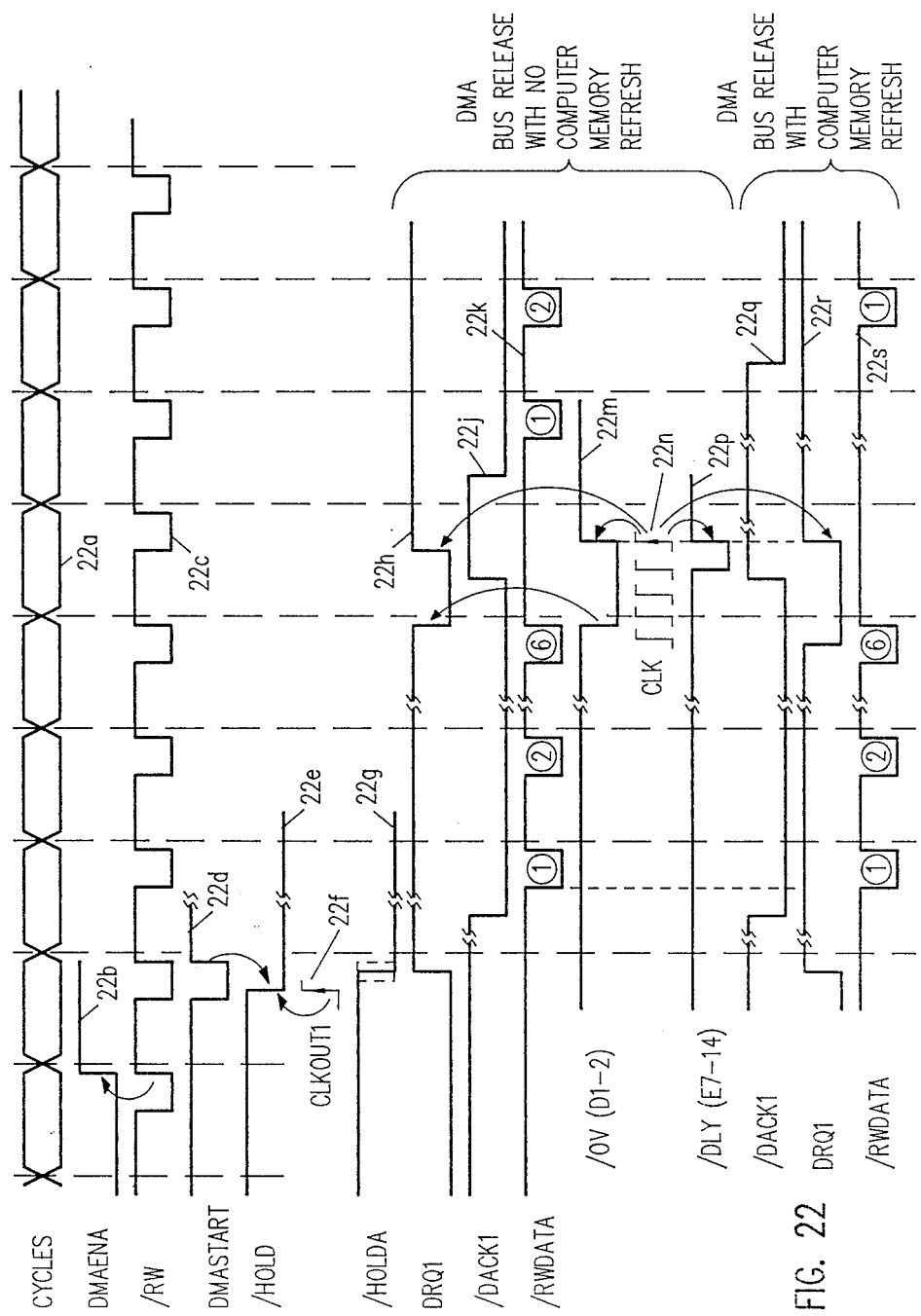
FIG. 22 illustrates the timing of the direct memory access of this invention.

The timing diagram in FIG. 22 demonstrates the general timing for a DMA transfer, but within each bus cycle when six data transfers are made to or from the compression system further timing is required because the compression system is designed to operate with 16 bits. Sixteen bits provides a high degree of accuracy in the compression process. However, the host computer system, the IBM PC XT, is designed to only input or receive 8 bit data from the compression system. Accordingly, when data is written from the PC to the compression system, the 8 bits of data must be configured as 16 bits and conversely, when data is transferred from the compression system through the computer, the 16 bit data must be reduced to 8 bits so that the computer can read the data. This conversion is accomplished in the compression system by dividing the data transfer into a low byte cycle and a high byte cycle.

Figure 24:
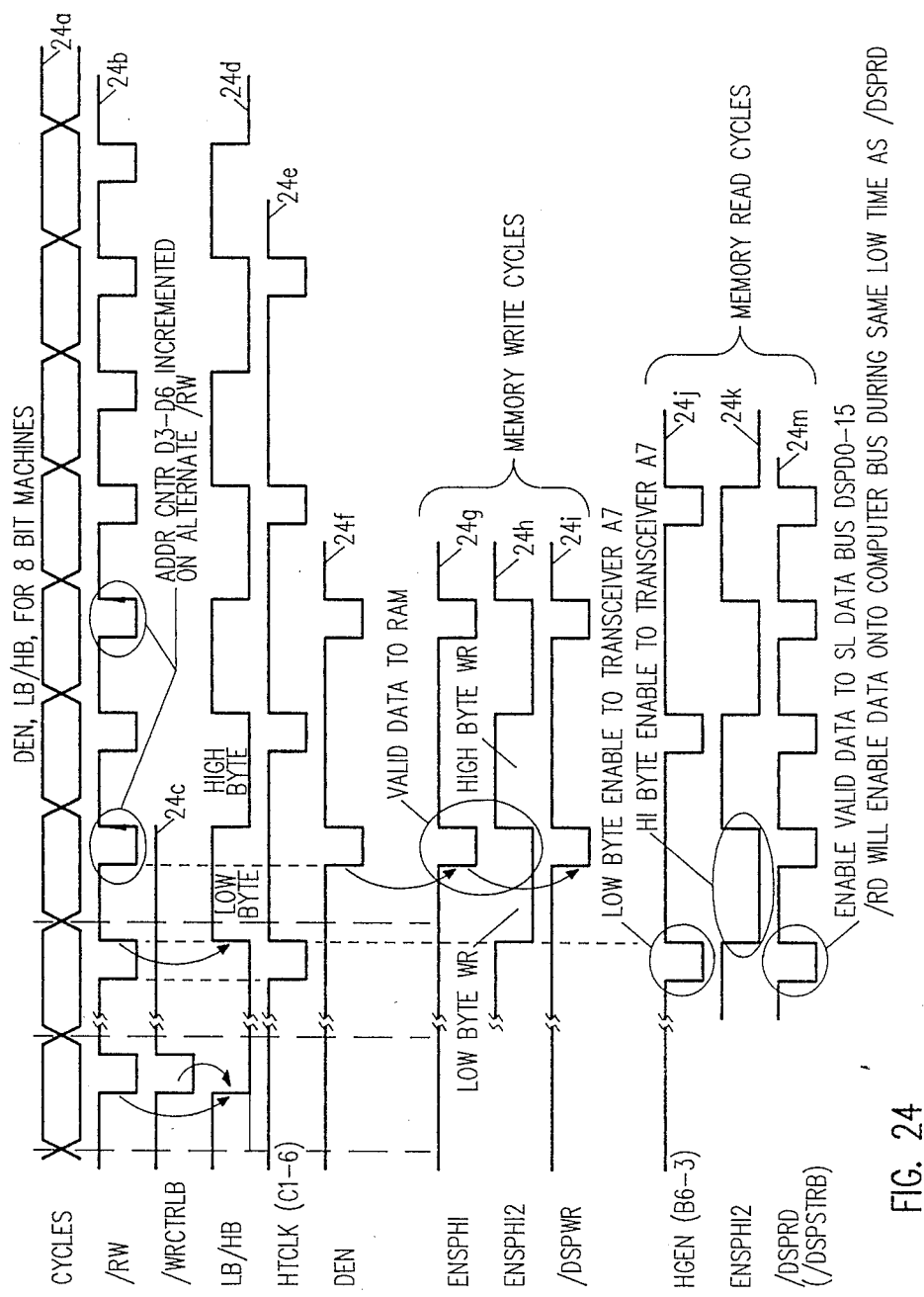
FIG. 24 is a timing diagram for the read and write operations during a direct memory access.

During DMA write cycles, the computer first initializes the address counter and the phase of flip-flop C4A (FIG. 13), as previously described. The clearing of flip-flop C4A by the low signal on line /WRCTRLB generates a low signal on the line LB/HB which is connected to the Q output terminal C4A-5 of flip-flop C4A. See FIG. 24b through FIG. 24d. Further, as previously described, when data is transferred during DMA, the signal on line /DATA is low and the signal on line /RWDATA follows the signal on line /RW (FIG. 22c and FIG. 22k). Also, the flip-flop C4A divides the signal on line /RWDATA by two. Thus, the signal on line LB/HB, which also increments the address counter D3 through D6, goes high with every other high signal on line /RWDATA (FIG. 24b and FIG. 24d).

When data is DMA transferred, the signal on line /DATA is low, and so the signal on the ,/IOW line generates the pulses on the line /RW when the computer is writing to the IO device, i.e. the compression system, as previously described. Line /IOW is also connected to the line /WR through buffer C7, as previously described. Thus, the signals on line /WR and on line /RW are the same during the DMA data transfer. Further, during this time the signal on line /HOLDA is also low.

Figure 14A:
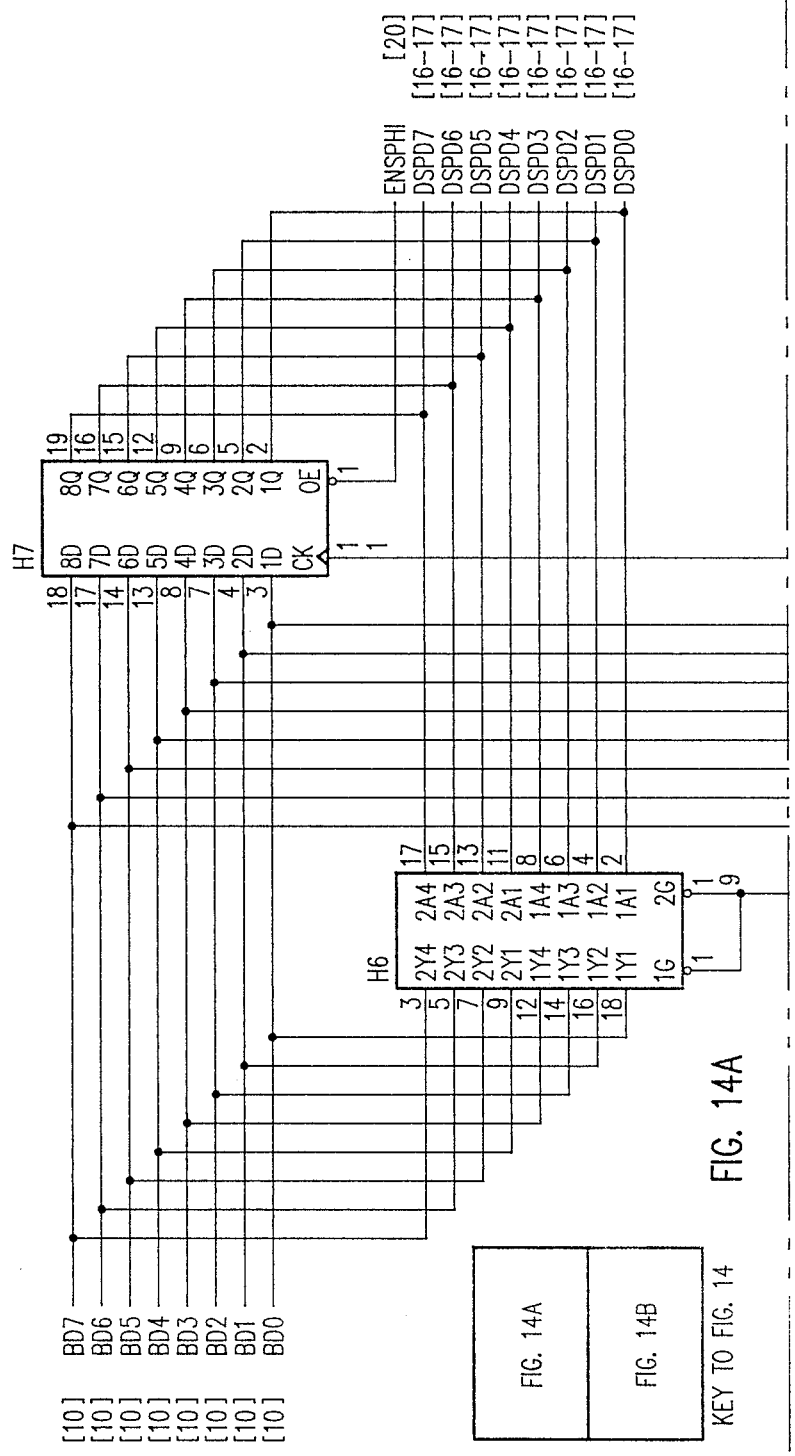
Figure 14B:
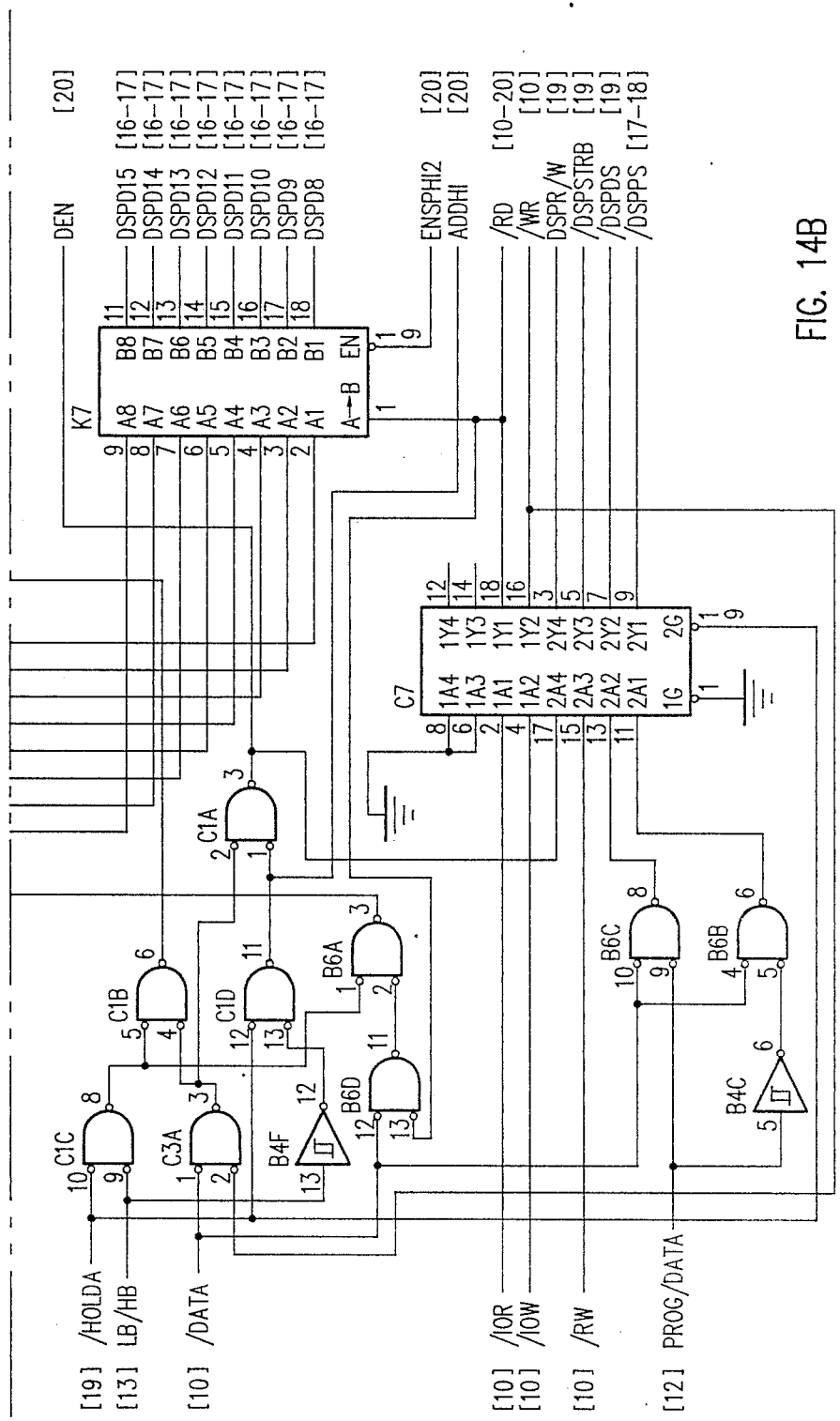

The low signal on line /HOLDA is a first input signal to OR gate C1C and OR gate C1D (FIG. 14). The signal on line LB/HB is a second input signal to OR gate C1C. Thus, the output signal of the OR gate C1C is determined by the signal on line LB/HB.

The signal on line LB/HB also drives Schmitt trigger inverter B4F and the output signal from inverter B4F is a second input signal to OR gate C1D. Thus, the output signal of OR gate C1D is also controlled by the signal on the line LB/HB, but the output signal of OR gate C1D is out of phase with the output signal of OR gate C1C.

The low signal on line /DATA is a first input signal to OR gate C3A and the second input signal is provided by the line /WR, which follows the signal on line /RW as described above. Thus, the output signal of OR gate C3A is determined by the signal on line /WR (FIG. 14).

Since the output signals from OR gate C1C and OR gate C3A are the first and second input signals respectively to OR gate C1B, the output signal of OR gate C1B, which clocks octal flip-flop integrated circuit H7, is the sum of the signals on line LH/HB and line /WR (FIG. 14).

The output signal of OR gate C1D drives the line ADDHI and is a first input signal to the OR gate C1A. The second input signal to OR gate C1A is the output signal of OR gate C3A which, as previously described, is determined by the signal on the line /WR. Accordingly, the inverse of the signal on the line LB/HB, and the signal on line /WR determine the signal on the line DEN (FIG. 24f) which is connected to the output terminal of OR gate C1A. The output signal of OR gate C1A is also passed through buffer C7 to line DSPR/W.

Since the ground to jumper J2 is missing in FIG. 20, the output signal of NAND gate A4D to a first input terminal C3C-9 of OR gate C3C is low. The signal on the line DEN is applied to the second input terminal C3C-10 of OR gate C3C and so the signal on line DEN determines the output signal of OR gate C3C. The output signal of OR gate C3C drives the line ENSPHI. Hence, the signal on line ENSPHI is in phase with the signal on line DEN (FIG. 24f and FIG. 24g).

The signal on line ADDHI is a first input signal to OR gate C3D (FIG. 20) and the low output signal from NAND gate A4D, described above, is a second input signal. Thus, the signal on line ADDHI determines the signal on line ENPSHI2 which is connected to output terminal C3D-11 of OR gate C3D. The signal on line ENPSHI2 (FIG. 24) is the inverse of the signal on line LB/HB, because the signal on line ADDHI is the inverse of the signal on line LB/HB. The signal on line ENSPHI is provided to the output enable terminal H7 of octal flip-flop H7 (FIG. 14) while the line ENPSHI2 is connected to the enable terminal K7-19 of the transceiver K7.

The signal on the line to pin A7-19 of transceiver A7 from AND gate C5A is low because the signal on the line /DACK1 is low during DMA transfer. Since the signal on the line /RD is high during the write cycle, the incoming data byte from the computer bus on lines D0 through D7 is passed through transceiver A7 (FIG. 10) to the lines BD0 through BD7, which are connected to the input terminals of H7 and K7 in FIG. 14.

The incoming data byte is assembled as a 16 bit word by the octal flip-flop H7 and transceiver K7. As described above, the enable terminal of the octal flip-flop H7 is controlled by the signal on line ENSPHI (FIG. 24g), and the enable terminal of the octal transceiver K7 is controlled by the signal on line ENSPHI2 (FIG. 24h).

In the write to the compression system, the computer first sends the lower order byte on the lines BD0 through BD7. The byte on these lines is clocked into the octal flip-flops H7 by the output signal from OR gate C1B (FIG. 24e), as described above, which corresponds to the signal on line LB/HB going high (FIG. 24d). On the next bus cycle, when the high order byte is present on lines BD0 through BD7, the stored low byte in the octal flip-flop H7 is enabled onto the compression system RAM bus DSPD0 through DSPD7 by the signal on the line ENSPHI going low (FIG. 24g), and simultaneously the higher order byte is enabled out of transceiver K7 by the low signal on line ENSPHI2 (FIG. 24h). A valid 16 bit word of data is now present at the data input terminals of the RAM H5, H3, K5, K3, H1, H2, K1, and K2 in FIGS. 16 through 18 respectively. The actual RAM into which the data is written is determined by the signals on line /DSPDS and on line /DSPPS as well as on the bank select signals. The RAM selection was described above and that discussion is incorporated herein by reference.

However, to write to the RAM not only must a bank be selected, but also the RAM must be write enabled while valid data is present on the RAM input terminals. As previously described, the signal from line DEN is passed through buffer C7 to line DSPR/W when the second bank of buffer C7 is enabled by the low signal on line /HOLDA. Similarly, the signal on line /RW is buffered through integrated circuit C7 to the line /DSPSTRB. Signals on line DSPR/W and line /DSPSTRB are the first and second input signals respectively to OR gate F7B (FIG. 19). Thus, the output signal of OR gate F7B on line /DSPWR (FIG. 24i) is the sum of the signals on line DEN and line /RW enabled with /HOLDA. The signal on line /DSPWR is used to enable the writing of the signals on the data inputs of the RAMs into the RAMs.

During the write to the compression system, a data bus contention between the read and write paths in the compression system must be avoided, because the data bus is used for both operations. The direction control of transceiver K7 prevents a contention for the high byte of data, but the low byte of data during a read is controlled by buffer H6 (FIG. 14). During the write, the buffer H6 is tristate. During the write mode, the signal on the line /IOR is high and this signal is passed to line /RD through the transceiver C7. Accordingly, the OR gate B6D, which has a first input signal from line /DATA and a second input signal from line /RD, generates a high output signal on terminal B6-11 which in turn drives the output signal of OR gate B6A high. The high signal from OR gate B6A tristates the octal buffer H6.

Thus, by using a series of signals from the host computer the data for compression or expansion has been transferred to the compression system using a direct memory access transfer with the IBM PC XT. As previously described, the compression system operates on a strip of data consisting of sixteen lines. Thus, a DMA transfer is performed as each strip of data is moved into the compression system. Similarly, prior to initiation of the compression or expansion, direct memory access transfer was used to load the appropriate process into the program memory of the compression system.

After the data has been compressed or expanded, the data is transferred from the compression system using DMA so that new data can be moved into the compression system for processing. Data is moved from the compression using DMA memory read cycles as described below.

Prior to initiating the memory read cycle from the compression system, the IBM PC XT first loads the address for the initiation of the read in the data RAM of the compression system. The compression system loads this address into the address counters, as previously described. Further, the address counters function as previously described because the signals which control the counters on the line /DATA and the line /RW data are similar to those previously described except that in the write cycle the signal on line /IOW controlled the signal on the line /RW and now the signal on line /IOR controls the signal on line /RW.

During the DMA read cycles, the IBM PC XT maintains the signal on line /IOW high and uses the signal on line /IOR to direct the DMA read from the compression system. Recall that the signal on the line /IOW is buffered by buffer C7 and a corresponding signal is provided on the line /WR. The signal on line /WR was used in conjunction with the signals on the line /HOLDA, line /DATA and line LB/HB along with logic gates C1C, C3A, C1D, and C1A (FIG. 14) to generate the signal on line DEN. Since the signal on line /WR is high during the DMA read, the signal on line DEN is similarly high. The high signal on line DEN is passed through OR gate C3C (FIG. 20) to the line ENSPHI. The high signal on line ENSPHI tristates write latch H7 (FIG. 14) and thus eliminates bus contention from the write path of the compression system.

Since the data in the compression system data RAM is 16 bits wide, the data that is read from the RAM must also be separated into a high bit read cycle and a low bit read cycle so that 8 bit data can be presented to the IBM PC XT data bus.

The read path for the low data byte is from the data RAM over the lines DSPD0 to DSPD7 through the buffer H6 (FIG. 14) to the lines BD0 through BD7 and then through bi-directional transceiver A7 (FIG. 10) to the computer data bus. Hence, the enable terminals H6-1 and H6-19, which are tied together, of buffer H6 control when the data on the lines DSPD0 through DSPD7 are supplied to the computer output bus. Buffer H6 is enabled by the output signal from OR gate B6A (FIG. 14). The sequence of signals to OR gate B6A is given below.

The signal on line /DATA, which is low during DMA data transfers, is applied to a first input terminal of OR gate B6D (FIG. 14) and the signal on the line /RD, as previously described, is supplied to a second input terminal of OR gate B6D. The output signal from OR gate B6D drives a first input terminal of OR gate B6A, while the second input terminal of B6A is driven by the output terminal of OR gate C1C.

As described above in the DMA write operation, when the signal on line /HOLDA is low, the output signal of OR gate C1C (FIG. 14) is determined by the signal on line LB/HB. The signal on line LB/HB is identical to that previously described, but again the signal on line /RWDATA, which clocks flip-flop C4A (FIG. 13), is controlled by the signal on line /IOR rather then the signal on line /IOW, as described above. Thus, the timing diagram for the signal on the line LB/HB, as shown in FIG. 24d, is the same for the read and the write cycles, as is the signal on the line /RW shown in FIG. 24b.

Thus, the output signal from the OR gate C1C to the input terminal of the OR gate B6A is just the signal on line LB/HB as shown in FIG. 24d. Therefore, the output signal from OR gate B6A (FIG. 24f) is the sum of the signals on the line /RW and the line LB/HB and thus, buffer H6 is enabled during alternate low signals on line /IOR and line /RW and the low byte of data is supplied to the computer data bus when buffer H6 is enabled.

The read path for the high data byte from the compression system to the computer is through the bi-directional transceiver K7 (FIG. 14) to the lines BD0 through BD7. The direction control terminal K7-1 of the bi-directional tranSCeiver K7 is driven by the signal on the line /IOR after the signal is passed through buffer C7. When the signal on the line /IOR is low, data are transmitted from lines DSPD8 through DSPD15 from the data RAM to lines BD0 through BD7, if the signal on enable terminal K7-19, which is provided by line ENSPHI2, is low.

As previously described, the signal on the line ENSPHI2 is determined by the signal on line ADDHI, which in turn is determined by the output signal of the inverter B4F. The output signal of B4F is determined by the signal on the line LB/HB and so, as shown in FIG. 24k, the signal on the line ENSPHI2 is the same as the signal on that line during the write mode. Further, the signal on line ENSPHI2 is out of phase with the enable signal to the bi-directional transceiver H7 so that the low bit and the high bit read cycle are not in contention.

Recall that the signal on the line DSPR/W is the same as a signal on the line DEN after it passes through buffer C7. Thus, during the read cycle the signal on line DSPR/W is high just as the signal on line DEN. The high signal on line DSPR/W is input to the inverter D1B (FIG. 19) and the low output signal from inverter D1B is applied to a first input terminal of OR gate F7C. The second input signal to OR gate F7C is from the line /DSPSTRB. Thus, the signal on line /DSPRD, which is connected to the output terminal F7C-8 of OR gate F7C, is determined by the signal on line /DSPSTRB. Again, as in the write DMA cycle, the signal on the line /DSPSTRB is the buffered signal from buffer C7 of the signal on line /RW. Thus, the signal on line /DSPRD is derived directly from the signal on the line /RW, and the compression system enables data RAM so that validated data are on the compression system data bus during the read time as defined by the low signal on line /IOR.

When the DMA controller in the computer has reached the terminal count for either a direct memory access read or a direct memory access write, the signal on the line T/C from the pin B27 (FIG. 11) of the computer is activated. The high signal on line T/C is applied to a first input terminal A3D-13 of AND gate A3D (FIG. 11). The second input signal on terminal A3D-12 of AND gate A3D is provided by an inverter which inverts the signal on the line /DACK1. The signal on line /DACK1 is low during DMA transfers. Accordingly, the second input terminal of AND gate A3D also has a high signal and the output signal from AND gate A3D on terminal A3D-11 clocks the flip-flop B2B. The clocking of B2B generates a high signal on the line DMA_IN_PROG, which is connected to the output terminal B2B-9 and a low signal on the Q complement terminal B2B-8. A high signal on the line DMA_IN_PROG indicates that the DMA transfer is deactivated Simultaneously, the low signal from the terminal B2B-8 drives the output signal of AND gate A3A low which in turn clears flip-flop B2A and therefore generates a low signal on line DRQEN. When the signal on line DRQEN goes low, the signal on line DRQ1 (FIG. 21) is forced low, the low signal on line DRQ1 drops the DMA request signal. When the DMA request signal is dropped, the signal on line /DACK1 goes high and the DMA transfer is complete.

Thus, when the compression system is used in the IBM PC XT the circuit in FIG. 21 causes the DMA transfer to proceed at a rate higher than that normally available. Also, the compression system uses the signals provided by the IBM PC XT to either translate 8 bit data into 16 bit words during writes to the compression system or convert 16 bit words into 8 bit words during reads from the compression system.

When the compression system is used in the IBM PC AT the operation is similar to that described above except that rather than a direct memory access an IO read/write is employed for data transfers between the computer and the compression system. Since the IBM PC AT has a 16 bit bus, the data bus in the compression system must also be configured as a 16 bit bus. This is accomplished as shown in FIG. 20 where the first 8 bits of the computer data bus are coupled to transceiver K6 and the second 8 bits are provided on lines D08-D15 which are connected to the input terminals of transceiver D7.

The initialization of the compression system for operation in the IBM PC AT is identical to that described for the IBM PC XT and therefore will not be repeated. However, the ground at jumper J2 in FIG. 20 is present so that the signal on line /BT16 is low and the signal to both input terminals of NAND gate A4D is low so that the output signal from NAND gate A4D is high. The high output signal from NAND gate A4D passes through OR gate C3C and OR gate 3CD to generate a high signal on line ENSPHI and line ENSPHI2 respectively. The high signal on the line ENSPHI tristates the octal flip-flop H7 and the high signal on the line ENSPHI2 tristates the bi-directional transceiver K7. Since these devices provide the data path to the compression system data RAMS for 8 bit machines during DMA transfers, their removal from the circuitry removes any potential bus contentions.

Again, in using the compression system with an IBM PC AT, the computer must initiate the data transfers to or from the compression system because the signal processor E1 of the compression system can communicate only with the control lines, data bus and program bus of the compression system. The computer uses an I/O write to transfer data from the computer data bus into the data RAMS of the compression system.

Prior to initiating a data transfer, the IBM PC AT loads the address counter using address codes and locations on the 16 bit data bus. The RAM bank select functions as previously described. The signal used to control the I/O write transfer is the signal on the line /IOW which is low during the writes.

Figure 25:
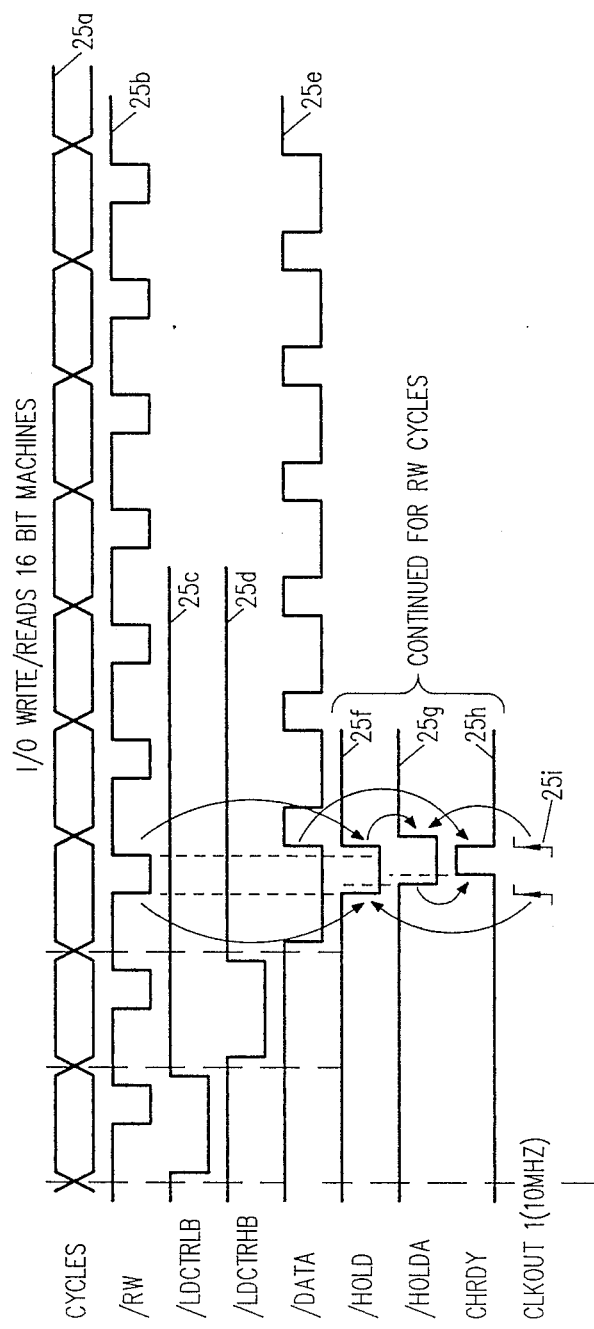
FIG. 25 is a timing diagram for the I/O data transfer when the compression system is used in an IBM PC AT computer.

The operation of the logic circuitry is similar to that described above. However, the line /DACK1 is always disabled, i.e., a high signal is present on line /DACK1, during 16 bit transfers. Therefore the signal on line /DATA is activated for every decode of address 308H by comparator 7 and decoder C6, as previously described. The signal on line /IOW controls the output signal of NAND gate A4A (FIG. 10) because during the write cycle the signal on line /IOR is high. The output signal from NAND gate A4A drives NAND gate A4B. The output signal from NAND gate A4B drives the line /RW (FIG. 25b). OR gate C3B (FIG. 11) sums the signal on the line /DATA and the line /RW and provides the output signal to a first input terminal of AND gate A3B. The second input terminal to AND gate A3B has a high signal from the output terminal A2B-8 of flip-flop A2B. Thus, with the high signal on the second input terminal A3B-5 of AND gate A3B, the output signal of AND gate A3B is determined by output signal from OR gate C3B. Therefore, when the computer supplies address 308H to enable line /DATA, i.e., sets the signal on line /DATA low, and the computer sets the signal on the line /IOW low which in turn drives the signal on line /RW low, a low signal is applied to the input terminal of flip-flop A2A by AND gate A3B. The next clock signal on the line CLKOUT1 (FIG. 25i), clocks the low signal to the Q output terminal A2A-5, which drives the line /HOLD low (FIG. 25e). Again, as previously described, when the signal processor E1 receives the low signal on /HOLD it completes the instruction that is currently performing and then generates a low signal on the line /DSPHOLDA. The low signal on the line /DSPHOLDA is inverted by the inverter D1C and applied to the line HOLDA and to the input terminal of inverter D1D. Inverter D1D in turn generates a low signal that is provided on the line /HOLDA (FIG. 25g). Accordingly, the signal processor E1 is tristated from the data bus and the bus is available for writing data to the RAM.

The RAM are loaded in the following fashion. Recall that the signal on the line /BT16 is set low and this low signal is applied to the preset terminal C4A-4 of flip-flop C4A (FIG. 13). The low signal terminal C4A-4 holds the flip-flop in the preset condition, which in turn generates a high signal on the line LB/HB. Accordingly, in FIG. 14 the output signal from OR gate C1C is high and this high signal drives the output signal of OR gate B6A high which in turn tristates buffer H6.

The OR gate C3A (FIG. 14) has a first input signal from line /DATA and second input signal from line /WR. Therefore, when the signal on line /DATA is low, the output signal from OR gate C3A follows the signal on the line /WR and the output signal of OR gate C3A is applied to a first input terminal of OR gate C1A. The high signal on the line LB/HB drives the output signal from inverter B4F low and this low signal is applied to input terminal C1D-13 of OR gate C1D. The second input terminal C1D-12 of OR gate C1D has a low signal from line /HOLDA so that the output signal of OR gate C1D is low. This low signal is applied to the second input terminal C1A-1 of OR gate C1A so that the output signal of OR gate C1A also follows the signal on the line /WR because as described above the signal on line /WR is passed to the first input terminal of OR gate C1A by OR gate C3A.

Recall, that during writes, the signal on line /WR is the same as that on line /RW (FIG. 25b). The output signal from OR gate C1A is buffered through buffer C7 and provided to line DSPR/W. The signal on the line DSPR/W generates the signal on line /DSPWR, as previously described, and so the data RAM of the compression system are enabled when the signal on line /RW is low and /HOLDA is low.

Further, the low signal from OR gate C1D, as previously described, drives the line ADDHI. The signal on the line ADDHI is a first input signal on terminal F6C-9 of OR gate F6C (FIG. 20) and the low signal on the line /BT16 is provided to the second input terminal F6C-10 of OR gate F6C. Therefore, with two low input signals, OR gate F6C generates a low output signal that is applied to enable terminal D7-19 of bi-directional transceiver D7 and the enable terminal K6-19 of transceiver K6. Thus, the transceivers are enabled. Also, the signal on the line /RD is high because the signal on the line /IOR from the computer is high during a write. Therefore the transceivers D7 and K7 pass the data from the computer data bus to the bus DSPD0-DSPD15 of the compression system. Thus, the data on the bus is passed to the input terminals of the RAM and the RAM is enabled. This sequencing ensures valid data is present during the write time.

Since the flip-flop C4A (FIG. 13) is held in the preset condition, as previously described, the address counters D3, D4, D5, D6 are always enabled and are incremented with each pulse on the line /RW. The address counters are incremented by each pulse on line /RW since the data transfers are 16 bit wide and it is unnecessary to use a low byte and a high byte cycle as with the 8 bit machines.

For read cycles from the compression system the process is almost identical to that described above for the write cycle, except the signals are generated by level changes on the lines /IOR rather than level changes on the line /IOW. However, the signal on the line DSPR/W is high because the signal on the line /WR is high and the OR gates C3A, C1A (FIG. 14) pass the high signal to the line DSPR/W. The high signal on line DSPR/W drives the output signal from OR gate F7B (FIG. 19) to the line /DSPWR high, but the output signal from OR gate F7C to the line /DSPRD follows the signal on the line /DSPSTRB, because the high signal on line DSPR/W is inverted by inverter D1B and the resulting low signal is applied to input terminal F7C-9 of OR gate F7C.

Thus, the data RAM are enabled by the signal on line /DSPRD. The bi-directional transceivers D7 and K6 are also enabled from the B to A direction because the signal on line /RD is low at the same time the data RAM are enabled. Therefore, the data is passed from the data RAM of the compression system to the 16 bit data bus of the computer.

After a strip of data is written into the data RAM of the compression system the signal processor E1 takes control of the data bus and the program bus as well as the control lines. The signal processor can perform a 16 bit multiply and accumulate in approximately 100 nanoseconds and the on board program memory is contained in 8k words of static RAM. Provision has been made in the compression system to accommodate an extra 8k words if needed as shown in FIG. 17 and FIG. 18. In the embodiment illustrated in FIG. 10 through 21, the 4k word program memory of the signal processor is not utilized. However, in another embodiment (not shown), the 4k word program memory of the signal processor is used with 4k words of on-board program memory to provide a total of 8k words of program memory for this embodiment. The data memory of the signal processor E1 is contained in 64k words of static RAM H3, H5, K3, K5 and (FIG. 16).

Thus, after the compression system program and data memory have been loaded, E1 is ready to compress the image data or expand the compressed image blocks in the data memory. The assembly language program used to control the signal processor during these operations is given in the Microfiche Appendix A which is incorporated herein by reference. The assembly language program implements the compression process and expansion process previously described. Briefly, in an image compression the signal processor first performs the RGB to YIQ transformation. Then the 16 lines of luminance data are compressed. The 16 lines of chrominance data are filtered and sampled to four lines. No compression is performed on these lines at this time. The sampled chrominance data are stored in the compression system data memory and the compressed luminance lines are moved by the host computer to a temporary buffer. The second through fourth 16 line strips of the frame are written sequentially into the compression system memory and processed in the same manner i.e., the luminance data are compressed and the chrominance data are filtered and sampled down to four lines.

After the fourth 16 strip of luminance data has been processed and moved to the temporary buffer, the memory of the compression system holds one 16 line strip of filtered and sampled chrominance component I data and one 16 line strip of filtered and sampled chrominance component Q data. The chrominance components I and Q are separately compressed and moved to compressed image storage and then the four strips of compressed luminance data are moved from the temporary buffer to compressed image storage. This process is repeated until all lines in the frame have been compressed.

If the signal processor is performing an expansion, the computer transfers and expands one chrominance component I strip, and then one chrominance component Q strip into the data memory of the compression system. The compression system then expands, as described above, compressed luminance data and additional chrominance I, and chrominance Q data. This expansion process is repeated until the entire frame has been expanded.

Figure 26:
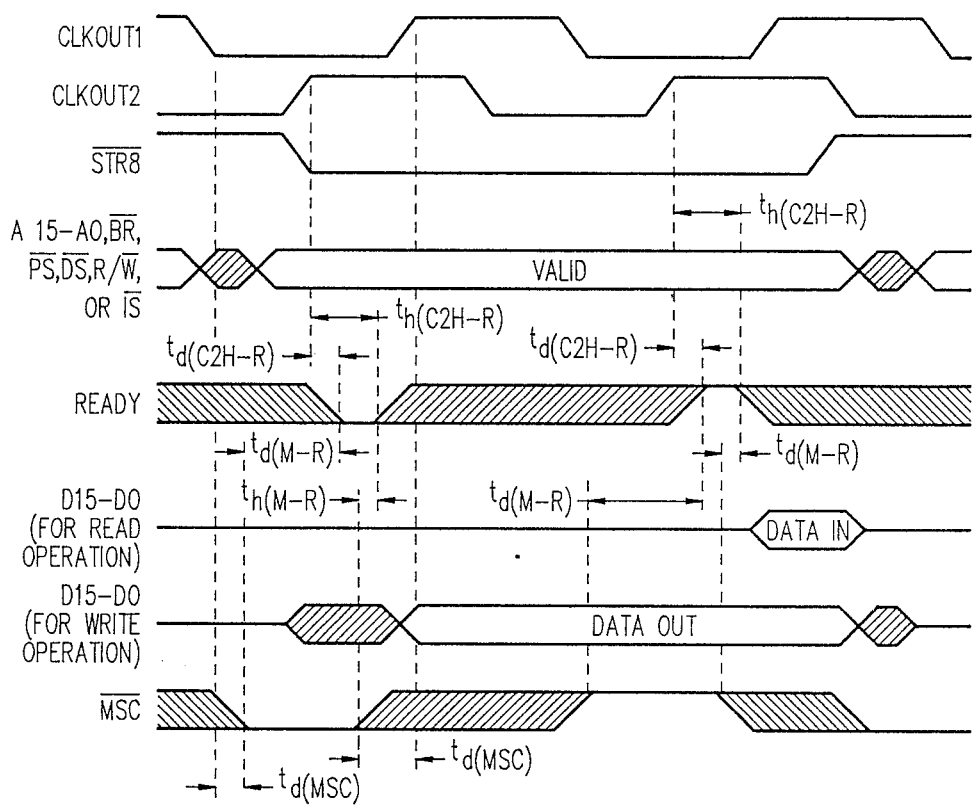
FIG. 26 is a wait-state data memory access timing diagram for the signal processor used in this invention.

When a read or write cycle is being performed on the compression system data memory by the signal processor E1, a single wait state is inserted every cycle. When data memory is being accessed the signal on the lines /DSPDS is commanded low by the signal processor. The low signal on lines /DSPDS is applied to a first input terminal F7A-1 of OR gate F7A. Consequently, the output signal of OR gate F7A on the line READY is controlled by the signal on the line /MSC from microprocessor E1. This operation inserts one wait state every cycle as shown in timing diagram FIG. 26.

Figure 27A:
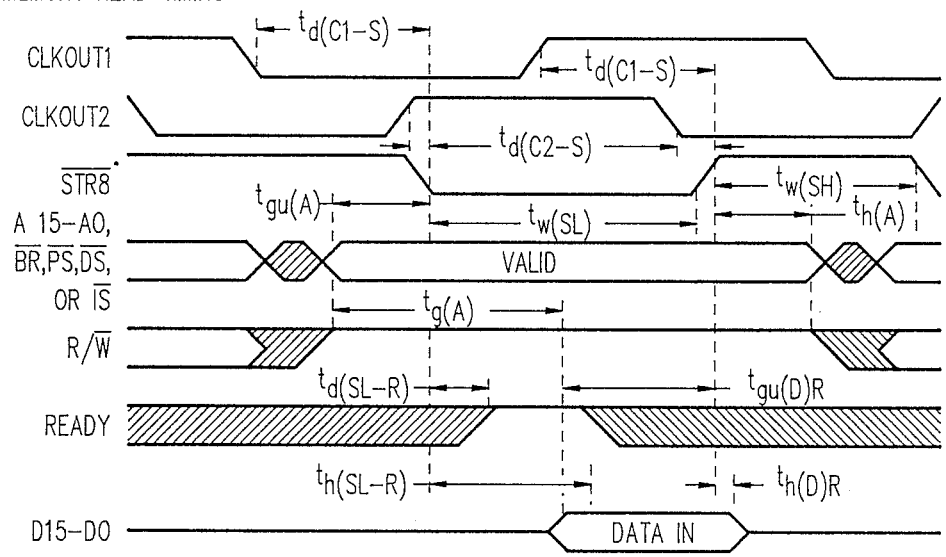
FIG. 27 is a program memory read and memory write timing diagram for the signal processor used in this invention.
Figure 27B:
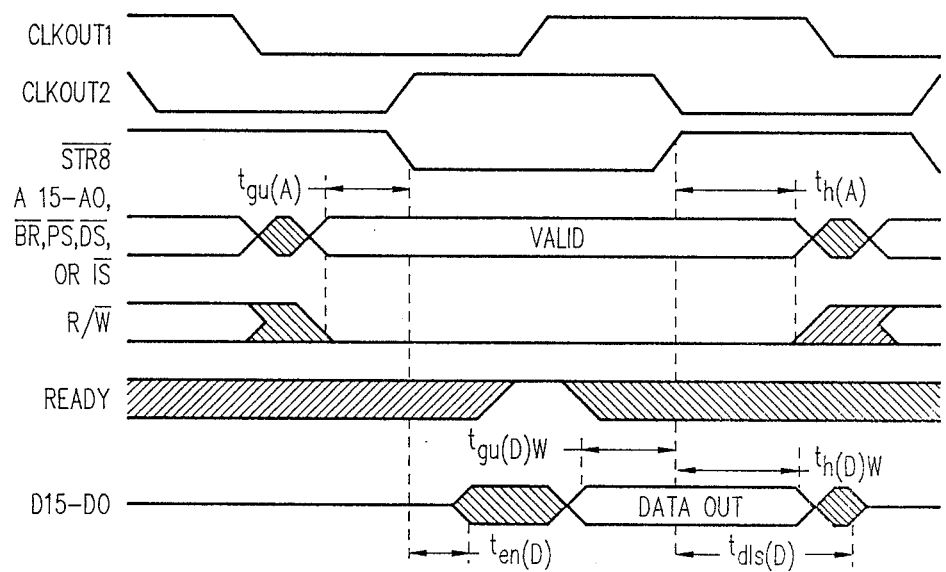

The program memory read/write cycles for the signal processor do not use wait states. The timing diagram for these operations is shown in FIG. 27.

In yet another embodiment of this invention, the compression process and the expansion process are used for data encryption and data decryption respectively. In this embodiment, a first host computer with a frame grabber subsystem and the compression subsystem of this invention is used to compress, i.e., encrypt, the data as previously described. Then the encrypted data is transmitted to a second host computer also having a frame grabber subsystem and the compression subsystem of this invention. The second host computer is used for decryption. The encrypted data is expanded, as previously described, and returned to the original values before encryption. Other embodiments of the encryption/decryption process are possible. Since the compression process of this invention generates a unique bit stream which can only be decrypted with the associated expansion process of this invention, a high degree of security is assured for any system which incorporates the features of this invention for encryption.

The compression system of this invention provides a significant enhancement in the ability to transmit, store and retrieve still pictures. The system allows the integration into data base systems of color images by reducing the amount of information required to represent video images to a small fraction of their original size. The system provides the capability to easily store color video images in minimal file storage space and the capability to rapidly retrieve and display any compressed image. In the normal resolution, as previously described, the compressed file space is typically 6–10 kilobytes of memory, and the time required to compress or expand the video still image is 1–4 seconds. For high resolution, the compressed file size is typically 12–25 kilobytes and the time required for compression or expansion is in the range of 6–12 seconds. The system is designed to provide optimal compression while maintaining the quality of the picture. Through the use of the discrete sine transform with non-uniform quantization, the adaptive coder, and the quality retention process, a new level in data compression is achieved.

Another advantage of this system is the ability to load various compression schemes into the signal processor and accordingly compress a wide variety of data. The compression system has been described with video still images, but other applications and uses of the method will be apparent to those skilled in the art. While one embodiment of this invention has been disclosed, it should be understood that the present disclosure merely exemplifies the principles of the invention, is not intended to limit the invention to the embodiment illustrated. From the present disclosure, other embodiments and advantages of this invention will be apparent to those skilled in the art.

We claim:

1. A system for compression and expansion of digital data, said digital data consisting of lines of discrete points, comprising:
    random access memory means (RAM);
    means, operatively coupled to said RAM, for compressing data; and
    means, operatively coupled to said RAM, for expanding compressed data;
    wherein said means for compressing data further comprises:
        means for retrieving a selected portion of N of said lines comprised of discrete points from said RAM wherein N is a selected integer;

means, operatively coupled to said retrieving means, for generating an error vector for a portion of N lines;

means, operatively coupled to said error vector generating means, for transforming data thereby forming a vector of transform coefficients;

means, operatively coupled to said compression means, for variable quantization of each point in a vector of transform coefficients thereby forming a vector of quantized transform coefficients;

means, operatively coupled to said variable quantizing means, for encoding each point in a vector of quantized transform coefficients thereby forming a vector of compressed data; and means, operatively coupled to said encoding means, for storing compressed data in said RAM.

2. A system as in claim 1 wherein said retrieving means further comprises:

means for filtering and sampling to reduce the number of said selected lines and the length of said selected number of lines.

3. A system as in claim 2 wherein said retrieving means further comprises:

means, operatively coupled to said means for filtering and sampling, for storing said filtered and sampled lines.

4. A system as in claim 3 wherein said retrieving means further comprises:

means, operatively coupled to said means for storing said filtered and sampled lines, for retrieving said filtered and sampled lines, wherein said filtered and sampled lines are retrieved from said means for storing said filtered and sampled lines upon the number of said sampled and filtered lines in said means for storing said lines being equal to N.

5. A system as in claim 4 wherein said retrieving means further comprises:

means, operatively coupled to said means for retrieving said filtered and sampled lines, for dividing said filtered and sampled lines into blocks wherein each block is comprised of N lines, each line in said block is comprised of M points and each block is sequentially compressed.

6. A system as in claim 5 wherein said error vector generating means further comprises:

means, operatively coupled to said means for dividing said filtered and sampled lines, for dividing each of said blocks into a selected point, a first one dimensional (1-D) vector, a second one dimensional (1-D) vector, and a two dimensional (2-D) vector wherein said selected point, said first and second 1-D vectors, and said 2-D vector are each a different portion of said N lines.

7. A system as in claim 6 wherein said transform means further comprises:

means, operatively coupled to said block dividing means, for dividing a selected point by a first selected number and generating a second number representing the quotient of said division.

8. A system as in claim 7 wherein said encoding means further comprises:

means, operatively coupled to said means for dividing by a first selected number, for coding a number in a fixed number of bits wherein said second number is coded in said fixed number of bits.

9. A system as in claim 6 wherein said means for dividing each of said blocks into a first 1-D vector, a second 1-D vector, a 2-D vector, and a selected point further comprises:

means for defining said first 1-D vector so that said first 1-D vector has N-1 points wherein the first point in said first vector is adjacent to a first selected point from a first block adjacent to said block containing said first 1-D vector; and the last point in said first 1-D vector is adjacent to the selected point of said block containing said first 1-D vector;

means for defining said second 1-D vector so that said second 1-D vector has M-1 points wherein the first point in said second vector, is adjacent to a second selected point from a second block adjacent to said block containing said second 1-D vector and the last point in said second vector is adjacent to the selected point of said block containing said second vector; and means for defining said 2-D vector so that said 2-D vector has N-1 points in a first direction and M-1 points in a second direction arranged in M-1 columns and N-1 rows wherein said M-1 column is adjacent to said first 1-D vector of said block containing said 2-D vector; said N-1 row is adjacent to said second 1-D vector of said block containing said 2-D vectors, said first column is adjacent to the first 1-D vector of a second block adjacent to the block containing said 2-D vector; and said first row is adjacent to the second 1-D vector of a first block adjacent to the block containing said 2-D vector.

10. A system as in claim 6 wherein said error vector generating means further comprises:

means, operatively coupled to block dividing means and to said RAM, for generating a predicted 1-D vector wherein for each 1-D vector processed, each point in said predicted vector is a linear estimate of each point in said 1-D vector and further wherein said predicted 1-D vector is stored in said RAM.

11. A system as in claim 10 wherein said error vector generating means further comprises:

means, operatively coupled to both said means for generating a predicted 1-D vector and said means for dividing said blocks, for for forming the difference between a 1-D vector and a predicted 1-D vector thereby forming said error vector for said 1-D vector.

12. A system as in claim 11 wherein said said data transforming means further comprises:

means for generating a discrete 1-D sine transform of a 1-D error vector thereby generating a 1-D vector of transform coefficients.

13. A system as in claim 12 wherein said variable quantization means further comprises:

means, operatively coupled to said means for generating a discrete 1-D sine transform, for nonuniform quantization of a 1-D vector of transform coefficients thereby forming a 1-D vector of nonuniformly quantized transform coefficients.

14. A system as in claim 13 wherein said encoding means further comprises:

means, operatively coupled to said means for nonuniform quantization, for Huffman coding of each point in a quantized vector thereby forming a compressed vector of nonuniformly quantized transform coefficients.

15. A system as in claim 14 wherein said error vector generating means further comprises:

means, operatively coupled to said nonuniform quantization means, for forming a reconstructed 1-D vector wherein said vector of nonuniformly quantized transform coefficients is transformed into a reconstructed 1-D vector.

16. A system as in claim 15 wherein said means for forming a reconstructed 1-D vector further comprises:

means for inverse quantization wherein a vector of nonuniformly quantized transform coefficients is inverse quantized using a nonuniform inverse quantization so that a vector of transform coefficients is formed;

means, operatively coupled to said means for inverse quantization, for generating an inverse discrete 1-D sine transform wherein said vector of transform coefficients is transformed to generate a reconstructed 1-D error vector;

means, operatively coupled to said RAM, for retrieving a stored predicted 1-D vector wherein said retrieving means retrieves the stored predicted 1-D vector corresponding to the 1-D vector being processed; and means, operatively coupled to both said means for generating a predicted vector and said means for performing an inverse discrete 1-D sine transform, for vector addition wherein said reconstructed 1-D error vector is added to said predicted 1-D vector to form said reconstructed 1-D vector.

17. A system as in claim 6 wherein said error vector generating means further comprises:

means, operatively coupled to block dividing means and to said RAM, for generating a predicted 2-D vector wherein for each 2-D vector processed, each point in said predicted vector is a bi-linear estimate of each point in said 2-D vector;

means, operatively coupled to both said means for generating a predicted 2-D vector and said means for dividing said blocks, for forming the difference between a 2-D vector and a predicted 2-D vector thereby forming said error vector for said 2-D vector.

18. A system as in claim 17 wherein said said data transforming means further comprises:

means for generating a discrete 2-D sine transform of a 2-D error vector thereby generating a 2-D vector of transform coefficients.

19. A system as in one claim 18 wherein said variable quantization means further comprises:

means, operatively coupled to said means for generating a discrete 2-D sine transform, for nonuniform quantization of a 2-D vector of transform coefficients thereby forming a 2-D vector of nonuniformly quantized transform coefficients.

20. A system as in claim 19 wherein said encoding means further comprises:

means, operatively coupled to said means for nonuniform quantization, for ordering wherein said 2-D vector of nonuniformly quantized transform coefficients is ordered as a 1-D vector and means, operatively coupled to said means for ordering, for Huffman coding of each point in a 1-D vector of nonuniformly quantized transform coefficients thereby forming a compressed 1-D vector representing said 2-D vector.

21. A system as in claim 1 wherein said means for expanding compressed data further comprises:

means, operatively coupled to said RAM, for retrieving compressed data in said RAM wherein said means retrieves compressed selected points, and compressed 1-D vectors of coded nonuniformly quantized transform coefficients;

means, operatively coupled to said retrieving means, for decoding compressed data wherein each point in said compressed 1-D vector is decoded thereby forming a vector of quantized transform coefficients;

means, operatively coupled to said decoding means, for inverse variable quantization wherein each point in said vector of quantized transform coefficients is inverse quantized thereby forming a vector of transform coefficients;

means, operatively coupled to said inverse variable quantization means, for inverse transformation of data wherein said vector of transform coefficients is transformed into an error vector; and means, operatively coupled to said inverse transform means, for generating reconstructed data wherein said error vector is converted to a vector of reconstructed data.

22. A system as in claim 21 wherein said decoding means further comprises:

means for decoding a number stored in a fixed number of bits wherein said compressed selected point is decoded.

23. A system as in claim 22 wherein said inverse transform means further comprises:

means, operatively coupled to number decoding means, for multiplying said decoded number by a first selected number and generating a second number representing the product of said multiplication wherein said decoded selected point is processed and said second number represents a reconstructed selected point.

24. A system as in claim 43 wherein said decoding means further comprises:

means for Huffman decoding of each point in a compressed 1-D vector wherein said compressed 1-D vector of coded nonuniformly quantized transform coefficients is converted to a 1-D vector of nonuniformly transform coefficients.

25. A system as in claim 24 wherein said inverse variable quantization means further comprises:

means, operatively coupled to said Huffman decoding means, for nonuniform inverse quantization of a 1-D vector of nonuniformly quantized transform coefficients wherein said 1-D vector of nonuniformly quantized transform coefficients is converted to a 1-D vector of transform coefficients.

26. A system as in claim 25 wherein said inverse transformation means further comprises:

means, operatively coupled to said nonuniformly inverse quantization means, for generating an inverse discrete 1-D sine transform wherein said 1-D vector of transform coefficients is transformed into a 1-D error vector.

27. A system as in claim 26 wherein said reconstructed data generating means further comprises:

means, operatively coupled to said RAM, for generating a predicted 1-D vector wherein for each 1-D vector processed, each point in said predicted vector is a linear estimate of each point in said 1-D vector;

means, operatively coupled to both said means for generating a predicted 1-D vector and said inverse transform means, for forming the sum of said 1-D error vector and said predicted 1-D vector thereby forming a 1-D reconstructed vector.

28. A system as in claim 21 wherein said decoding means further comprises:
   means for Huffman decoding of each point in said 1-D vector of coded nonuniformly quantized transform coefficients representing a 2-D vector, thereby forming a 1-D vector of nonuniformly quantized transform coefficients; and
   means, operatively coupled to said Huffman decoding means, for reverse ordering wherein said 1-D vector of nonuniformly quantized transform coefficients is ordered as a 2-D vector.

29. A system as in claim 28 wherein said inverse variable quantization means further comprises:
   means, operatively coupled to said reverse ordering means, for inverse nonuniform quantization wherein said 2-D vector of nonuniformly quantized transform coefficients is converted to a 2-D vector of transform coefficients.

30. A system as in claim 29 wherein said inverse transformation means further comprises:
   means, operatively coupled to said inverse nonuniformly quantization means, for performing an inverse discrete 2-D sine transform wherein said 2-D vector of transform coefficients is transformed to a 2-D error vector.

31. A system as in claim 30 wherein said error vector generating means further comprises:
   means, operatively coupled to said RAM, for generating a predicted 2-D vector wherein for each 2-D vector processed, each point in said predicted vector is a bilinear estimate of each point in said 2-D vector;
   means, operatively coupled to both said means for generating a predicted 2-D vector and said inverse transform means, for forming the sum of a 2-D error vector and a predicted 2-D vector thereby forming a reconstructed 2-D vector.

* * * * *